United States Patent [19]

Tzes et al.

[11] Patent Number: 5,444,820

[45] Date of Patent: Aug. 22, 1995

[54] ADAPTIVE SYSTEM AND METHOD FOR PREDICTING RESPONSE TIMES IN A SERVICE ENVIRONMENT

[75] Inventors: Anthony Tzes, Brooklyn; Vassilis Tsotras, New York, both of N.Y.

[73] Assignee: Long Island Lighting Company, Hicksville, N.Y.

[21] Appl. No.: 165,020

[22] Filed: Dec. 9, 1993

[51] Int. Cl.⁶ ............................................. G06F 15/18
[52] U.S. Cl. ...................................... 395/22; 395/23; 395/11; 395/61; 395/900
[58] Field of Search ................. 395/11, 22, 23, 61, 395/900, 51

[56] References Cited

U.S. PATENT DOCUMENTS

| | | | |
|---|---|---|---|
| 5,155,763 | 10/1992 | Bigus | 379/113 |
| 5,204,053 | 4/1993 | Fennern | 376/267 |
| 5,250,766 | 10/1993 | Hikita et al. | 187/133 |
| 5,268,835 | 12/1993 | Miyogaki et al. | 395/61 |
| 5,269,289 | 12/1993 | Takehana et al. | 128/4 |
| 5,274,714 | 12/1993 | Hutcheson et al. | 382/15 |
| 5,282,261 | 1/1994 | Skeirik | 395/22 |
| 5,307,260 | 4/1994 | Watanabe et al. | 395/22 |

OTHER PUBLICATIONS

Choi et al, "Non-Linear System Diagnosis Using Neural Networks & Fuzzy Logic", IEEE Int'l Conf on Fuzzy Systems, Mar. 8–12 1992, pp. 813–820.

Bowen, "Using Neural Nets to Predict Several Sequential & Subsequent Future Values from Time Series Data", 1st Int'l Conf on AI on Wall Street, Oct. 9–11, 1991, pp. 30–34.

Dash et al, "A Fuzzy Adaptive Correction Scheme for Short Term Load Forecasting Using Fuzzy Layered Neural Network", Proc 2nd Int'l Forum on Application of NN to Power Systems, Apr. 19–22 1993, pp. 432–437.

Asar et al, "A Specification of Neural Network Applications in the Load Forecasting Problem", 1st IEEE Conf on Control Applications, Sep. 13–16 1992, pp. 577–582 vol. 1.

"Working with Neural Networks", D. Hammerstrom, IEEE Spectrum, Jul. 1993, pp. 46–53.

*Handbook of Intelligent Control*, (D. White and D. Sofge, Ed.), Multiscience Press, New York, 1992, pp. 8–11 and pp. 118–123.

"30 Years of Adaptive Neural Networks: Perception, (List continued on next page.)

*Primary Examiner*—Allen R. MacDonald
*Assistant Examiner*—Stuart B. Shapiro
*Attorney, Agent, or Firm*—Dilworth & Barrese

[57] ABSTRACT

A hybrid fuzzy logic/neural network prediction system and method is disclosed for predicting response times to service requests to a service provider. Data from a historical database of records including customer requests and weather information are input to the hybrid system. The data is filtered to reject faulty data entries and data not necessarily useful for predicting response times to service requests such as customer comments are eliminated. A backpropagation neural network operating in a supervised learning mode is employed to decrease the effects of the inherent system nonlinearities. The prediction error from the neural network is trained to make predictions within a predetermined error limit. The neural network generates a prediction configuration; i.e. a set of neural network characteristics, for every record per geographical area, time frame, and month. A fuzzy logic classifier is used for further data reliability. A fuzzy logic classifier relying upon the Fuzzy Cell Space Predictor (FCSP) method is employed to improve predicted response times from year to year. The fuzzy logic classifier supervises the overall identification scheme and, for every record, computes a prediction configuration for its corresponding month in the preceding year. The fuzzy logic classifier then computes a prediction estimate for its neighboring months in the preceding year and computes the prediction estimate for the next time frame (i.e. morning and evening). The Center of Gravity method is used to smooth the different prediction estimates to obtain a final predicted response time.

9 Claims, 15 Drawing Sheets

OTHER PUBLICATIONS

Madaline, and Backpropagation", B. Widrow and M. Lehr, Proceedings of the IEEE, vol. 78, No. 9, Sep. 1990, pp. 1415–1442.

"Networks for Approximation and Learning", T. Poggio and F. Girosi, Proceedings of the IEEE, vol. 78, No. 9, Sep. 1990, pp. 1481–1497.

"Backpropagation Through Time: What It Does and How To Do It", P. Werbos, Proceedings of the IEEE, vol. 78, No. 10, Oct. 1990, pp. 1550–1560.

R. Sedgewick, *Algorithms,* 2nd Edition, Addison-Wesley Publishing Co., Reading, Mass., 1988, pp. 15–33 and pp. 93–113.

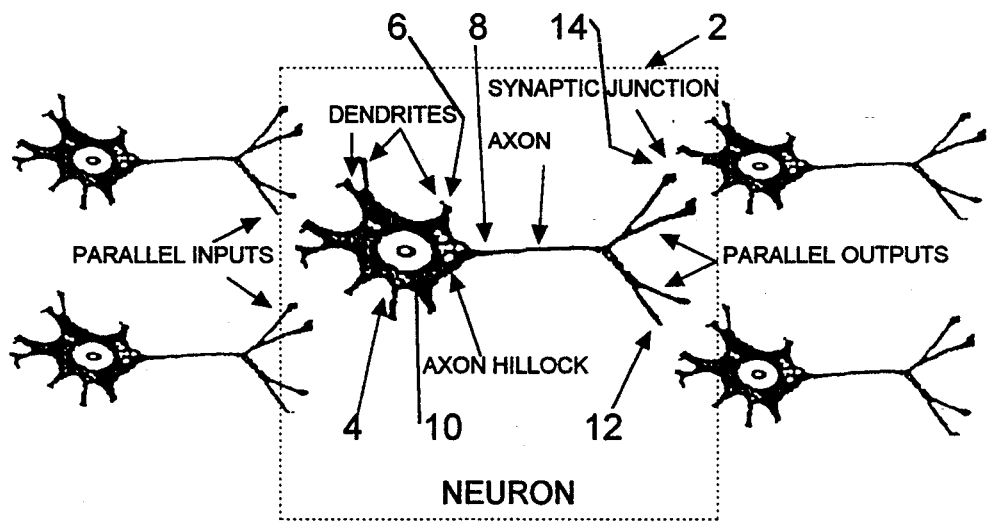
FIGURE 1
FIGURE 12
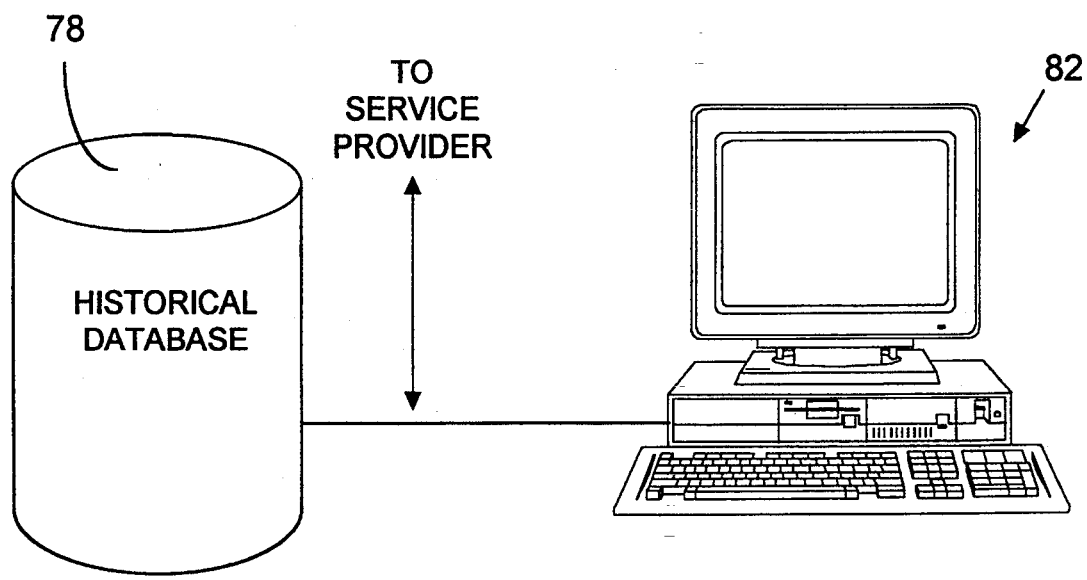

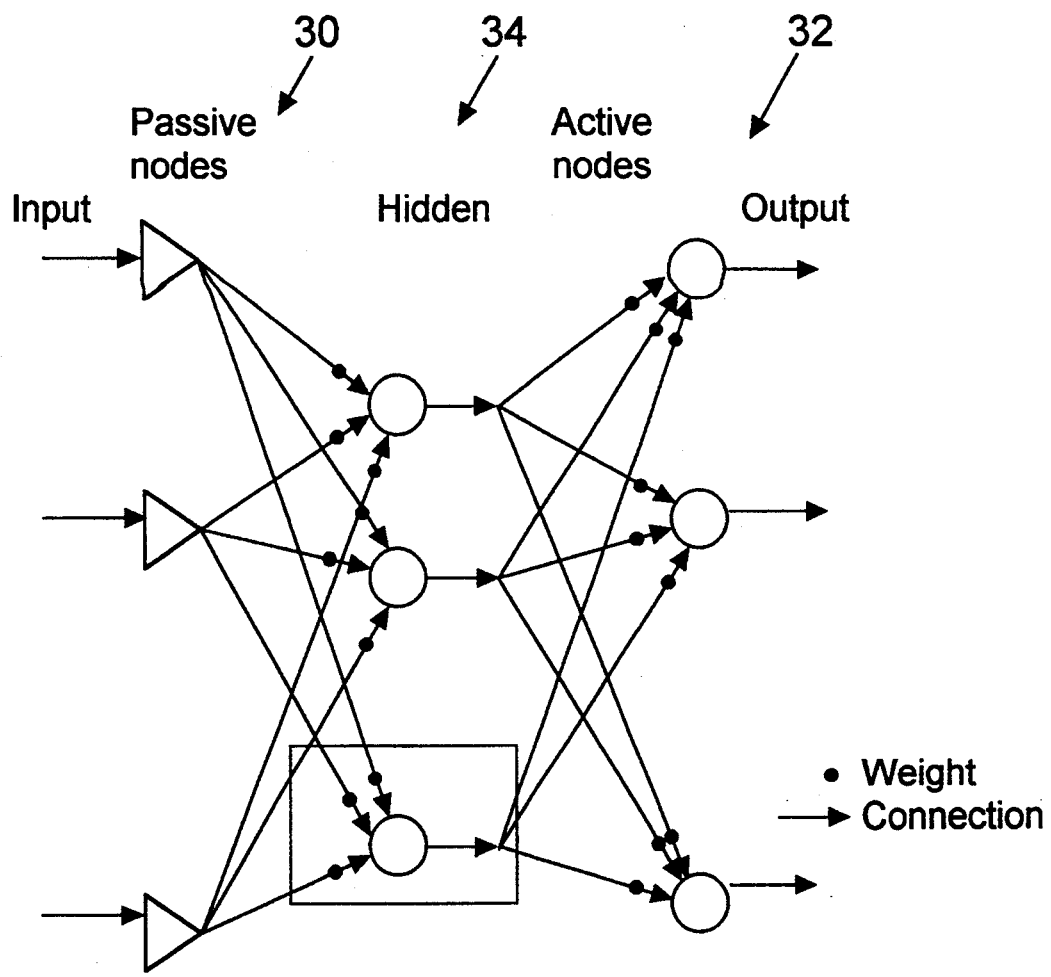
FIGURE 5
FIGURE 7
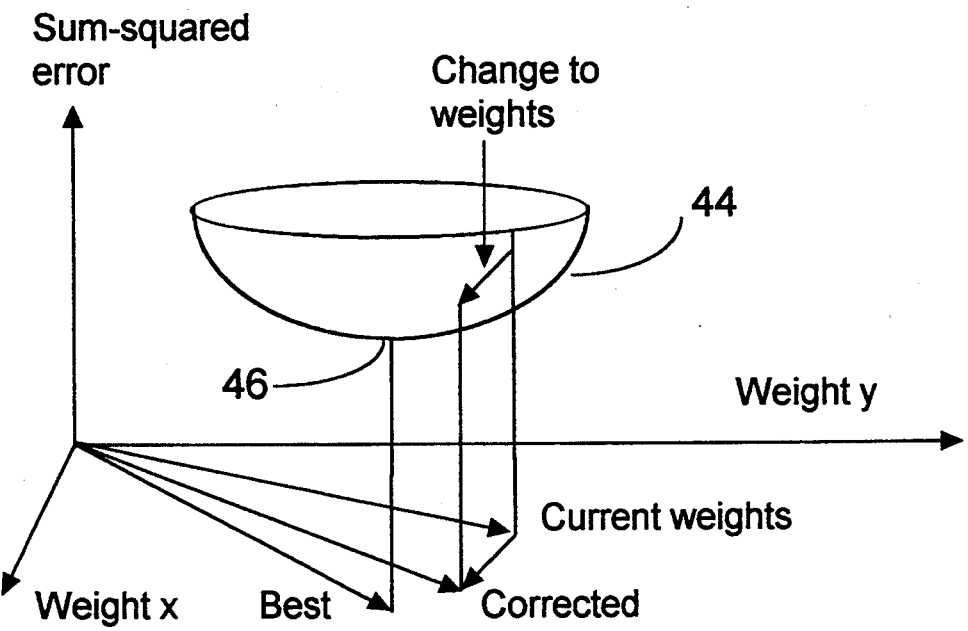

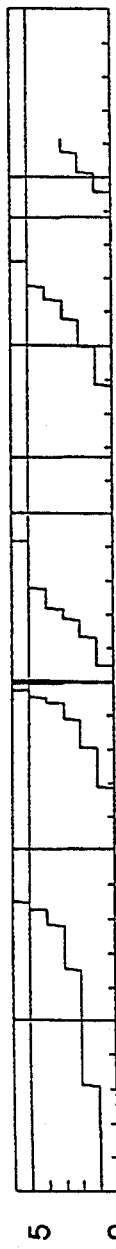
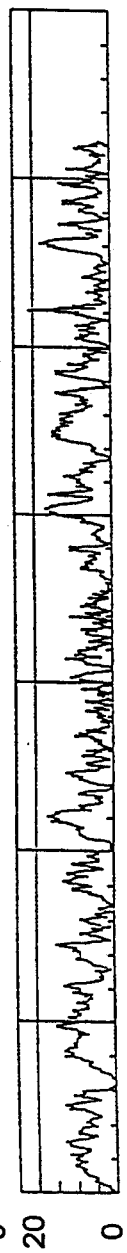
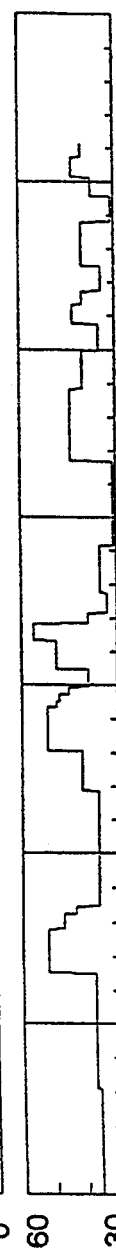
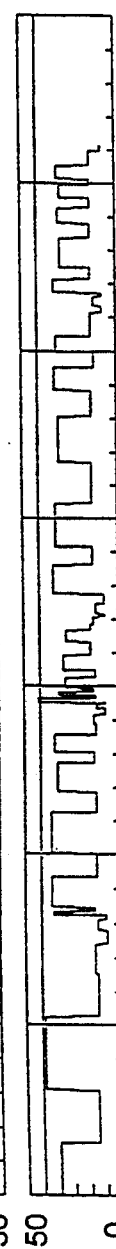
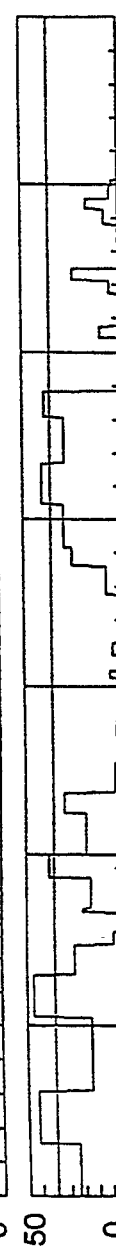
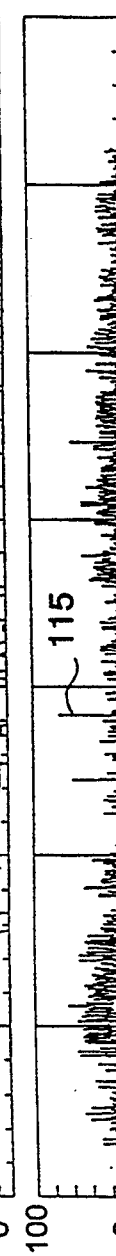
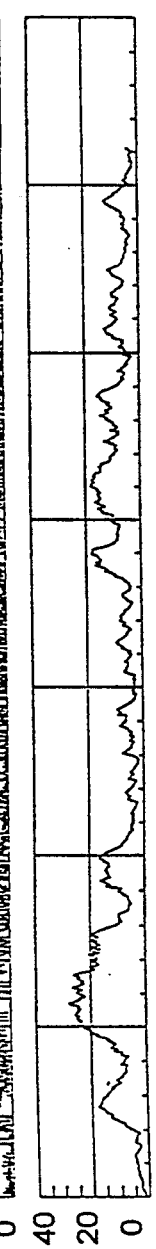
FIGURE 16
FIGURE 17
FIGURE 18
FIGURE 19
FIGURE 20
FIGURE 21
FIGURE 22
FIGURE 23

ADAPTIVE SYSTEM AND METHOD FOR PREDICTING RESPONSE TIMES IN A SERVICE ENVIRONMENT

FIELD OF THE INVENTION

This invention relates to neural networks and more particularly this invention relates to a hybrid fuzzy logic/neural network system and method for predicting response times to service requests.

BACKGROUND OF THE INVENTION

Recent developments in computational technology and techniques have applied computers to accumulate and recognize patterns as well as to respond to random or quasi-random events.

Computers have been implemented for their pattern recognition capabilities to increase the efficiency of response oriented service environments such as inventory systems, telemarketing campaigns, financial management, and service sector operation; i.e. environments which respond to changing situations. Some systems are amenable to predictive techniques implementing Markov processes and queueing theory, in which a current state of the system determines a successive state of the system, independent of the history of the system. Thus, the history of the system is not employed and so is not retained for the purposes of predicting a successive state.

Other systems behave in a cyclical manner, i.e. regular cyclical patterns are observable in the history of the system, which may then be employed to predict subsequent states of the system.

Many cyclical systems are non-deterministic despite their regular cyclical trends, i.e. random variations are expressed in weather patterns and temperatures. Therefore, such non-deterministic cyclical systems are difficult to predict. Since service providers are affected in part by weather and temperature in a given region, the development of a predictive system to approximate the response time of the service provider to customer service requests would increase the efficiency of service responses to thus improve the performance of the service providers.

Traditional prediction systems rely on explicitly stated rules which attempt to indirectly explain or describe the behavior of data. These rules are often implemented into the prediction system by a programmer and applied to input data to generate an output using these rules. However, data may have subtle and/or unknown relationships not adaptable to explicitly stated rules. In addition, since data is often noisy, distorted, or incomplete, explicitly stated rules may fail to correctly operate on patterns broadly similar to the data from which the rules were drawn. Also, some complex problems are non-linear, so they cannot be easily handled by mathematically simple rules.

The implementation of computational systems known as neural networks to non-linear and/or non-deterministic environments allows patterns in data from such environments to be recognized and successive states to be predicted without the above limitations of traditional prediction systems.

Neural networks do not rely on explicitly stated rules since such neural networks process input data and learn their own rules from the input data to generate accurate outputs. Therefore, neural networks are able to find unknown data relationships, to generalize to broad patterns with incomplete or noisy input data, and to handle complex non-linear problems. Many of the basic characteristics of neural networks known in the art are described in "Working with Neural Networks", D. Hammerstrom, IEEE SPECTRUM, July 1993, pp. 46–53, which is incorporated herein by reference in its entirety.

In general, a neural network comprises a set of processing elements (PE) or nodes which are modelled to perform as a neuron behaves in a brain. As shown in FIG. 1, a neuron 2 comprises a soma 4 having a plurality of dendrites 6 as inputs. An axon 8 extends from an axon hillock 10 and branches to form a plurality of parallel outputs operatively coupled by synaptic junctions 14 to the dendrites of the other neurons. Once a sufficient degree of input electrical signals conveyed by ionic concentrations input through the dendrites 6 of neuron 2 attains a threshold level, the soma 4 fires to output an electrical signal over its axon 8. The nodes or processing elements of the neural network function to output a signal once the sum of inputs attain a threshold value. Hence, the term 'neural network' is applied to such processing elements.

As illustrated in FIG. 2, an artificial neuron-like node 16, artificial neuron, or processing element has at least one input 18 and at least one output 20. The output is determined from the inputs by weighting each input by multiplying the corresponding input with weight 22, using an adder 24 to sum the weighted inputs with a bias 26 or threshold input, and generating at least one output from a transfer function 28 of the weighted sum. The weights 22 may be dynamically altered, as described below. A non-linear transfer function 28 may be used to smooth the raw sums within fixed limits. A popular transfer function is the sigmoid function $$y=(1+e^{-Q(x)})^{-1}$$

shown in FIG. 3 where Q is a function of x. Other functions such as the hyperbolic tangent function, scaled and translated as shown in FIG. 4, may be used as transfer functions.

The nodes may be interconnected in a basic neural configuration as shown in FIG. 5, having a set of input nodes called an input layer 30, a set of output nodes called an output layer 32, and a set of intermediate nodes called a hidden layer 34 connecting the input layer 30 to the output layer 32. The input nodes may be passive, i.e. they pass input data unchanged through to the hidden layer 34, while the hidden layer 34 and output nodes 32 are generally active in modifying and processing data.

Lacking explicitly implemented rules, the nodes of the neural network are assigned a predetermined bias and initial weights. The neural network is then reconfigured by adjusting the weights to each node by training the neural network. Training a neural network by supervised learning involves inputting a known set of inputs, processing the inputs through the hidden layer, obtaining the resulting set of outputs from the neural network, comparing the resulting outputs with a known set of outputs corresponding to the known set of inputs, adjusting the weights of each node based on a comparison of the resulting and known outputs, and repeating the training until the neural network obtains weights which would generate the known outputs within a required degree of error. The neural network thereby learns to generate the known outputs from the known inputs, and then may be used for generating outputs from unknown inputs in use in the field. In this manner, neural networks are adaptive since they are reconfigured during training and during actual use to learn new rules or to find new patterns in new data.

One of the more popular configurations of neural networks (NN) is the back propagation (BP) model 36 shown in the block diagram in FIG. 6. In some BP neural networks, the outputs of the basic neural network 38 are connected to a root mean squared (RMS) error generator 40 which calculates the root mean squared error from the respective neural network's outputs. The root mean squared error is then fed back to the weights 22 of each node, where a weighted fraction of the fed back root mean squared error is determined to find the indirect contribution of each node to the root mean square errors. The diagonal arrow 42 in FIG. 6 symbolizes that the error signal is fed back to each weight 22 of each node throughout the neural network 38. The weighted fraction of errors is used to adjust the weights 22 of each node, and subsequent reconfiguration of the weights 22 during the training period minimizes the root mean squared error.

As shown in FIG. 7, in an idealized depiction of a surface 44 of error values, the changes in the weights adjust the weights to reduce the error toward a minimum 46 by gradient descent. As depicted in FIG. 8, the training is repeated for many iterations until the error is reduced below a predetermined error tolerance limit 48. It is common for hundreds and even thousands of iterations of the known input and output data to be performed until the neural network functions within the tolerance limit 48 to be considered adequately trained.

Each node may be embodied as a storage register in memory for storing individual node information, including the weights, bias, and node identification data. Software packages are presently available for accepting input data in preselected formats to implement neural networks. NeuralWorks ™ Professional II/PLUS from NeuralWare Inc., Pittsburgh, Pa. is a menu and window driven system for neural network applications. For example, using a variety of windows of a graphical interface such as shown in FIG. 9, the transfer function 50, the number 52 of nodes or processing elements on each of the input, hidden, and output layers, the learning rule 54 to be used, etc. may be set up.

Alternatively, each node may be a specialized processor with memory for storing the individual mode information. Since neural networks may perform under a parallel processing architecture, massively parallel processing systems having such specialized processors connected in parallel are well suited for neural network applications.

The field of fuzzy logic is related to neural networks in that both can handle non-linearities in environments and allow for interpolative reasoning. Fuzzy logic deals with imprecision by expressing degrees of inclusion of an object or function in a set by a membership function ranging from 0 to 1. Linguistic rules may thus be implemented to express height as 'short' or 'tall' both using fuzzy sets in fuzzy logic and manipulating these fuzzy sets. A crisp or definite non-fuzzy result is obtained by the Center of Gravity (COG) method to find the centroid or center of gravity of the fuzzy sets, as described in *Handbook of Intelligent Control*, D. White and D. Sofge, Ed., Multiscience Press, New York, 1992, which is incorporated by reference in its entirety.

Hybrid systems employing both neural networks and fuzzy logic allow fuzzy control systems implementing human understandable expressions to be adaptable during performance using the learning capabilities of a neural network.

As described in *Handbook of Intelligent Control* above, a hybrid system 56 as shown in FIG. 10 called the Approximate Reasoning based Intelligent Control (ARIC) architecture integrates fuzzy logic controller 58 having a fuzzifier 60, a rule base 62, and a defuzzifier 64 with a neural network 66 to apply unsupervised learning to the neural network 66. In ARIC, the output layer of the neural network employs reinforcement learning to predict, for example, a failure in a plant 68.

In service environments, the response time to service requests is affected by the geographic area served as well as by quasi-cyclical events such as the weather and the time of year. Other random factors such as manpower available and the number of requests also affect the response times of the service provider.

For customers to be served efficiently and for maintaining reliable service in general, it would be advantageous for the service provider to reliably predict response times for a given day of any month. As a service request is called in by a customer, the service operator of the service provider may then provide an accurate time to the customer when service personnel should respond to the request by, for example, maintenance or other services as needed.

Generally, bad weather due to changes in climate and the occurrence of peak periods should increase the number of service requests. Similarly, geographic regions with larger populations would be expected to have more requests for service compounded upon the effects of weather.

A greater manpower available at a given time would be expected to decrease response times. The requests for service also depend on the nature of the service request, e.g. emergencies in service or services of lower priority are addressed in a different manner by service providers. However, since all of the above factors have an inherent randomness despite cyclical trends, the requests for service may behave in a non-linear fashion.

A need exists for a system and method for accurately predicting response times of a service provider to such non-linear factors affecting service responses. Since artificial neural networks implemented by a computer are capable of handling these non-linearities, it would be beneficial to apply an artificial neural network to the service environment for predicting service response times.

In a given month, the weather conditions and other factors may vary from year to year. A current month such as December 1993 may overall be 'colder' or 'warmer' than December 1992, so December 1993 may be characterized to be 'similar' to January 1994 or November 1993, respectively. Predictions for response times for December 1993 based on December 1992 would thus not be as accurate as predictions based on a more 'similar' month.

A need exists for a response time predictor to be adaptable to different conditions as well as to be able to predict response times using such fuzzy characteristics as 'colder' and 'warmer'.

The present invention is a hybrid system incorporating a fuzzy logic classifier and a neural network predictor trained by historical service records of a service provider to predict response times for days and times of the month, e.g., peak periods. The present invention is adaptable to learn from new conditions of weather, manpower and response times, and also takes the 'similarness' of conditions in previous years into account.

SUMMARY OF THE INVENTION

Data from a historical database of records including customer requests and weather information are input to a hybrid system. The data is then filtered since faulty data entries need to be rejected, and some fields of the data records containing information not necessarily useful for predicting response times to service requests such as customer comments are eliminated. The initial data filtering reduces the size of the record entries.

An initial linear regression algorithm is utilized to reveal possible data clustering and to examine the interdependencies of the dependent data input parameters. The resulting variance of the prediction error was large, suggesting possible enhancements of service operations.

A backpropagation neural network operating in a supervised learning mode is employed to decrease the effects of the inherent system nonlinearities. The prediction error from the neural network is less than the error from the linear regression scheme.

To account for further data reliability, a fuzzy logic classifier is used. The neural network generates a prediction configuration; i.e. a set of neural network characteristics, for every record per geographical area, time frame, and month. For example, for 4 service divisions each divided into 4 geographical areas, 3 distinct time frames (morning, evening, and night) and at least 9 months there are a total of 432 produced prediction configurations. Few data samples make the predicted response time more unreliable. In other words, although the neural network predictions converge and produce small errors for a particular data sample (e.g. October, Division 1, Area 2, Morning time frame), a generated prediction configuration may not provide an accurate estimate for the same data sample for the next year period. This is attributed to the different characteristics of each data sample, e.g. different weather conditions, etc.

A fuzzy logic classifier relying upon the Fuzzy Cell Space Predictor (FCSP) method is employed to improve predicted response times from year to year. The fuzzy logic classifier supervises the overall identification scheme and for every record: 1) computes, for example, for October 1993, a prediction configuration for its corresponding month in the preceding year, (i.e. October 1992), 2) computes a prediction estimate for its neighboring months in the preceding year (i.e. September 1992 and November 1992), and 3) computes the prediction estimate for the next time frame (i.e. morning and evening). Then it utilizes the Center of Gravity method to smooth the different prediction estimates to obtain a final predicted response time.

BRIEF DESCRIPTION OF THE DRAWINGS

The features of the present invention will become more readily apparent and may be better understood by referring to the following detailed description of an illustrative embodiment of the present invention, taken in conjunction with the accompanying drawings, where:

FIG. 1 illustrates actual neurons;
FIG. 5 shows a basic neural network configuration;
FIG. 7 iilustrates gradient descent on an error surface;
FIG. 12 illustrates a preferred embodiment of the present invention;
FIGS. 16–21 illustrate example input data;
FIG. 22 shows an example of actual response times;
FIG. 23 illustrates the response times of FIG. 22 filtered for input.

DESCRIPTION OF THE PREFERRED EMBODIMENTS

Figure 11:
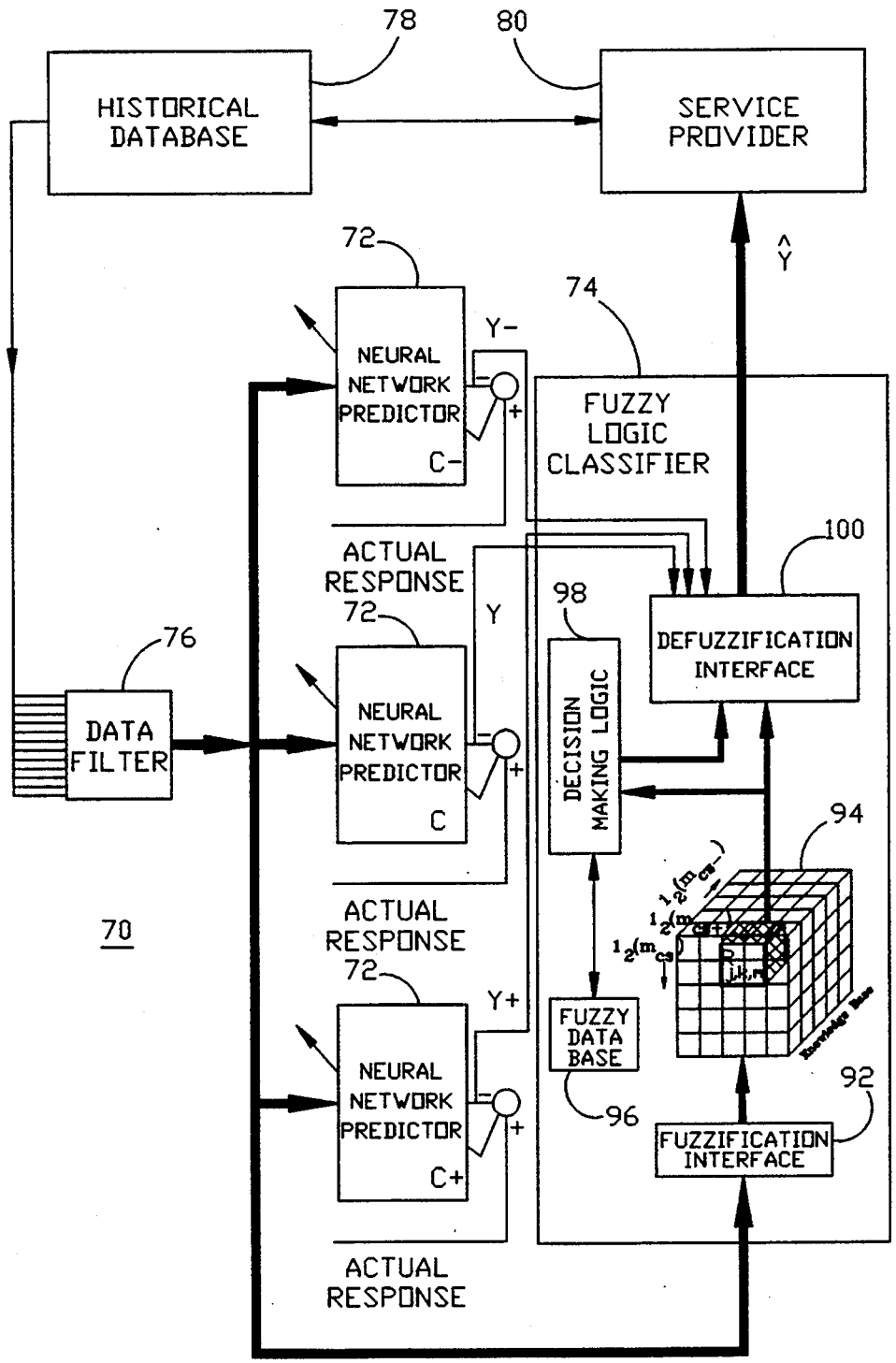
FIG. 11 shows a block diagram of the present invention.

Referring now in specific detail to the drawings, with like reference numerals identifying similar or identical elements, the present invention is a fuzzy neural network predictor 70 having a neural network predictor 72 coupled to a fuzzy logic classifier 74 and to a data filter 76 as illustrated in FIG. 11. The present invention is thus a hybrid system which, for the purposes of this disclosure, is herein defined as applied to the field of neural networks and fuzzy logic to be a computational system employing both neural networking principles and fuzzy logic principles.

The fuzzy neural network predictor 70 is trained from a historical database 78 for use by a service provider 80 in a service environment. The service provider is preferably an electrical distribution and service facility, with the fuzzy neural network predictor 70 predicting prospective response times to customer service requests pertaining to electrical problems addressed to the service provider 80.

A predictor based on a supervised learning neural network architecture was selected due to the potential that neural networks have shown for on-line identification applications. This is primarily due to their capability to identify the underlying system nonlinear characteristics through nonlinear mappings. Supervised learning involves training the neural network with known inputs and outputs which, in the present invention, are stored in database 78.

A prediction configuration is herein defined as the settings, i.e. the weights, transfer functions, and other characteristics of the neural network predictor 72, upon which a prediction of the response times are based. During and after training, the prediction configuration is dynamic due to the adaptive learning of the neural network predictor 72. The prediction configuration may be saved in the memory of the processing elements or nodes of the neural network predictor 72 and/or saved in a separate memory between successive predictions.

As shown in FIG. 12, the neural network predictor 70 of the present invention is a computer system 82 operatively coupled to the database 78 and to the service provider 80. The computer system 82 is preferably embodied as an IBM TM RISC 6000 Model 530H computer running customized software written in the C programming language to implement and train the neural network predictor 72. A portion of the software listing for the neural network predictor 72 is included in the attached Appendix having the following filenames: MAKEFILE, NET.H, READER.C, LEARN.C, ANN2.C, and MIO.C.

Figure 13:
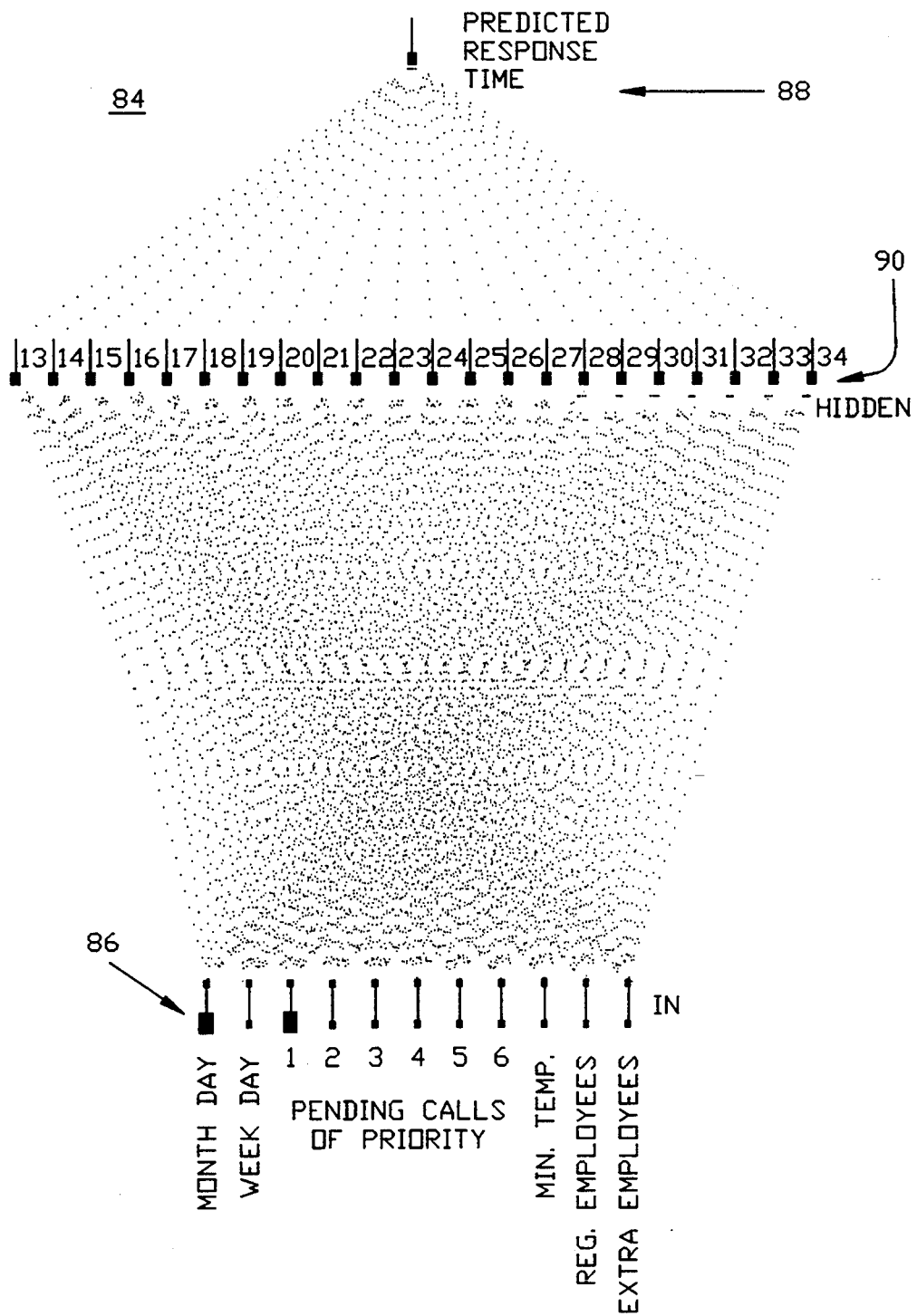
FIG. 13 illustrates the neural network of the present invention.
Figure 25:
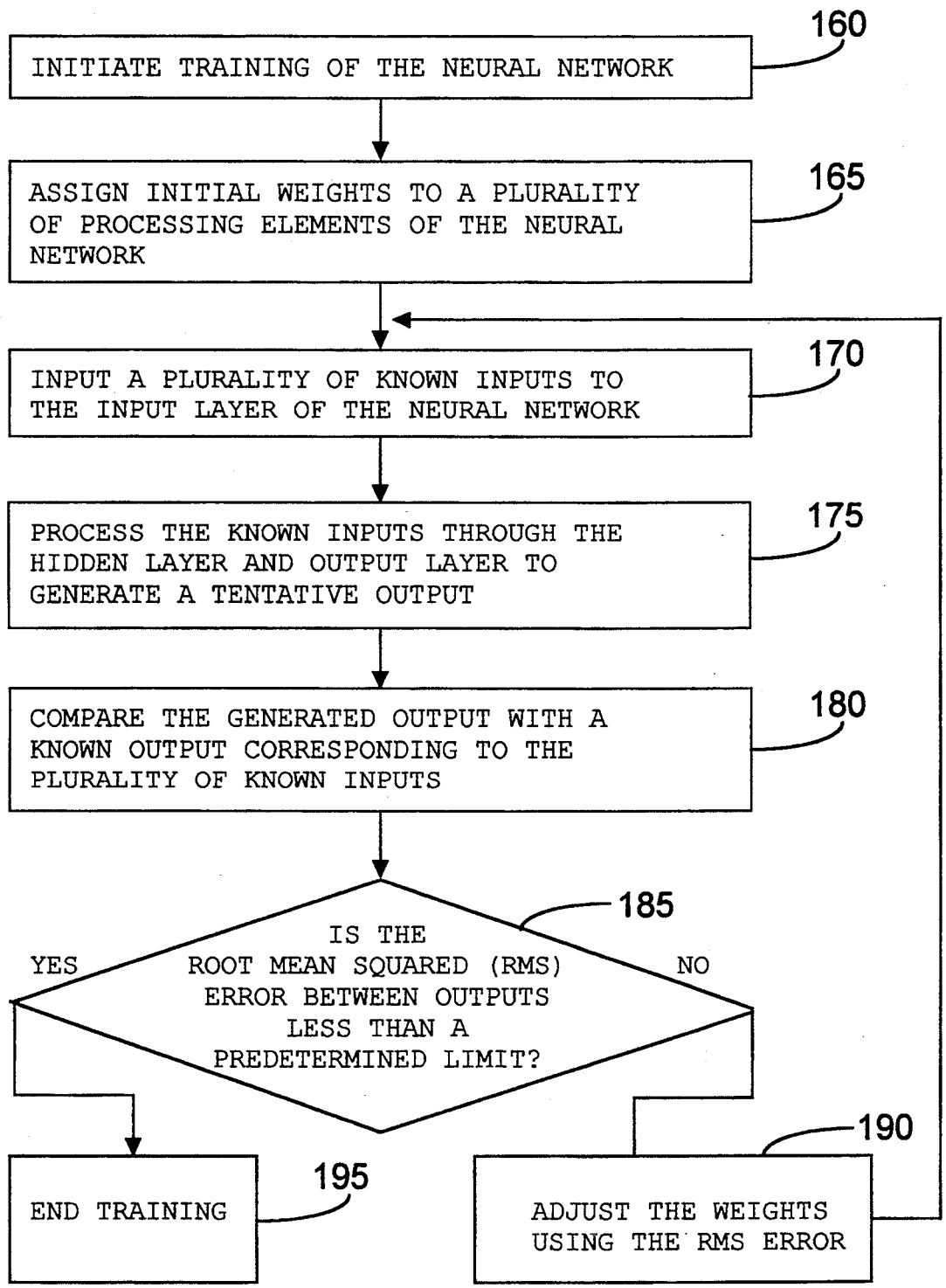
FIG. 25 illustrates the method of training the neural network predictor of the present invention.

As illustrated in the Appendix, the MAKEFILE program is used to link and compile the customized programs implementing the fuzzy neural network predictor 70 of the present invention. The NET.H program defines the structure of the neural network predictor 72 as shown in FIG. 13. The MIO.C program is used to save and retrieve the weights and other parameters of the neural network predictor 72 as a prediction configuration for future predictions of response times. LEARN.C is used for the learning process of the neural network predictor 72 as shown in FIG. 25. The READER.C program is used to read the input pattern sequence provided by the data filter 76. The ANN.C is a main neural network program which combines the above described programs to implement the neural network predictor 72.

Referring again to FIG. 12, the computer system 82 also includes input devices such as keyboard or mouse, a display, 32 Megabyte (MB) of random access memory (RAM), and a 1.2 Gigabyte (GB) hard or fixed drive for storing and running the neural network predictor 72 which is preferably embodied as a predetermined set of neural network characteristics of NeuralWorks TM Professional II/PLUS. The computer system 82 also runs customized programs in C to implement the data filter 76 and the fuzzy classifier 74. In an alternative embodiment, the present invention may be implemented using NeuralWorks TM Professional II/PLUS software, or using a dedicated neural network processor such as a massively parallel processor (MPP) for the neural network predictor 72 and specialized processors implementing the data filter 76 and the fuzzy logic classifier 74.

A network interface such as TCP/IP is also included in the computer system 82 to network with the database 78 and the service provider 80. The computer system 82 functions using at least one operating system such as UNIX and/or OS/2.

The data as provided by the historical database 78 including customer requests and weather information are prefiltered i.e. filtered prior to input to the neural network predictor, as described further below. This is necessary since: 1) faulty data entries need to be rejected, and 2) some fields of the data records containing information not necessarily useful for predicting response times to service requests such as customer comments are eliminated. The initial prefiltering reduces the size of the record entries.

The following sections describe the various components of the invention in greater detail.

I. THE NEURAL NETWORK PREDICTOR

Figure 2:
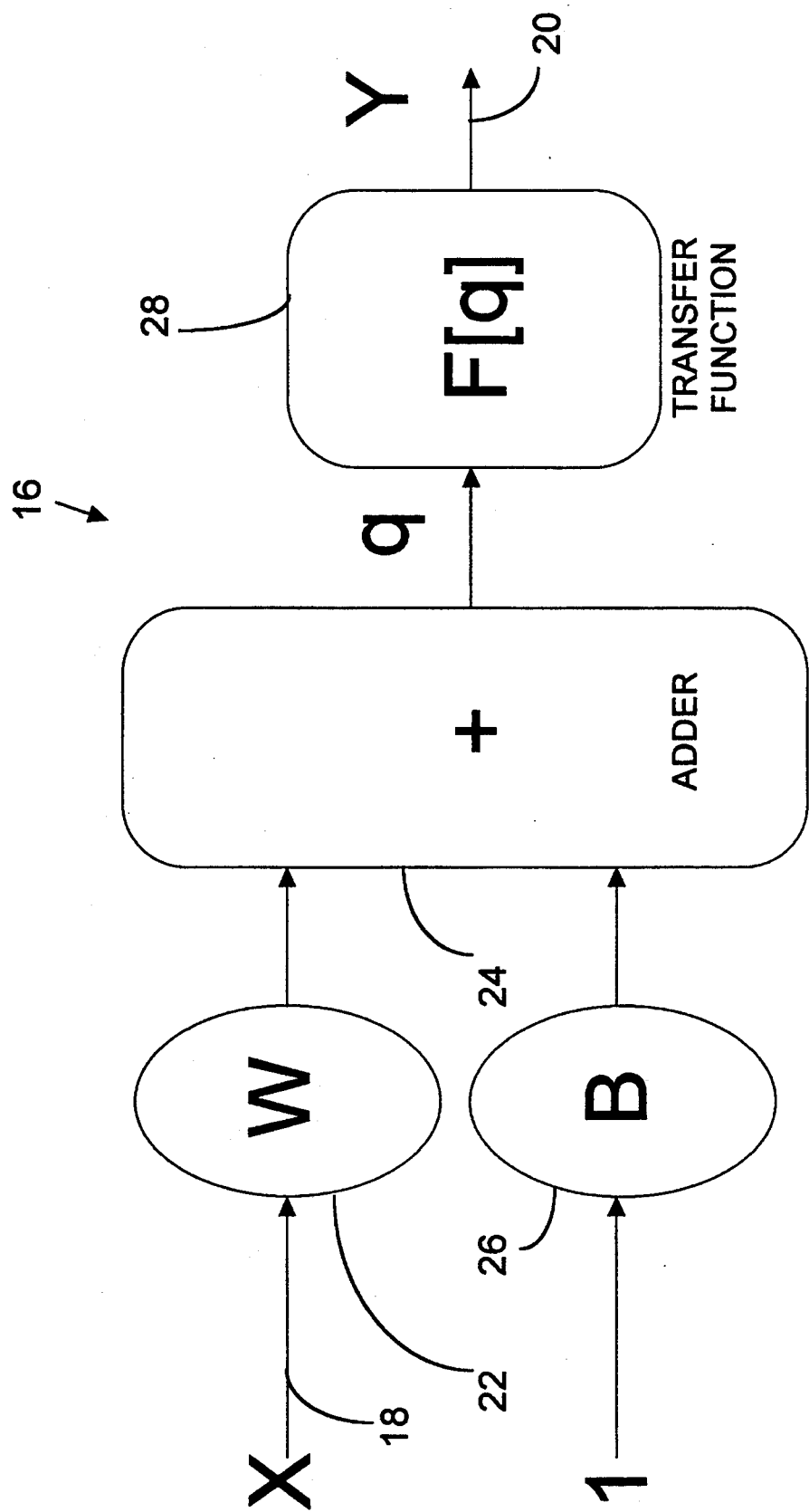
FIG. 2 illustrates an artificial neuron.
Figure 3:
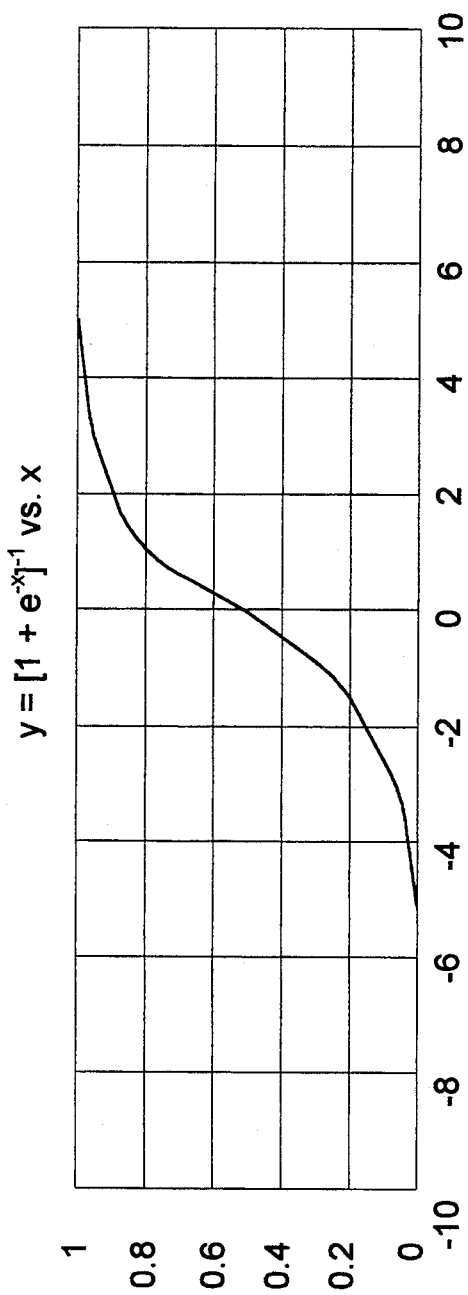
FIG. 3 shows a sigmoid function.
Figure 4:
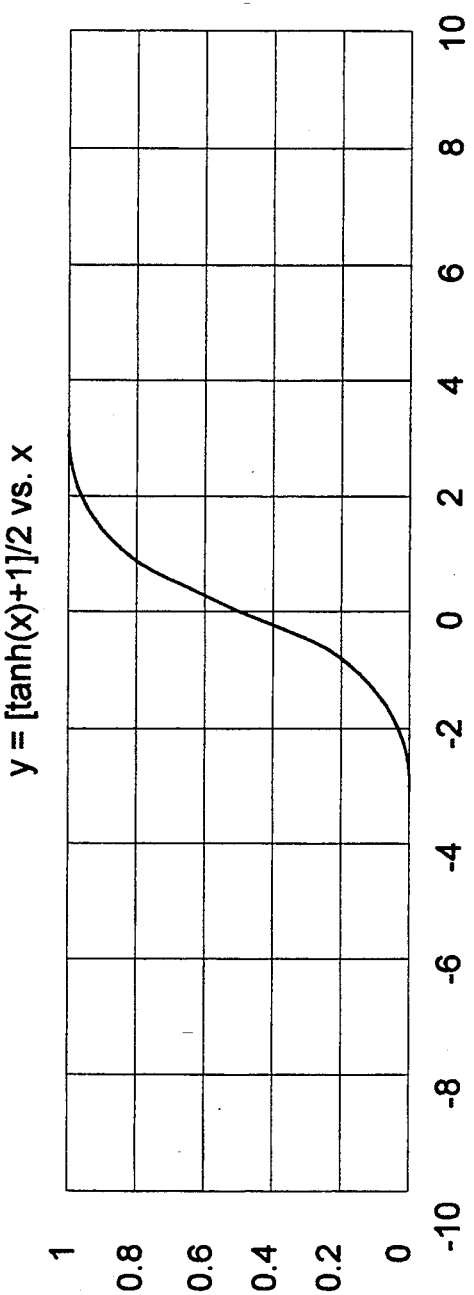
FIG. 4 shows a hyperbolic tangent function.
Figure 6:
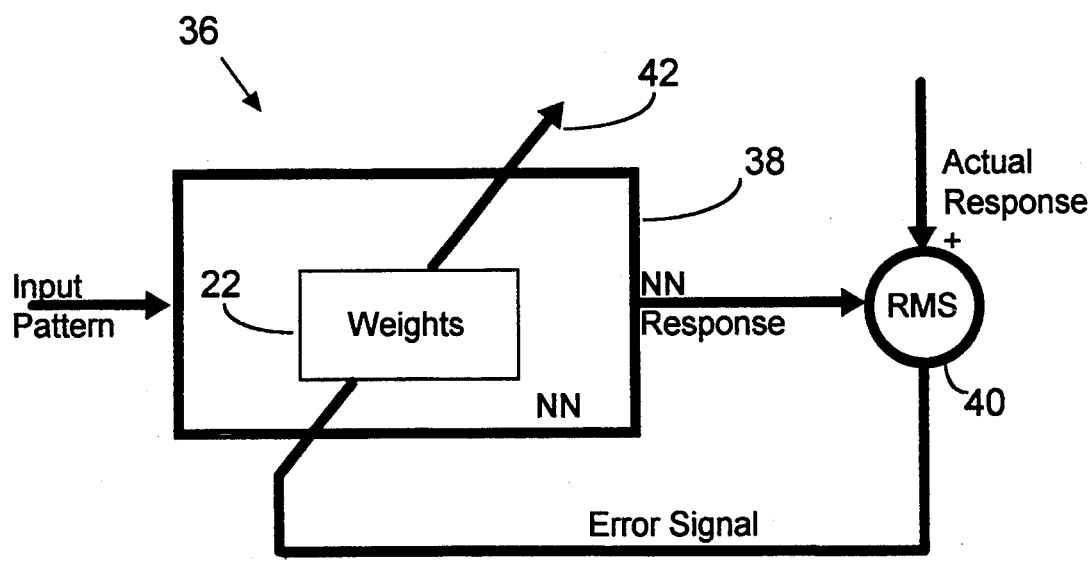
FIG. 6 shows a basic back propagation neural network.
Figure 8:
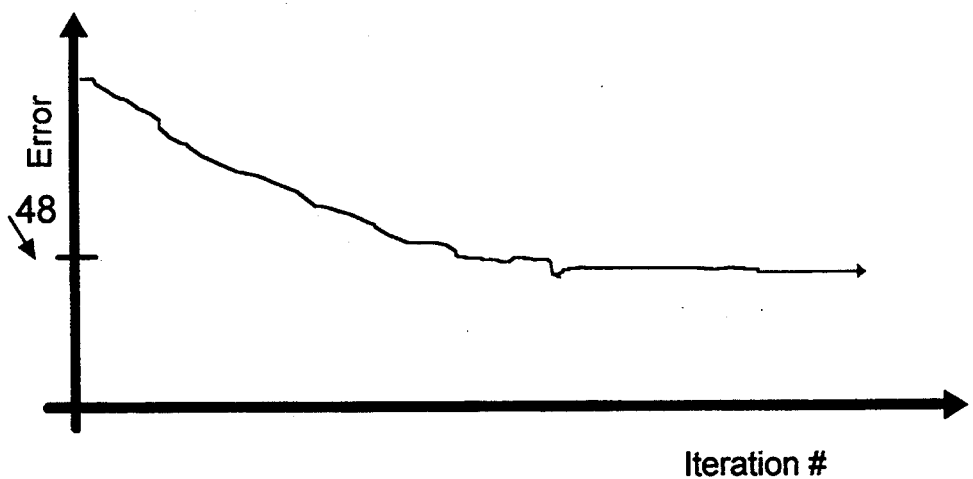
FIG. 8 shows a general reduction of error as iterations of the neural network training increases.
Figure 9:
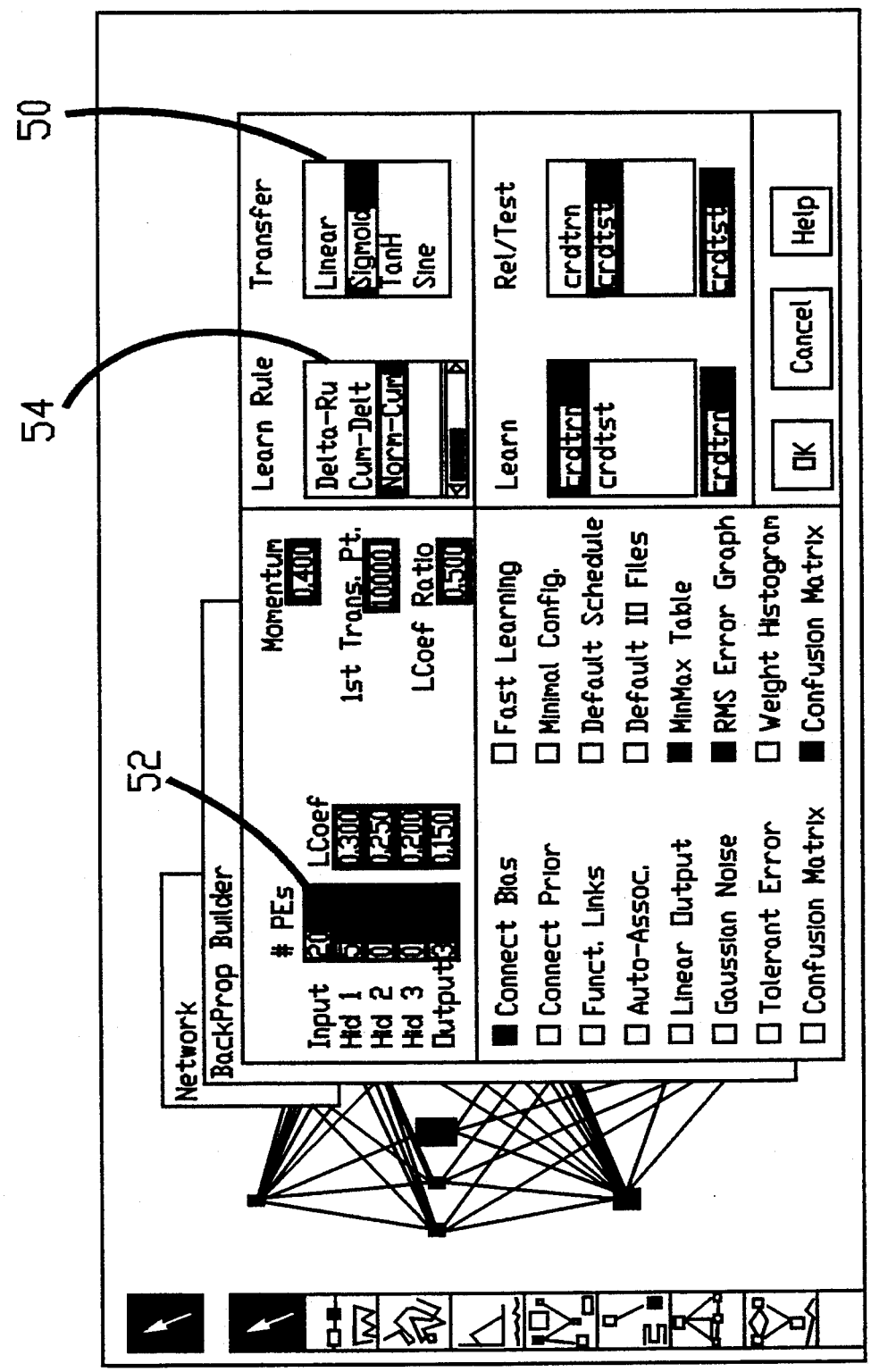
FIG. 9 illustrates a window of a graphical interface of a neural network software application.
Figure 10:
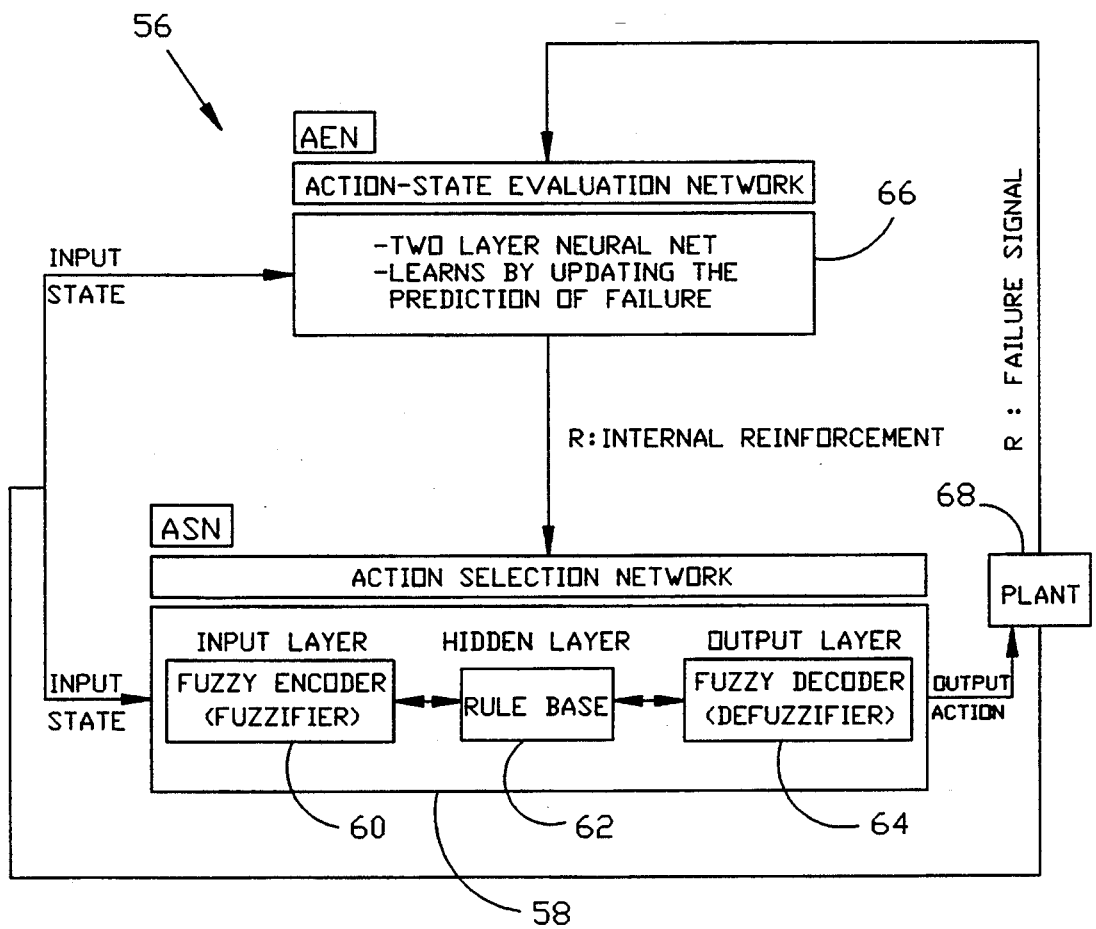
FIG. 10 illustrates a hybrid system architecture.

As illustrated in FIG. 13 in conjunction with FIGS. 5–6 the neural network predictor 72 includes a neural network 84 having a plurality of artificial neurons clustered in a hierarchial three layer configuration. Information signals flow in a feed forward direction from the input layer neurons 86 to the output layer neurons 88 through the hidden layer neurons 90. In the preferred embodiment, the neural network 84 of the present invention includes 11 nodes in the input layer 86, 1 node in the output layer 88, and between 50 and 100 nodes in the hidden layer 90. A number of parameters are input to the input layer 86, including the number of monthly services requests $p_1(k)$, $p_2(k)$, etc. of priority 1, 2, etc. respectively, of the month having a month index k. In the present invention, the neural network 84 performed optimally for each month using D/24 nodes in the hidden layer 90, as described further below, where D equals the data sample size.

The backpropagation encoding method performs the input to output mapping to train the neural network 84 by minimizing a cost function. This results in interlayer connection weight adjustments according to the error between the predicted and the actual system response. In the preferred embodiment, the root mean squared error is calculated by a root mean squared error generator 40 as shown in FIG. 6. A gradient descent method is employed for weight adjustment by computing the effect on the cost function with respect to the weight variation. The gradient descent method changes the weights to follow the steepest or quickest path or route to a point of minimum error.

In the present invention, the neural network 84 is a backpropagation neural network such as shown in FIG. 6 for training in a supervised learning mode. The backpropagation neural network operating in the supervised learning mode was employed to decrease the effects of the inherent system nonlinearities. The prediction error from the neural network predictor 84 is found to be less than the error from a comparable linear regression scheme. The distinct advantages of this configuration are that the neural network is trainable on line and the desired or known output to the neural network 84 is the actual system response. Thus, the neural network's training is performed in the region of interest of the output vector domain.

An initial linear regression algorithm was utilized to reveal possible data clustering and examine the interdependencies of the dependent data input parameters. The resulting variance of the prediction error was large and suggesting possible enhancements of service operations.

The parameters affecting the response time during a given month are:
1) the emergency pending calls labelled as priority 1;
2-6) the pending calls of priority 2 through 6 (listed separately);
7) the minimum daily weather temperature;
8-9) the regular and extra (overtime) manpower;
10) the day of week (weekend vs. weekday);
11) the day of the month (reflecting historical trends and peak periods);
12) the service request call creation time classified in three time frames (morning and afternoon, evening, night);
13-14) the geographical area and division within which the service call is placed;

15) the priority of the service request, e.g., the type of job to be serviced.

To simplify training and eventual use of the trained neural network predictor 72, the neural network predictor 72 generates a distinct prediction configuration according to: a) the priority of the service request, and b) the geographical area and division. Furthermore, prediction configurations are generated for service-request peak periods which may be more than 500 calls per day per division, and for nonpeak periods.

The linear regression analysis also indicated that better predictions may be obtained by generating prediction configurations for each geographic region, for each priority classification of the service request, and for each service request call creation time. Thus, the input data is sorted during the prefiltering stage, as described below, to be separated according to geographic region, priority of the service request, and request creation time. The remaining parameters 1 to 11 listed above are input to the neural network's input layer 86, as shown in FIG. 13.

The actual response times are also input to an error generator of the neural network predictor 72 and so is not an input to the input layer 86.

At time k, the input vector to the input layer 86 includes the following data input fields:

$$\Theta(k) = [w(k), p_1(k), \ldots p_6(k), \tau_m(k), x_m(k), d_m(k), d_w(k)]$$
$$= \theta_1(k), \theta_2(k), \ldots \theta_{11}(k)$$

where the index k refers to a time index, measured in days or fractions of days, and 1. $w(k)$ is the minimum weather temperature for this day;
2. $p_1(k), \ldots, p_6(k)$ are the pending jobs of priorities 1 through 6 at the time when the request was placed;
3. $\tau_m(k)$ and $x_m(k)$ are the available manpower and overtime manpower, respectively, for the time frame where this request was initiated; and
4. $d_m(k)$ and $d_w(k)$ correspond to the day of this particular month and week, respectively.

The neural network predictor output $y(k)$ is derived in such a way that the quadratic cost function $$E(k) = \tfrac{1}{2}\epsilon^2(k) = \tfrac{1}{2}[y_d(k) - y(k)]^2$$

between the actual $y_d(k)$ and the estimated response time $y(k)$ at every time instant is minimized. The neural network predictor 72 learns from its input-output data patterns.

A. Encoding the Neural Network

The backpropagation of the neural network predictor 72 performs the input $\Theta(k)$ to output $y(k)$ mapping at every time instant k according to the following set of relationships.

The input layer neuron activations, i.e. the outputs of each node in the input layer 86 are filtered and propagated to the hidden layer neurons 90 as:

$$p_h(k) = f\left(\sum_{i=1}^{I} \theta_i(k)\, z_{i,h}(k)\right) h = 1, \ldots H$$

where I = number of Inputs + 1(bias) and H is the total number of neurons in the input and hidden layers respectively, f is the nonlinear filtering function, $z_{i,h}(k)$ is the connection weight between the $i^{th}$ and $h^{th}$ neurons in the input and hidden layers respectively, and $p_h(k)$ corresponds to the $h^{th}$ hidden neuron at time k. In the preferred embodiment, the number of inputs is 11 and so I equals 12. It is empirically determined in the present invention to have the relation I·H + H·(number of output nodes)≅(data sample size)/2≅$p_2(k)$/2 since $p_2(k)$ is the number of requests that were received by the service provider during the $k^{th}$ month for a specific division, geographic area, and time frame. Since there is only one output node, i.e. only one output which is the predicted response time, solving for H results in H approximately equal to $p_2(k)$/24. Similarly, the hidden layer neuron activations are filtered and propagated to the neural network output as:

$$y(k) = f\left(\sum_{h=1}^{H} m_h(k)\, p_h(k)\right)$$

where $m_h(k)$ is the interlayer connection weight between the $h^{th}$ neuron in the hidden layer 90 and the neural network output layer 88.

B. Learning By The Neural Network

During the learning process, the output error E(k) is minimized through adaptation of the hidden layer neuron connection weights using the gradient descent method as:

$$\delta m_h(k+1) = -\alpha \frac{\partial E(k)}{\partial m_h(k)} = -\alpha \frac{\partial E(k)}{\partial y(k)} \frac{\partial y(k)}{\partial m_h(k)}$$
$$= \alpha[y_d(k) - y(k)] \frac{\partial y(k)}{\partial m_h(k)}$$
$$= \alpha[y_d(k) - y(k)] \frac{\partial f\left(\sum_{h=1}^{H} m_h(k) p_h(k)\right)}{\partial m_h(k)}$$

where $\alpha$ is the learning coefficient expressed as a step size along the learning surface. A large value of $\alpha$ provides an initially fast convergence. However, it may not provide convergence to a locally optimal value in the steady state behavior of the training due to ripple effects in the gradient descent. In the preferred embodiment, $\alpha$ equals 0.35.

In the preferred embodiment, the sigmoid function $f(x) = (1 + e^{-x})^{-1}$ is utilized as the transfer function, i.e. the nonlinear activating function, so $$\frac{df(x)}{dx} = f(x)(1 - f(x)) = f(x) - (f(x))^2$$

and the previous equation may be written as $$\delta m_h(k+1) = \alpha[y_d(k) - y(k)]p_h(k) \times$$
$$\left[f\left(\sum_{h=1}^{H} m_h(k)p_h(k)\right) - \left(f\left(\sum_{h=1}^{H} m_h(k)p_h(k)\right)\right)^2\right]$$
$$= \alpha[y_d(k) - y(k)]p_h(k)y(k)[1 - y(k)]$$

This process is repeated to modify the input layer weights as depicted in FIG. 6. Using the chain rule twice in succession (backpropagating the local error), the weight adjustment relationship is:

$$\delta z_{i,h}(k+1) = -\alpha \frac{\partial E}{\partial z_{i,h}} = -\alpha \frac{\partial E}{\partial p_h} \frac{\partial p_h}{\partial z_{i,h}}$$

-continued $$= -\alpha \frac{\partial E}{\partial p_h} \frac{\partial f\left(\sum_{i=1}^{I} \theta_i(k) z_{i,h}\right)}{\partial z_{i,h}}$$

$$= -\alpha \frac{\partial E}{\partial p_h} p_h(k)[1 - p_h(k)]\theta_i(k)$$

$$= -\alpha \frac{\partial E}{\partial p_h} \frac{\partial f\left(\sum_{h=1}^{H} m_h p_h\right)}{\partial p_h} p_h(k)[1 - p_h(k)]\theta_i(k)$$

$$= \alpha[y_d(k) - y(k)]y(k)[1 - y(k)]m_h p_h(k)[1 - p_h(k)]\theta_i(k)$$

The input and hidden layer weights are adjusted according to the above equations as:

$$m_h(k + 1) = m_h(k) + \delta m_h(k + 1) \quad h = 1, \ldots H$$

$$z_{i,h}(k + 1) = z_{i,h}(k) + \delta z_{i,h}(k + 1) \quad i = 1, \ldots I;$$

$$\text{and } h = 1, \ldots H.$$

The above equations outline the backpropagation artificial neural network learning method.

Figure 24:
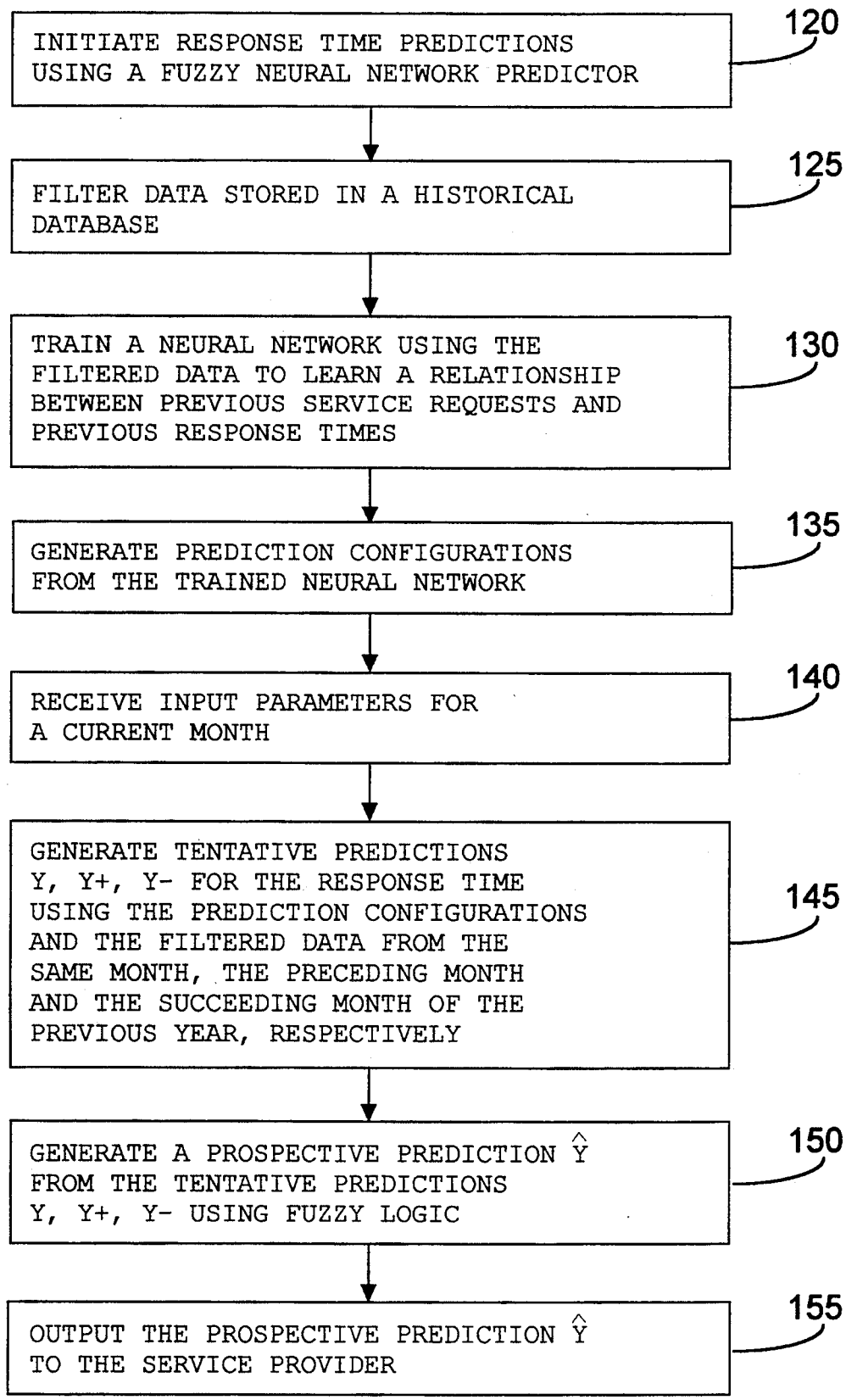
FIG. 24 illustrates the method of operation of the present invention.

As shown in FIG. 24, the present invention includes a method using the fuzzy neural network predictor 70 for predicting a prospective response time of a service provider to a current service request, comprising the steps of storing historical data in step 125, including previous response times to correspondingly previous service requests; learning from the historical data a relationship between the previous service requests and the previous response times in step 130; and generating a plurality of weights as prediction configurations from the learned relationship in step 135.

In step 145, input parameters are input, from which the prospective response time is generated in step 150 from the current service request and from the plurality of weights using the neural network. The prospective response time is then output to the service provider in step 155.

As shown in FIG. 25, the step of training or learning further comprises the steps of assigning weights to a plurality of processing elements of the neural network in step 165; inputting a known input as a test input to the neural network in step 170; generating a test output from the test input using the weights in step 175; and generating an error by comparing the test output and a known output corresponding to the known input in step 180. The weights are adjusted in step 190 using the error; and the training is repeated until the error is below a predetermined error value as determined by step 185.

In the preferred embodiment, the predetermined error value is an RMS error of 2 hours for predictions of response times to service requests. In an alternative embodiment, the training may be repeated until the sum of squared errors is less than twelve times the square of the number of total service requests pending. For training the neural network predictor 72, as many as 5000 iterations of the input historical data through the neural network predictor 72 are required to adequately train the neural network predictor 72 to predict response times to service requests within the predetermined error limit.

II. THE FUZZY LOGIC CLASSIFIER

To account for further data reliability, a fuzzy logic classifier was used. The neural network predictor 72 predicts a response time for every record per geographic region, time frame, and month. For example, for a total of 4 divisions each one divided into 4 geographic areas, 3 distinct time frames and 9 months there are a total of 432 produced algorithms. Few data samples make the prediction more unreliable. In other words, although the neural network converges and produces small errors for a particular data sample (e.g. October, Division 1, Area 2, Morning time frame) it may not provide an accurate estimate for the same data sample for the next year period. This is attributed to the different characteristics of each data sample (different weather conditions, etc.).

The fuzzy logic classifier 74 relies upon a Fuzzy Cell Space Predictor (FCSP) scheme to supervise the overall identification scheme. For every record, the fuzzy logic classifier 74 computes the prediction estimate for its corresponding month (i.e. October), computes the prediction estimate for its neighboring months (i.e. September and November) for the same input pattern, and computes the prediction estimate for the next time frame (i.e. morning and evening). Then the fuzzy logic classifier 74 utilizes the centroid or Center of Gravity method described above to smooth the different prediction estimates to obtain a crisp non-fuzzy result.

For possible data variations between the same monthly period over different years, a fuzzy method that characterizes whether the current month (e.g. October 1993) has 'similar' characteristics as the same month in the previous year (i.e. October 1992) or neighboring months of the previous year (i.e. September 1992, November 1992) is thus employed. Instead of predicting one response due to the current month, the responses from the neural network predictor 72 that apply to the neighboring months are also computed.

Referring back to FIG. 11, the neural network predictor 72 makes a response time prediction Y for a current month of, for example, October 1993 based on October 1992 data, also makes response time predictions Y+ and Y− for neighboring months November 1993 and September 1993, respectively, based on the November 1992 and September 1992 data, respectively. As shown in FIG. 11, the predictions Y, Y+, and Y− are each input to the fuzzy logic classifier 74.

If the fuzzy logic classifier 74 decides that the current period (i.e. October 1993) matches more closely one period (i.e. November 1992) from last year's statistics, the November 1993 prediction Y+ weighs more heavily in the decision process in generating the final predicted response time Y from the fuzzy neural network predictor 70 that corresponds to the current month.

The term 'close' requires a fuzzy description of the system characteristics. The proposed scheme should be capable of distinguishing the instances where the attributes of this month resemble the attributes of last year's other monthly periods.

The attributes are characterized in terms of the following parameters: 1) average monthly temperature $T_{AVE}$, 2) distinct temperature drops DTD (needed to account for the beginning of the heating period), 3) amount of no-heat calls received $N_{NH}$, 4) unusual events $U_E$ (e.g. winter blizzards), and 5) the current day of the month. A measure of month resemblance $m_S$ is established which includes these attributes. This quantity is also affected by human expertise $H_E$ and is typically of the form:

$$m_S = g(T_{AVE}, DTD, N_N, U_E, H_E)$$

where g is a nonlinear function. This nonlinear function is very sensitive to variations in $U_E$ and $H_E$. The human operator can modify $m_S$ by altering $H_E$. A large value for $H_E$ indicates that the operator considers that this month is very similar to last year's same monthly period. Conversely, small values for $H_E$ indicate that this year's month and last year's month are very different. Similarly, a large value for $U_E$ evidences a period of peculiar weather characteristics (e.g. December 1992 winter blizzard conditions). The date within this month affects the membership function of the fuzzy sets which are defined later.

The current month's attributes measured as $m_c$ are compared to the statistical ones $m_S$ in terms of the $l_2$ error norm as:

$$l_2(m_{cs}) = \| m_c - m_S \|_2$$

A small value for $l_2(m_{cs})$ indicates that this monthly period is similar to the one compared. The same error norm is computed with respect to the statistics of the neighboring months as:

$$l_2(m_{cs+}) = \| m_c - m_{S+} \|_2$$

$$l_2(m_{cs-}) = \| m_c - m_{S-} \|_2$$

where the s+ and s− correspond to the next or previous monthly period respectively. As an example, if c corresponds to October then s+ is associated with November and s− is associated with September.

A similar procedure is applied for the creation time of the service request. All service requests placed between 7:30 a.m. till 3:30 p.m. (3:31 p.m. till 11:59 p.m.) correspond to the morning or evening time frame respectively. However, if a request is initiated before these time boundaries, it may be serviced during the next time frame. Consider, for example the situation of a service call placed around 3 p.m. Although from the time creation point of view this request corresponds to the morning time frame, it will be serviced during the evening time frame. The response time is predicted for both time frames (morning and evening), and the fuzzy logic classifier 74 uses the centroid or Center of Gravity method to account for this time overlapping. The shape of the membership functions signifies this time overlapping and the characteristics of the individual time frames.

In the preferred embodiment, the fuzzy logic classifier 74 is implemented as customized software programs. For example, the present invention implements the fuzzy logic classifier 74 in object code compiled from a program called FUZZY written in FORTRAN which is included in the attached Appendix. Equivalent software programs written in other computer languages such as C may be used for the fuzzy logic classifier. Alternatively, the fuzzy logic classifier 74 may be implemented using specialized fuzzy logic microprocessor chips known in the art.

The fuzzy logic classifier 74 thus acts as an adaptive fuzzy weighing predictor having a fuzzy weighing gain vector $G_{3\times 1} = [G_1, G_2, G_3]$ in cascade with the neural network predictor 72. The fuzzy weighing gain $G_{3\times 1}$ is adjusted according to the attributes of the current monthly period and the time initiation of the service request.

The fuzzy logic classifier 74 shown in FIG. 11 includes a fuzzifier 92 or fuzzification interface, a knowledge base 94 including a fuzzy data base 96 and a rule base 98 or decision making logic, a defuzzifier 100 or defuzzification interface.

The fuzzifier 92 maps a noisy measurement to fuzzy sets within certain input universes of discourse. The knowledge base 94 is used to manipulate fuzzy data in the fuzzy data base 96 and to apply prediction policy rules or linguistic prediction rules in the rule base 98 in a fuzzy logic environment. The rule base 98 infers fuzzy logic prediction actions based either on a fuzzy model of the process or on expert experience. The defuzzifier 100 yields a deterministic prediction input from an inferred prediction action.

The rule base 98 is central to the fuzzy logic classifier 74, since the inference engine functions of the rule base 98 are not governed by the conventional single-valued logic. Instead, the decision making is based on fuzzy or multi-valued logic due to lack of ability in identifying with certitude the membership of an input element to the rule base 98.

A fuzzy weighing prediction law employed in the present invention relies on cell output space fuzzy prediction. The decision rule base 98 is designed to operate independent of human expertise. The basic idea of the cell state space is to represent the input space, which contains an infinite number of points, by a finite number of cells. The proper weighing predictor gain vector $G_{3\times 1}$ is inferred according to the cell which is currently activated and the assigned membership functions.

The fuzzification interface or fuzzifier 92:

1. computes on-line the month similarity norms $l_2(m_{cs})$, $l_2(m_{cs+})$, $l_2(m_{cs-})$;
2. performs a scale mapping on these norms $(l_2(m_{cs})) \to \hat{l}_2$, $(l_2(m_{cs+})) \to \hat{l}_{2+}$ and $(l_2(m_{cs-})) \to \hat{l}_{2-}$.

This necessitates an error norm normalization procedure with respect to the highest considerable values $l_2^{max}(m_{cs})$, $l_2^{max}(m_{cs+})$, $l_2^{max}(m_{cs-})$ so that these norms may obtain:

$$\hat{l}_2 = \frac{l_2(m_{CS})}{l_2^{max}(m_{CS})}$$

$$\hat{l}_{2+} = \frac{l_2(m_{CS+})}{l_2^{max}(m_{CS+})}$$

$$\hat{l}_{2-} = \frac{l_2(m_{CS-})}{l_2^{max}(m_{CS-})}$$

with the highest norm values $l_2^{max}(m_{cs})$, $l_2^{max}(m_{cs+})$, $l_2^{max}(m_{cs-})$ can be determined a priori using basic engineering judgment for the worst case scenario; and 3. converts the normalized norms into a fuzzy singleton within the input space:

$$[\hat{l}_2 \times \hat{l}_{2+} \times \hat{l}_{2-}] = [0 \ldots 1] \times [0 \ldots 1] \times [0 \ldots 1]$$

universe of discourse. A fuzzy singleton is a precise value and hence no fuzziness has been introduced by the fuzzification operator in this case.

The fuzzification operator interprets the inputs $\hat{l}_2 \hat{l}_2 > \hat{l}_{2-}$ as fuzzy sets $\hat{L}_2, \hat{L}_{2+}, \hat{L}_{2-}$ respectively, with membership functions equal to zero everywhere except at the current error norm point at which the membership function equals to one. The labels or linguistic descriptions assigned to these fuzzy sets are related to their physical 'matching' interpretation as VERY CLOSE, CLOSE, MODERATE, AWAY, FAR AWAY, etc.

The fuzzy data base 96 of the knowledge base 94 provides the necessary definitions for defining fuzzy data manipulations. The rule base 98 defines the prediction policy through a set of linguistic prediction rules. The representation of the input parameters with fuzzy sets requires the quantification of this information in the fuzzy database 96 for further processing.

The universe of discourse of the input space $[\hat{I}_2 \times \hat{I}_{2+} \times \hat{I}_{2-}]$ is quantized into several segments. The universe of discourse for the first, second, and third error norm is quantified into J, K, and M segments, respectively. A fuzzy set $\{\hat{L}_{2j}, \hat{L}_{2+,k}, \hat{L}_{2-,m}\}$ is then defined by assigning membership functions and therefore grade of memberships to each segment:

$$\hat{I}_{2j}, j=1, \ldots J; \hat{I}_{2+,k} \ k=1, \ldots K; \hat{I}_{2-,m} \ m=1, \ldots M.$$

Figure 14:
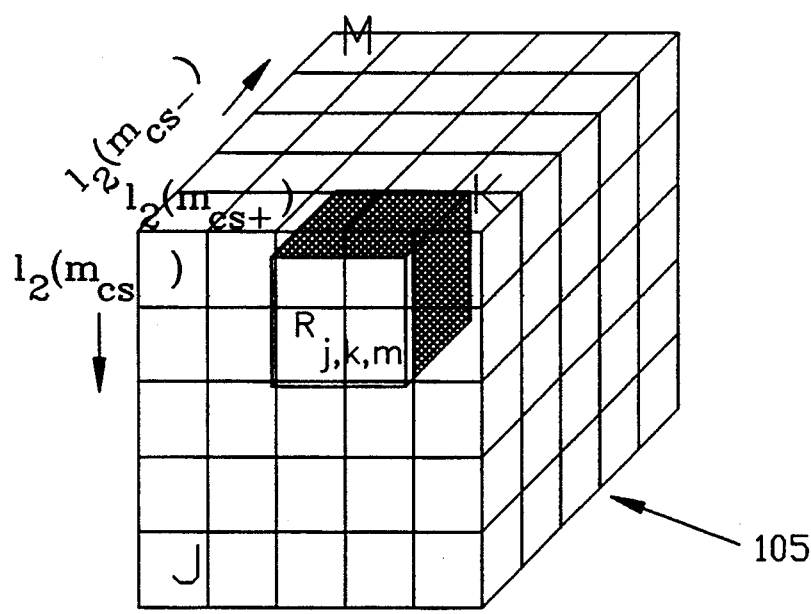
FIG. 14 illustrates a fuzzy cell control space.

These segments or regions constitute the linguistic cells, as shown in FIG. 14. Typically every fuzzy set or cell in its individual universe of discourse 105 is characterized and thus labelled by its center point $\hat{I}_2^c, \hat{I}_{2+}^c, \hat{I}_{2-}^c$ where $\hat{I}_2^c \in [\hat{I}_{2,1} \ldots \hat{I}_{2,J}]$, $\hat{I}_{2+}^c \in [\hat{I}_{2+,1} \ldots \hat{I}_{2+,K}]$, and $\hat{I}_{2-}^c \in [\hat{I}_{2-,1} \ldots \hat{I}_{2-,M}]$ for each of the first, second, and third error norms, respectively; and its membership functions $F\hat{I}_{2j}=1, \ldots J; F\hat{I}_{2+,k}=1, \ldots K;$ and $F\hat{I}_{2-,m}=1, \ldots M$ for the current monthly period norm, and for the neighboring monthly norm partitions, respectively.

Figure 15:
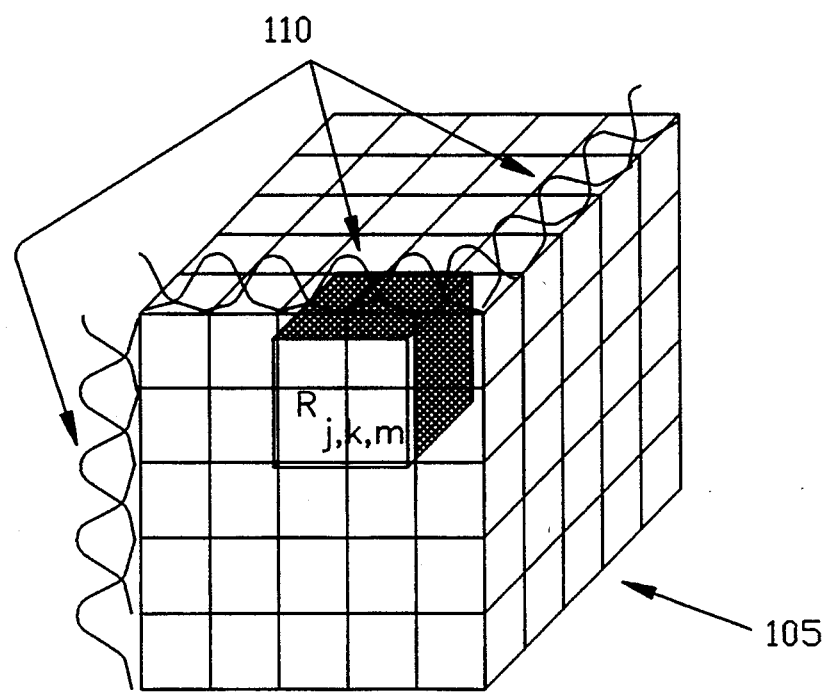
FIG. 15 illustrates membership functions of the universe of disourse of the fuzzy cell control space.

The shape of the membership functions reflect the functional definition of a fuzzy set within its universe of discourse. The choice of shape was based on the subjective criteria of decision. In the present invention Gaussian-shaped membership functions 110 are used to represent the grade of membership for each fuzzy set as in FIG. 15. Given the fuzzy partition of the universes of discourse 105, the membership function graphic representation is shown in FIG. 15.

The rule base 98 contains the sets of fuzzy prediction rules formulated as linguistic statements that characterize the actions of the fuzzy logic classifier 74. Fuzzy prediction rules are in the form of IF-THEN-ELSE statements, with their derivation based on the expert experience about the open-loop system and the prediction engineering knowledge for the effects of the prediction action. To proceed with the construction of the fuzzy rule base 98, a number of overlapping regions, each representing a fuzzy prediction rule, is imposed on the partitioned domain of interest of the state space. The predictor gain implication rule R for the (j,k,m) cell is written as follows:

$R_{j,k,m}$: if $(\hat{I}_2$ is $\hat{L}_{2j})$ and $(\hat{I}_{2+}$ is $\hat{L}_{2+,k})$ and $(\hat{I}_{2-}$ is $\hat{L}_{2-,m})$ then $G_{3\times 1}$ is $G_{j,k,m}$.

The fuzzy rule justification relies upon the aim of the proposed prediction weighing law. The objective is to reduce the error due to dissimilarities between the data as quantized on a monthly basis. The universe of discourse for the fuzzy gain was selected as $G_{3\times 1} \in [0,1] \times [0,1] \times [0,1]$. The expert rules are as follows:

1) If the attributes of the current month are 'similar' to those of last year's same month, then $G_i \rightarrow 1, i=1, 2, 3$, where $\rightarrow$ indicated a mapping of each $G_i$ to 1. The predicted response from the current month is the dominant prediction response and the fuzzy logic classifier 74 modifies the prediction response accordingly.

2) If the current month is 'different' from last year's same month, then $G_i < 1, i=1, 2, 3$. The fuzzy logic classifier 74 essentially averages in a nonlinear manner the predicted responses of the neural network predictor 72 for the neighboring months.

The fuzzy descriptions like 'similar' or 'different' are defined in terms of the month similarity norms $I_2, I_{2+}, I_{2-}$.

The problem of incompatibility between the same labels designated by each norm is handled by maintaining the previous fuzzy gain deduction. For example, in the case where the current month of the current year (e.g, October 1993) is very similar to all neighboring months during last year (i.e. September, October, November 1992) then each of $\hat{I}_2, \hat{I}_{2+}, \hat{I}_{2-} \rightarrow 1$. The rule base 98 subsequently utilizes the following rule:

if the similarity norms indicate some kind of 'confusion' because of the incompatibility of the monthly norm fuzzy set labels, then maintain only the current months's predicted response.

The derived rules are consistent with the human expertise. The rule base is complete since the number of rules is $J \times K \times M$, thus assigning one for each cell of the three dimensional rule base.

Given the current error norms, the fuzzy logic classifier 74 infers the predictor gain fuzzy sets and their grade of memberships $(G_{j,k,m}, F_{j,k,m})$ associated with each rule of the rule base 98. Since there is only one rule related to each cell of the rule base 98, the decision making logic of the rule base 98 infers the predictor gain fuzzy sets by progressing sequentially through the stored rules. The grade of membership $F_{j,k,m}$ is decided using the classical interpretation for the sentence connective AND as:

$$F_{j,k,m} = min \ (F\hat{I}_{2j}, F\hat{I}_{2+,k}, F\hat{I}_{2-,m}).$$

For defuzzification, the fuzzy logic rules specified within the rule base 98 infer several fuzzy predictor outcomes. The defuzzifier 100 maps the space of the inferred fuzzy prediction actions from each rule into a space of crisp or non-fuzzy predictor gains. The defuzzification method infers the crisp gain vector valued $G_i$ through the center of gravity (COG) method according to:

$$G_{3\times 1} = \frac{\sum_{j=1}^{J} \sum_{k=1}^{K} \sum_{m=1}^{M} \rho_{j,k,m} F_{j,k,m} G_{j,k,m}}{\sum_{j=1}^{J} \sum_{k=1}^{K} \sum_{m=1}^{M} \rho_{j,k,m} F_{j,k,m}}$$

where $\rho_{j,k,m}$ is a constant used for scaling and weighing the importance of each rule. In the COG method, the contribution of each fuzzy output rule $G_{j,k,m}$ is proportional to the membership value associated with that rule.

The output of the fuzzy logic classifier 74 may overall be considered as a mapping from the current monthly similarity estimates $I_2, I_{2+}$, and $I_{2-}$ to its predictor gain $$G_{3\times 1} = G_{3\times 1} \ (I_2, I_{2+}, I_{2-}).$$

The final predicted response time is $$\hat{Y} = G_1 \ Y_- + G_2 \ Y + G_3 \ Y_+$$

where $G_i, i=1,2,3$, is the $i^{th}$ component of the G vector, and $Y_-, Y$, and $Y_+$ correspond to the predictions $Y_-, Y$, and $Y_+$, respectively input to the fuzzy logic classifier 74 from the neural network predictor 72 for the corresponding three months predicted from the data of the previous year.

Figure 26:
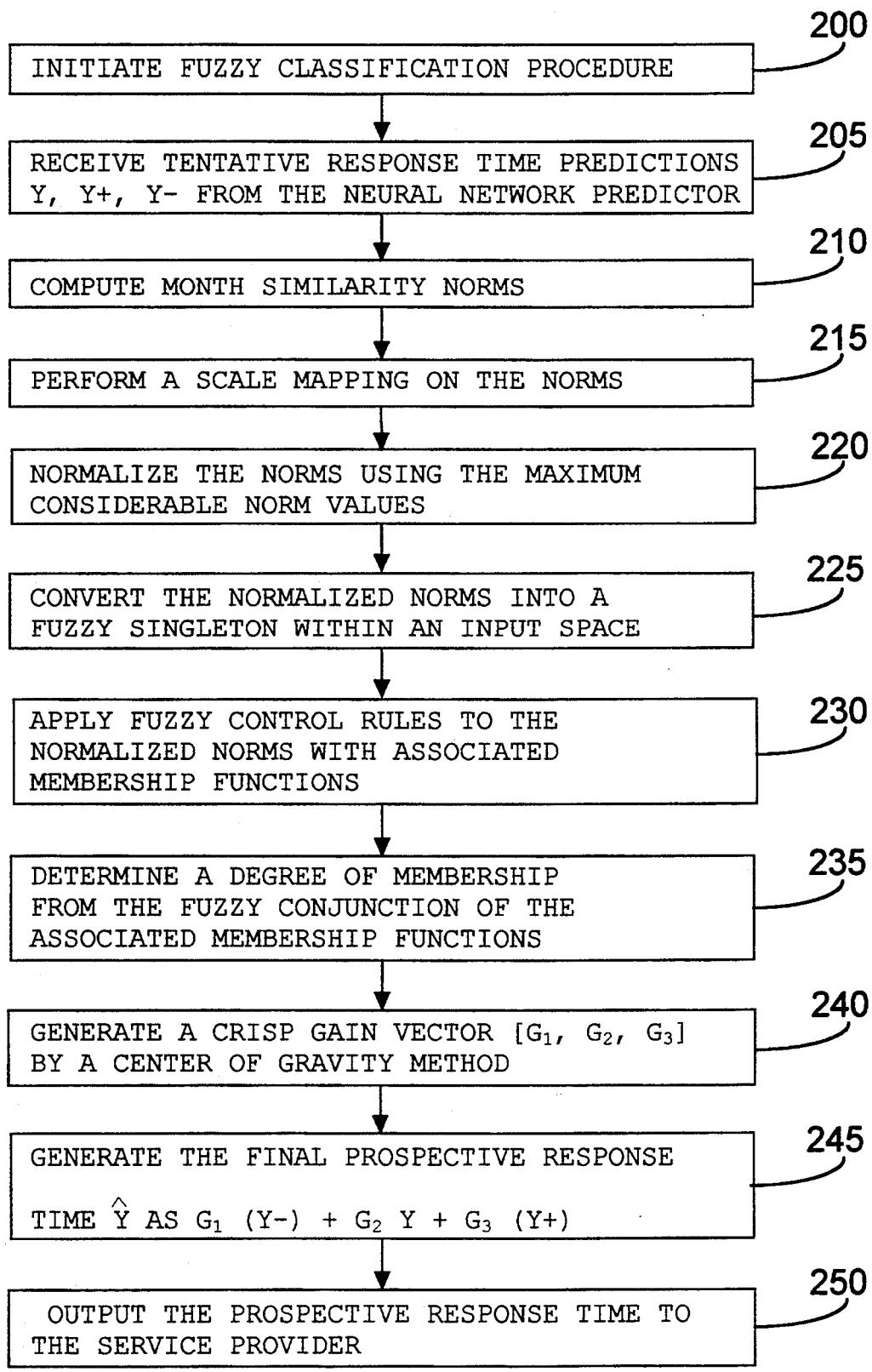
FIG. 26 illustrates the operation of the fuzzy logic classifier.

The present invention employs the method in FIG. 26 to perform the above described fuzzy classification procedure using the fuzzy logic classifier 74, including the steps of receiving the tentative response time predictions Y, Y+, and Y− from the neural network predictor 72, computing month similarity norms in step 210, performing a scale mapping on these norms in step 215, and normalizing the norms using the maximum considerable norm values in step 220. The normalized norms are then converted in step 225 into a fuzzy singleton within an input space, and fuzzy prediction rules are applied to the normalized norms with associated membership functions in step 230.

The degree of membership is determined in step 235 from the fuzzy conjunction; i.e. the fuzzy AND operation of the associated member ship functions, and crisp gain values $G_i$ as components of the fuzzy gain vector $G_{3 \times 1}$ are generated in step 240 by the Center of Gravity method. The final prospective response time $\hat{Y}$ is generated in step 245 as $$\hat{Y} = G_1 Y_- + G_2 Y + G_3 Y_+$$

and the prospective response time is output to the service provider in step 250.

III. THE DATA FILTER

The historical database 78 of the service provider includes a plurality of records having data on weather, service requests, response times, etc. The data filter 76 sorts, manipulates, and converts the historical data to a format for use by the neural network predictor 72. Some of the data is discarded as irrelevant or incomplete for the purposes of prediction. Other data is discarded or modified in order to be more efficiently processed by the neural network predictor 72.

The data filter 76 includes a plurality of programs, written in C, called TRANS.C, SHRINK.C., DIVIDE.C., SORT.C, and NEURAL.C., which are disclosed in the attached Appendix, along with addition programs described further below.

TRANS.C accepts input file TAPE.BIN in which the data from the database 78 is stored, and outputs to output file OUTFILE. SHRINK.C accepts input file OUTFILE and outputs to output files DIV. 1, DIV.2, DIV. 3, DIV.4. DIVIDE.C accepts input file DIV.I, I=1–4 and outputs to output files DIV. I.9X, DIV.I.9X, DIV.I.9X, X=1–3. SORT.C accepts input file DIV.I.9X and outputs to output file DIV.I.9X. NEURAL.C accepts input file DIV. I.9X and outputs to output file DATA.NEU.

The type of job requested by the customer, the date and time the job was completed, the geographical position of the customer, etc. are included in the database 78. From this vast amount of information, the data that is useful is extracted.

To use the information stored in the historical files it is also necessary to generate new data from the old information. For example, the data filter 76 computes the number of jobs pending at the time when a new service request was initiated. This is meta-information; i.e. information about or derived from previous information, that is not directly stored in the database 78 but is useful for predictions by the neural network predictor 72.

In an exemplary embodiment, for a database 78 storing data in an IBM VM format, the main data types used in the historical record fields are:
a) Character (Strings) stored in consecutive bytes in IBM EBCDIC code.
b) Integer: an unsigned integer in 4 consecutive bytes in Hexadecimal format.
c) Date: same as Integer above, corresponding to the number of days passed since Jan. 1, 1900.
d) Time: a signed integer in 4 consecutive bytes in an internal decimal format; for example, 12:07:01 is stored as 01 20 70 1C.

In the present invention, the data was transformed from an IBM VM format to an IBM UNIX format for use on an IBM UNIX system. First, the character set is changed from EBCDIC to ASCII. In addition the number representations between the two systems are different. IBM VM uses the so-called internal hexadecimal representation which in the last 4 bits of the 4th byte used to represent an integer, puts character 'C' to represent a positive sign.

For the convenience of future use and processing by the neural network predictor 72 and statistical analysis programs, the VM data file format is converted into a C data structure. For example, the data field was separated into three fields: year, month, date. Use of a common data format simplifies the performance of the neural network predictor 72, while the translation retains the original data accuracy and information content. Files in a C data structure are also advantageous for writing fast historical data processing programs e.g. to compute the pending jobs at a given time, or to sort the records according to the starting point of their pending period.

In the present invention, the data filter 76 has a record defined as a complex STRUCT type in C, and uses the same abbreviation for each field name. The definition of a record in the internal C data structure is illustrated at the beginning of TRANS.C in the accompanying Appendix, with the names of the C structure fields kept similar to the original names.

Having defined the data structure in C, the data translation is performed as follows:
a) Characters or strings: copy byte by byte, and convert each byte into ASCII from EBCDIC code;
b) Integer: Copy the value directly into the appropriate unsigned integer field;
c) Date: in C, this field is divided into three subfields: YEAR which contains the number of years from 1900; MONTH which contains the month number within the range of 1 . . . 12; and DAY which contains the date in the month within the range of 1 . . . 31;
d) Time: for convenience, this field is divided into three subfields, Hour, Minute and Second.

Some of the data fields have erroneous data values. To avoid such values, a series of simple tests are concurrently performed based on the field definitions or meaning of the data. For example, year values greater than 2000 are not accepted (at present), nor are division numbers greater than 4. Similarly, the time values are checked. More filter tests taking advantage of the expertise of technicians of the service provider are also performed at later stages of the historical data processing.

The program that reads the VM input, translates it, and creates the predetermined C data structure is called TRANS.C and is listed in the Appendix. The input of this program is a binary file named TAPE.BIN. The output file of TRANS.C is called OUTFILE. This program also allows for collective translation of records. While running, TRANS.C asks the user for the number of records to be skipped and for the number of records to be translated. The user may process, if needed, only part of the large historical file. When this program is processing a particular record, an index number referenced from the beginning of the file is shown on the screen. The produced OUTFILE is a binary file.

Records may be viewed in this format using an auxiliary program PEEKL.C also listed in the Appendix. Records are viewed using their index number from the beginning of the file. The program asks the user to select a record to be viewed, and a reply input of, for example, '100' causes the program to display the 100$^{th}$ record from the top of the file. The program terminates upon an input of '0'.

For the weather data, a plurality of forecast data may be available including the weather temperature for a given day. For days that have more than one forecast, the latest forecast data of that day is used. From the weather data only the minimum temperature is extracted. To expedite the extraction process, a data entry program utility called WP.C, listed in the Appendix, allows entry of weather data.

The data is recorded in a UNIX ASCII file as tuples, while ASCII is the format used by the neural network predictor 72. Each tuple has the following format:

<YY MM DD MIN MAX AVG> where the number of characters indicates the filed length, i.e. 'YY' is a 2 digit long field. Another utility called ITOA.H converts integers to character strings and is used by WD.C.

The WD.C program first asks for the name of an output file to receive processed weather data. It then checks if a file by the given name already exists. If this is true, WD.C prints the last five records of the existing file and appends the entered data at the end of the file; otherwise WD.C creates a new output file. Before the data entry starts a reminder of the available commands is printed on the screen. At any time the user instead of entering a real value may enter the command 'quit' or 'edit'. The 'quit' command ends the data entry. The record at which the command is entered is discarded and the program exits. The 'edit' command also discards the values of the record at which the command was entered. In this case data entry continues at the beginning of the record in question. In this way the user may correct an error during the entry process.

At the end of any record the program requests confirmation. At this point anything but 'y' discards the record just entered, and data entry continues with a new record. As soon as data has been entered in some record (e.g. the first one in a data entry process) the WD.C program automatically generates the next date for the next record. Assuming that data is provided for continuous days, entry time and work effort is saved. In case that the calculated date is not the desired one (for example, actual data for this date is missing) the data may be discarded by issuing the 'edit' command described above. Date, month and year are entered as 2 digit numbers. Temperatures may be entered as 3 digit (positive or negative) numbers.

As the output file is a regular ASCII file, any modification regarding some record already entered can be accomplished easily using a text editor. For compilation files WD.C and ITOA.H should reside in the same directory.

In an exemplary embodiment, there are normally two manpower data entries per day, i.e. one for the morning and one for the afternoon shift. The manpower for a given shift is in turn divided in two fields: regular manpower (including the working customer service foremen, the customer service technicians, and the customer service specialists) and extra manpower (including all qualified employees from others categories).

Both weather and manpower data are in ASCII format in a file according to the following schema: {Minimum temperature, Regular Manpower/morning shift, Extra Manpower/morning shift, Regular Manpower/afternoon shift, Extra Manpower/afternoon shift}.

The SHRINK.C program listed in the Appendix gets the file OUTFILE as an input file and produces four service-area files with reduced record lengths. Another filter test is applied by SHRINK.C. In the original VM file a special field on the beginning of each record, namely the OUT_FILE_STATUS field, indicates if the record corresponds to a completed job (if it is set to 1). Program SHRINK.C discards records whose OUT_FILE_STATUS field is not 1.

In the exemplary embodiment, SHRINK.C outputs four output files: DIV.1, DIV.2, DIV.3, and DIV.4, each containing short records whose length is reduced to about 100 bytes. This program also gives the user the opportunity to process only part of the records from the beginning of the original input file. It therefore asks the user for the number of records needed to be reduced. As before, when this program is processing a particular record, its index number (from the beginning of the file) is shown on the screen. Placing the data in this compressed format is also advantageous for the neural network processing to attain faster convergence.

The neural network needs the data per year and in a sorted order according to the starting time of the pending period. A special program called DIVIDE.C divides each division data file into, for example, three year files such as data for 1991, 1992 and 1993. The separation is accomplished by using the ORDER_COMPLETION_DATE field. For example, the program will divide the division data file DIV.1 for a first division into files DIV.1.91, DIV.1.92, DIV.1.93. The division data file is specified in the beginning of the program when the user is prompted to input a filename. The program then asks for the size of the input file in records. Dividing the files of each service division by year creates even smaller files that are easily be processed by the UNIX file system since a maximum index for an array in UNIX may be as large as 65536.

In addition a sorting method that appears in program SORT.C sorts the records of each yearly data file according to the starting time of each pending period. The pending period depends on the type of the job. In general, if a job is an appointment it is considered as pending from the time the serviceman is supposed to be at the customer's facility (the appointment FROM time that is kept in the HDR_ORDER_EXECUTE <DATE, TIME> fields). On the other hand, if the job is a forecast job; i.e. a job associated with a service request expecting service within a prospective response time as oppose to a scheduled time, the forecast job counts as pending from the time of the customer's first call which is stored in the HDR_<DATE,-

TIME>_OF_FIRST_CALL fields. If these fields are not present in the record this job is considered pending from 7:00 a.m. of the completion date. The program prompts the user to input a filename; for example, DIV.4.91. Then the program asks for the total number of records to be sorted and produces the sorted output, by replacing the corresponding input file with the sorted data as the output file of the same filename.

The above produced subfiles per division are in binary format. Records can be viewed in this format using the auxiliary program PEEKS.C, also listed in the Appendix. At the beginning the program asks the user to specify a 'database filename'. For example, the user may choose the file DIV.4.91. Then the program asks for an index of a record to be viewed, with an input of '300' causing the 300$^{th}$ record of this file referenced from the beginning of the file to be displayed. A '0' input terminates this program.

For predicting response times by the neural network predictor 72, the data filter 76 calculates the response time for two groups of forecast jobs: those of priority 2 and those of priorities 3, 4, and 5 (as a whole). The data filter 76 also limits calculations of response times to preselected job types designated by job codes. In addition, for a given job for which the response time is to be computed, the number of pending jobs from each priority category 1-6 are determined at the time that this job was generated, i.e. at the starting time of its pending period. This input is needed by the neural network predictor 72 and may also be used for statistical analysis since it indicates the status of the service provider when a new job of interest is created. The input to the neural network follows the schema: {month, date, pending jobs of priorities 1-6 per division area, Minimum temperature, Regular Manpower, Extra Manpower, Response time} for a total of 30 attributes per record. Old response times to old service requests are used to train the neural network predictor 72. There is one record for each job for which a response time is computed. The month parameter indicated the month of creation of the job, and the remainder of the fields represent the number of pending jobs per division area, temperature and manpower when the job representing this record was created.

Two additional filters are applied on the data, before any further processing: if the ORDER_STATUS_2 field is zero, then this is an incomplete job and is discarded from further processing; also if the record is, for example, of job type G98, then it is discarded as well as this job type corresponds to a call that requested some information and no service manpower action was needed. In order to compute the pending jobs from each priority, one should take into account all jobs of a given priority and not only the jobs for which the response time is computed. For example, appointment jobs are included only to compute the pending period for each job.

Records that have valid SVC_DATE_OF_CHANGE_CALL field had some initial job type that was later changed to the appointment job, since in the exemplary embodiment, the data records contain the final state of every record. Such a record corresponds to two jobs: an initial job and a final job. The initial job type kept in field HDR_ORDER_TYPE_OF_FIRST_CALL which was pending from the time it was created, i.e. when the HDR_<DATE,TIME>_OF_FIRST_CALL was filed, until the time it was changed, i.e. the SVR_<DATE,TIME>_OF_CHANGE_CALL field. The final job was the one that was finally completed, and it was of type HDR_ORDER_TYPE, with a pending period of HDR_<DATE,TIME>_ORDER_COMPLETED -HDR_ORDER_EXECUTE_<DATE,TIME>.

An appointment job is considered as pending from the time it is supposed to be completed (the FROM part of the appointment). In case that the information on the TIME_OF_FIRST_CALL is not available, this job is counted as only one pending job of its final type. If this record had a job type which never changed, the pending period is computed as for a normal appointment job.

If an appointment job produces a negative pending period, it may be that the serviceman went to the customer earlier than the agreed time. To take such cases into account, the magnitude of the negative pending period is checked. If it is more than 8 hours, the record is discarded from the computation of pending periods; i.e. assume erroneous data or data entry is assumed. If the pending period is between −8 and 0 hours, a new pending period is computed as (HDR_<DATE,TIME>_ORDER_COMPLETED) - (HDR_<DATE,TIME>_ORDER_IN-ROUTE). If this new pending period is still negative then this record is also discarded.

A similar computation is used for calculating the pending period for a forecast job, with the only difference being which fields are used for this calculation. A normal forecast job is considered pending from the time the customer called, if available in the (HDR_<DATE,TIME>_OF_FIRST_CALL) field until it was completed. If the first call time is not available, 7:00 a.m. of the completion date is deemed the first call time. In general, if a forecast job produces a negative pending period, it is discarded as erroneous data and is not further processed. This is different than for appointment jobs in which the pending period starts much later than the customer's call.

The records are also checked for the extra jobs created under a CHANGE_OF_CALL situation having an initial job type before the call was changed and thus should be counted as a different pending job than the final job that was completed. Therefore, the files produced in the output of program SORT.C are processed again to find the extra pending jobs. This is done in the beginning of the program NEURAL.C. After all pending periods have been computed and sorted in order of the starting pending period, the same program joins each record for the appropriate manpower and weather data file produced earlier to find for each job the weather conditions and manpower when this job started being pending.

The next step of the NEURAL.C program is to compute the response time and the number of pending jobs from each priority for those jobs that a response time is to be computed. In addition, a number of records of jobs may be discarded for periods of incomplete data or of no interest. For example, if no manpower data is available in records before Sep. 16, 1991 and between May 1, 1992 and Aug. 31, 1992, such records may be discarded. However, this data is kept in the calculation of pending periods as they may have affected the pending jobs of later periods. The jobs with priority 1 or greater for which no response time is needed are also discarded. Then the response time is computed for the remaining records as the difference between: HDR_<DATE,TIME>_ORDER_ON_SITE -HDR_<DATE,TIME>_OF_FIRST_CALL.

A job is also considered to have been responded to only when the serviceman is on site. Accordingly, those records that lack the HDR_<DATE,-TIME>_OF_FIRST_CALL field are discarded from the output file and no response time is computed. In addition, for jobs that have been changed after their first call, we compute a single response time, from the time of the first customer, as this is the time the customer is waiting for response.

Jobs that result in negative response times are discarded and not communicated to the neural network or statistical analysis processing. As another filter, if the calculated response time for priority 2 jobs is greater than 72 hours or greater than 168 hours for priorities greater than 2, then the data is assumed erroneous and this job is discarded from further computation. In addition, three more filters were implemented in NEURAL.C regarding response times for non-peak days.

For example, a non-peak day for Queens/Nassau (Division 1), Central (Division 2) and Western Suffolk (Division 3) Divisions may be defined as a day from 0000 Hours to 2359 Hours where 150 or less 'No Heat' (Job Type 75) calls were completed during that time period. For Eastern Suffolk Division (Division 4), a non-peak day may be determined as a day where 50 or less 'No Heat' (Job Type 75) calls were completed during the specified time period. The data filter 76 discards the records with response times that seemed 'unnatural' or irregular for a non-peak day. More specifically, the data filter 76:

1. disregards response times that have calculated response times greater than 12 hours for priority 2 job types that have time of first call HDR_TIME_OF_FIRST_CALL between 0500 hours through 1200 hours. This is based upon an assumption that either the customer was not home when a service person phoned ahead or a call board of the service provider inserted written comments in the Call Board Remarks Field that prevented the service provider service personnel from responding to the job within twelve hours such as 'do after 1500 hours';
2. disregards response times that have calculated response times greater than 24 hours for all priority 2 job types that have time of first call HDR_TIME_OF_FIRST-CALL between 1201 hours through 2359 hours. This is based on the same assumptions for number 1 above; and
3. for all priority 3, 4, and 5 job types, disregard calls that have calculated response times greater than 120 hours.

However, all the records that are discarded from these 3 filters are taken into account in the computation of pending jobs. The final output DATA.NEU file for the neural network predictor 72 contains data in ASCII format for use by the neural network predictor 72.

Figure 27:
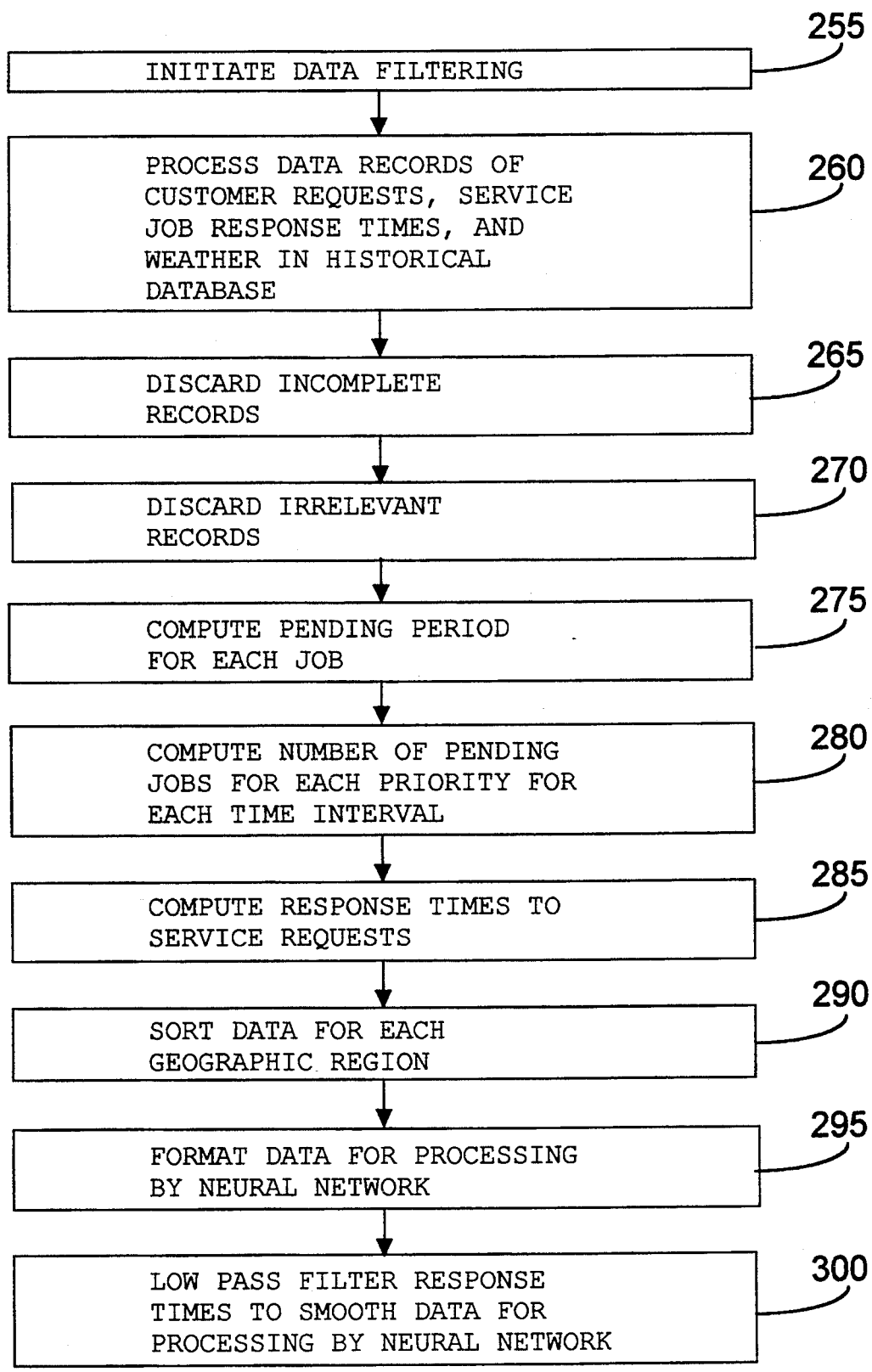
FIG. 27 illustrates the data filtering procedure.

The main steps of the data processing procedure appear in FIG. 27, in which the data records of customer requests, service job response times, etc. from the historical database are processed in step 260. Incomplete records and irrelevant records are discarded in steps 265, 270, respectively, and pending periods for each job are computed in step 275. The number of pending jobs for each priority and for each time interval are computed in step 280, and the response times to service requests are computed in step 285. The processed data is sorted for each geographic region in step 290, and the sorted data are formatted in step 295 for processing by the neural network predictor 72. In addition the NEURAL.C program is capable of providing to a user statistics on the jobs encountered.

After the filtering of the data from the database 78, the input data which been separated from the data records would appear as in FIGS. 16–22 when viewed in reference to the index values. FIG. 16 shows the day of the week within a month. FIG. 17 illustrates pending jobs of priority 1 per index value. FIG. 18 illustrates pending jobs of priority 2 per index value. FIG. 19 illustrates the minimum temperature for each index value, and FIGS. 20–21 illustrate the regular and extra manpower available, respectively, per index value.

FIG. 22 illustrates the raw response times calculated per index value. Prior to processing by the neural network predictor 72, the raw response times may be filtered in step 300 of FIG. 27 by data filter 76 using a low pass filter to smooth the raw response times to a filtered set of response times as shown in FIG. 23. The low pass filtering removes spikes such as spike 115 and extreme values from the response times which would reduce the efficiency of the neural network predictor 72. Through training, the neural network predictor 72 is able to learn relationships from the input data. However, such spikes and extremities in the input response times interfere with the efficient training of the neural network predictor 72 to accurately predict the response times within the predetermined error threshold, so the low pass filtering is used to stabilize and enhance the training and accuracy of the neural network predictor 72.

While the invention has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

425-15

APPENDIX TO

UNITED STATES PATENT APPLICATION

OF

ANTHONY TZES

AND

VASSILIS TSOTRAS

FOR

AN ADAPTIVE SYSTEM AND METHOD FOR
PREDICTING RESPONSE TIMES IN A SERVICE ENVIRONMENT

PROGRAM MAKEFILE

```
CFLAGS=  -s -O -g -lm ann2: ann2.o learn.o reader.o   mio.o makefile net.h
        cc   $(CFLAGS) ann2.o learn.o reader.o   mio.o -lm -o   ann ann2.o: ann2.c net.h makefile
        cc $(CFLAGS)     ann2.c -c learn.o: learn.c net.h makefile
        cc   $(CFLAGS) learn.c -c reader.o: reader.c  makefile
        cc   $(CFLAGS) reader.c -c mio.o: mio.c makefile
        cc   $(CFLAGS) mio.c -c /* **************************************************** */
/* file net.h:  contains definitions for the rbp program */
/*              that uses 64-bit floating point weights  */
/*                                                       */
/*                                                       */
/*                                                       */
/* ****************************************************/ define maxformat 21
define buffsize 257 define WTTYPE double         /* 64-bit floating point */
define WTSIZE 8              /* reals uses 8 bytes */
#define scale(x) x            /* scale not used in real version */
#define unscale(x) x          /* unscale not used in real version */
#define unscaleint(x) x       /* unscaleint not used in real version */
#define NUM_pair 7
#define NUM_POINTS 50
define ImgSize 512 typedef struct patnode
    {
        WTTYPE val;                /* input or output pattern */
        struct patnode *next;      /* pointer to next node */
    } PATNODE;
typedef struct patlist
    {
        int bypass;                /* number of times to bypass pattern */
        PATNODE *pats;             /* the list of patterns */
        struct patlist *next;      /* the next pattern */
    } PATLIST;
typedef struct unit
    {
        short layernumber;         /* layer number of the unit */
        short unitnumber;          /* position within layer */
        double error;              /* to sum error factors */
        WTTYPE oj;                 /* state of activation of node */
        WTTYPE tj;
        double uppererror;         /* to sum the product of sigma and weights from *
                                   /* upper layer                                  *
        double op;                 /* op = function of inputs from previous layer  *
        double netin;              /* the sum of weight * output values from       *
        struct wtnode *wtlist;     /* to list of weights to prev layer */
        struct unit *next;         /* link to next unit in this layer */
    } UNIT;

typedef struct errorpatern
    {
        double data;               /* the value of error */
        struct errorpatern *next;  /* point to next error node */
    } ERRORPATERN;

typedef struct wtnode
    {
```

```c
      int to;
      int from;
      double weight;
      double latestchange;     /* recording past weight change */
      struct wtnode *next;     /* link to next node */
      struct unit *backunit;   /* ptr to unit the weight comes from */
   } WTNODE;

typedef struct layer
   {
      int unitcount;           /* number of units in this layer */
      struct layer *backlayer; /* pointer to previous layer */
      struct layer *next;      /* pointer to next layer */
      struct unit *units;      /* start of list of units in this layer */
      PATLIST *patstart;       /* to the list of patterns */
      PATLIST *currentpat;     /* the current pattern */
   } LAYER;

typedef struct train_node
   {
      double data;
      struct train_node *next;
   } TRAIN_NODE;

typedef struct mindheader
   {
      char function;           /* activation function */
      double learnrate;
   } MINDHEADER;

/* PROGRAM READER.C */
extern FILE *data;
extern int readerror;
extern TRAIN_NODE *register_pattern;
extern int n_pat;
extern unsigned f_debug;

int readch()
{
  int i;

i = getc(data);
  return(i);
} int readint(min,max,command)
int min, max;    /* the minimum and maximum allowed values */
char command;
{
  int sign, number, ch;
  readerror = 0;
/*  sign = scanfordigit();
   if (readerror == 1 || sign == 0)
      {
         readerror = 1;
         texterror();
         return(0);
      }; */
  number = 0;
  ch = readch();
  while (ch == ' ') ch = readch();
  while (ch >= '0' && ch <= '9')
     {
        number = number * 10 + (ch - '0');
        ch = readch();
     };
  ungetc(ch, data);
/* bufferptr = bufferptr - 1;  unget the character */
/* number = sign * number; */
   if (number < min || number > max)
      {
         printf("erroneous value: %d",number);
         if (data == stdin) putchar('\n');
         else printf(" in %c command\n",command);
```

```
            readerror = 1;
        };
    return(number);
} void readpatterns2() /* read in the unregistered patters and save in a */
                    /* sequence pointed by register_pattern */
{
 int filename[20];
 int i;
 FILE *infile;
 TRAIN_NODE *p, *q;
 double train_data;

scanf("%s", filename);
    if ((infile = fopen((char *)filename, "r")) == NULL){
            printf("ERROR: Unable to open %s\n", (char *)filename);
            exit();
    }
    /* read in the number of patterns */
    fscanf(infile, "%d", &n_pat);
    /* read in patterns */
    p = (TRAIN_NODE *)malloc(sizeof(TRAIN_NODE));
    register_pattern = p;
    fscanf(infile, "%lf", &train_data);
    if (f_debug == 1) {
        printf("\nThe following data is passed to input node.");
        printf("\n %lf", train_data);
    }
    register_pattern->data = train_data;
    while (fscanf(infile, "%lf", &train_data)!=EOF ) {
        q = (TRAIN_NODE *)malloc(sizeof(TRAIN_NODE));
        q->data = train_data;
        if (f_debug == 1) {
            printf("\n %lf", q->data);
        }
        p->next = q;
        p = q;
    }
    p->next = NULL;
} void readpatterns3() /* read in the unregistered patters and save in a */
                    /* sequence pointed by register_pattern */
{
 int i = 11;
 TRAIN_NODE *p, *q;
 double train_data;
 int inputdata[10];

n_pat = 1;
    /* read in patterns */
    p = (TRAIN_NODE *)malloc(sizeof(TRAIN_NODE));
    register_pattern = p;
    printf( "1** PLEASE ENTER MONTH -> ");
    scanf( "%d", &inputdata[0]);
    printf("\n");
    register_pattern->data = inputdata[0]/(double)15.0;

printf("2** PLEASE ENTER PRIORITY OF JOB TYPE -> ");
    scanf(" %d", &inputdata[1]);
    q = (TRAIN_NODE *)malloc(sizeof(TRAIN_NODE));
    q->data = inputdata[1]/(double)8.0;
    p->next = q;
    p = q;
    printf("\n");

printf("3** PLEASE ENTER PENDING JOB OF PRIORITY 1 -> ");
    scanf("%d", &inputdata[2]);
    q = (TRAIN_NODE *)malloc(sizeof(TRAIN_NODE));
    q->data = inputdata[2]/(double)15.0;
    p->next = q;
    p = q;
    printf("\n");
```

```c
    printf("4** PLEASE ENTER PENDING JOB OF PRIORITY 2 ->");
    scanf( "%d", &inputdata[3]);
    q = (TRAIN_NODE *)malloc(sizeof(TRAIN_NODE));
    q->data = inputdata[3]/200;
    p->next = q;
    p = q;
    printf("\n");

printf("5** PLEASE ENTER PENDING JOB OF PRIORITY 3 ->");
    scanf("%d", &inputdata[4]);
    q = (TRAIN_NODE *)malloc(sizeof(TRAIN_NODE));
    q->data = inputdata[4]/(double)50.0;
    p->next = q;
    p = q;
    printf("\n");

printf("6** PLEASE ENTER PENDING JOB OF PRIORITY 4 ->");
    scanf("%d", &inputdata[5]);
    q = (TRAIN_NODE *)malloc(sizeof(TRAIN_NODE));
    q->data = inputdata[5]/(double)50.0;
    p->next = q;
    p = q;
    printf("\n");

printf("7** PLEASE ENTER PENDING JOB OF PRIORITY 5 ->");
    scanf("%d", &inputdata[6]);
    q = (TRAIN_NODE *)malloc(sizeof(TRAIN_NODE));
    q->data = inputdata[6]/(double)50.0;
    p->next = q;
    p = q;
    printf("\n");

printf("8** PLEASE ENTER PENDING JOB OF PRIORITY 6 ->");
    scanf("%d", &inputdata[7]);
    q = (TRAIN_NODE *)malloc(sizeof(TRAIN_NODE));
    q->data = inputdata[7]/(double)50.0;
    p->next = q;
    p = q;
    printf("\n");

printf("9** PLEASE ENTER MINIMUM TEMPERATURE ->");
    scanf("%d", &inputdata[8]);
    q = (TRAIN_NODE *)malloc(sizeof(TRAIN_NODE));
    q->data = inputdata[8]/(double)100.0;
    p->next = q;
    p = q;
    printf("\n");

printf("10** PLEASE ENTER REGULAR MANPOWER -> ");
    scanf("%d", &inputdata[9]);
    q = (TRAIN_NODE *)malloc(sizeof(TRAIN_NODE));
    q->data = inputdata[9]/(double)40.0;
    p->next = q;
    p = q;
    printf("\n");

printf("11* PLEASE ENTER EXTRA MANPOWER ->");
    scanf("%d", &inputdata[10]);
    q = (TRAIN_NODE *)malloc(sizeof(TRAIN_NODE));
    q->data = inputdata[10]/(double)40.0;
    p->next = q;
    p = q;
    p->next = NULL;
    printf("\n");
}
```

```c
/*PROGRAM LEARN.C*/
#include <stdio.h>
include "net.h"
#include <math.h>
/* #include <malloc.h> */
include <sys/types.h> extern int readch();
extern short nlayers;
extern int iteration;        /* the number of predefined learning cycles */
extern int interval;
extern LAYER *start, *last;
extern TRAIN_NODE *start_train_pat;
extern double tolerance;
extern char F;               /* function specified for learning */
extern int ch;
extern int n_pat;            /* from ann2.c */
extern double learnR;
extern unsigned f_debug;
extern double alpha;         /* from ann2.c */
extern unsigned M_flag;      /* from ann2.c */ double fun(inX)
double inX;
{
 double d;
 switch(F) {
 case 's': d= 1.0/(1.0+exp(-inX));
         break;
 default : printf("\n No function has been specified ...\n");
         break;
 }
 return(d);
} double FunPline(q)
UNIT *q;
{
 switch(F) {
 case 's': return(q->op*(1 - q->op));
         break;
 default : printf("\n No function has been specified ...\n");
         break;
 }
} void learn(e)
ERRORPATERN *e;
{
 LAYER *p, *prevlayer, *temp_p;
 UNIT *q, *s, *a;
 TRAIN_NODE *r;
 WTNODE *w, *b;
 short int n_layer = nlayers;
 int i ;
 int k = 0;                                  /* indicates which patterns */
 double se;
 ERRORPATERN *total_error, *prev_er, *g;
  r = start_train_pat;
  total_error = e;
 if(total_error == NULL) {
         printf("\n1 total_error = NULL");
         exit(0);
 } while ( r != NULL ) { k++;
 if(total_error == NULL) {
         total_error = e;
 }
 p = start;
 /* readin training pattern to input layer */
 q = start->units;
```

```c
for (i = 0; i < p->unitcount; i++) {
    q->op= r->data;   /* copy training pattern onto input node */
    if (f_debug == 1) {
       printf("\n %f", r->data);
    }
    q = q->next;
    r = r->next;
} temp_p = start;
/* propagate the information throught the nets */
while (temp_p->next != NULL) {
      prevlayer = temp_p;
      temp_p = temp_p->next;
      q = temp_p->units;
      while ( q!= NULL) {
            s = prevlayer->units;
            w = q->wtlist;
            q->netin= 0.0;
            for(i = 0; i < prevlayer->unitcount; i++){

/* calculate the net-input values to layer units */
                 if (f_debug == 1) {
                 printf("\n input = %lf", s->op);
                 }
                 q->netin = q->netin+  w->weight * s->op ;
                 s = s->next;
                 w = w->next;
            }
            if (f_debug == 1) {
            printf("\n netin= %lf", q->netin);
            };
            q->op = fun(q->netin + 0.1);
            if (f_debug == 1) {
            printf("\n funoutput = %lf", q->op);
            }
            q = q->next;
      }
}
/* calculate the difference of desired output and real output */
/* and error term for each unit in the output layer           */
if(total_error == NULL) {
      printf("\n3 total_error = NULL");
      exit(0);
}
 p = last;
 q = p->units;
 total_error->data = 0.0;
 for (i = 0; i < p->unitcount; i++) {
     q->error = r->data - q->op ;
     se = q->error * q->error;
     total_error->data = total_error->data +  se;
     q->error = q->error * FunPline(q);/* the error term for output */
     if (f_debug == 1) {
        printf("\n Pattern %d  output unit %d desired output = %lf  real outpu
        printf("\n Pattern %d  output unit %d squared error = %lf", k, i+1,se)
     }
     q = q->next;
     r = r->next;
 }
 total_error = total_error->next;

prevlayer = last;
 (LAYER *) p = last->backlayer;

/* calculate the error term for each unit in hidden layer */
 while (p->backlayer != NULL) {
     a = prevlayer->units;
     q = p->units;
     while (q != NULL){
            q->uppererror = 0.0;
            q = q->next;
     }
     q = p->units;
```

```
        while (a != NULL) {
              b = a->wtlist;
              while ( b != NULL ) {
                    q->uppererror = b->weight * a->error + q->uppererror;
                    b = b->next;
                    q = q->next;
              }
              a = a->next;
              q = p->units;
        } q = p->units;
        while (q != NULL) { q->error = FunPline(q) * q->uppererror ;
              q = q->next;
        } prevlayer = p;
        p = p->backlayer;
    }

/* update weights in the output layer */
/* and the hidden layer(s)            */
prevlayer = last;
p = prevlayer->backlayer;
while ( p != NULL ) {
      q = prevlayer->units;
      while ( q != NULL) {
            s = p->units;
            w = q->wtlist;
            while ( w != NULL) {
                  switch(F) {
                  case 's':
                        if (M_flag == 1) {
                              w->weight = w->weight + w->latestchange * alpha
                        }
                        w->latestchange = learnR * q->error * s->op;
                        w->weight = w->weight + w->latestchange;
                        break;
                  default : printf("\nNo activation function is specified ");
                        exit();
                        break;
                  };
                  w = w->next;
                  s = s->next;
            }
            q = q->next;
      }
      prevlayer = p;
      p = prevlayer->backlayer;

}
} /* while (r != NULL) */
} void Forward(r)
TRAIN_NODE *r;
{
 FILE *outfile;
 LAYER  *p, *prevlayer, *temp_p;
 UNIT *q, *s;
 WTNODE *w;
 int i = 0, j = 0;
 outfile=fopen("peng.dat","w");
 printf("\nPattern     output");
 p = start;
 while ( r != NULL ) {
 q = start->units;
 /* readin training (or input ) pattern to input layer */
 for (i = 0; i < p->unitcount; i++) {
     q->op= r->data;  /* copy training pattern onto input node */
     if (f_debug == 1) {
         printf("\n %lf", r->data);
     }
```

```c
            q = q->next;
            r = r->next;
    } temp_p = start;
    /* propagate the information throught the nets */
    while (temp_p->next != NULL) {
            prevlayer = temp_p;
            temp_p = temp_p->next;
            q = temp_p->units;
            while ( q!= NULL) {
                    s = prevlayer->units;
                    w = q->wtlist;
                  q->netin= 0.0;
                  for(i = 0; i < prevlayer->unitcount; i++){

/* calculate the net-input values to layer units */ if (f_debug == 1) {
                                printf("\n input = %lf", s->op);
                          }
                          q->netin = q->netin+  w->weight * s->op;
                          s = s->next;
                          w = w->next;
                  }
                  if (f_debug == 1) {
                        printf("\n netin= %lf", q->netin);
                        fprintf(outfile,"%lf\n",q->netin);
                  }
                  q->op = fun(q->netin + 0.1 );
                  if (f_debug == 1) {
                        printf("\n funoutput = %lf", q->op);
                  }
                  q = q->next;
            }
    }
    j++;
    printf("\n%7d", j);
    q = last->units;
    while ( q != NULL ){
            printf("     %2.3lf ", q->op);
            q = q->next;
    }

}
fclose(outfile);
} void onerun()
{
  ERRORPATERN *errors, *q, *s;
  double t;

int n = 0, i, j = 0;

errors = (ERRORPATERN *)malloc(sizeof(ERRORPATERN));
  s = errors;
  for ( i = 1; i< n_pat; i++){
          q = (ERRORPATERN *)malloc(sizeof(ERRORPATERN));
          s ->next = q;
          s = q;
  }
  s->next = NULL;

if (errors == NULL) {
        printf("\n errors = NULL");
        exit(0);
  }
  do {
        learn(errors);
        n++;
        t = 0.0;
        if ((n%interval) == 0 ) printf("\n\ntraining times = %d", n);
```

```
                i = 0;
                s = errors;
        if (s == NULL) {
        printf("\n s = NULL");
        exit(0);
        }
                while (s != NULL) {
                        i++;
                        if ((n%interval) == 0 ) {
                                printf("\nPattern %d error = %2.4f", i, fabs(s->data)
                        } t = fabs(s->data) + t;
                        s = s->next;
                }
        } while ( t > tolerance  &&  n < iteration );
        if (t < tolerance ){
                printf("\nNets converge to the desired after training times = %d", n);
                i = 0;
                s = errors;
                while (s != NULL) {
                        i++;
                        printf("\nPattern %d squared error = %2.4f", i, s->data );
                        s = s->next;
                }
        }
        if ( t > tolerance){
                printf("\n\nNets have not converged yet!!! After training time %d", n)
                i = 0;
                s = errors;
                while (s != NULL) {
                        i++;
                        printf("\nPattern %d error = %2.4f", i, s->data );
                        s = s->next;
                }
        }
    }
}

/* ************************************************** */
/* file ann.c:  contains the main program and network */
/*            creation routines.                      */
/*                                                    */
/*                                                    */
/*                                                    */
/* ************************************************** */ include <stdio.h>
include <sys/types.h>
#include <signal.h>
#include <setjmp.h>
#include <time.h>
#include <math.h>

/*#include <malloc.h>*/
/* #include <gl/gl.h> */
/* #include <device.h> */ include "net.h"

define MAXINT 2147483647
/* #define DEBUG */
extern int readch();                    /* from io.c */
extern double readchar();               /* from io.c */
extern int readint();                   /* from io.c */
extern void onerun();
extern void Forward();                  /* from learn.c */
extern void readpatterns2();            /* from reader.c */
extern void readpatterns3();            /* from reader.c */
/*extern void Drawhyperplane(); */      /* from frame.c  for Iris */
extern void save_v_weit();              /* from mio.c */
extern void restore_v_weit();           /* from mio.c */
int randrang();
/* global variables used in all versions */
```

```
char activation;        /* activation function, p or s */
char backprop;          /* flags whether to back propagate error for */
                        /* units close to their targets */
int bufferend;          /* index of last character in input line */
int bufferptr;          /* position of next character in buffer */
int ch;                 /* general purpose character variable */
char cmdfilename[50];   /* name of file to take extra commands from */
jmp_buf cmdloopstate;   /* to save state in case of a SIGINT */
WTTYPE D;               /* sigmoid sharpness */
FILE *data;             /* file for original data */
char datafilename[50];  /* copy of the data file name saved here */
WTTYPE dbdeta;          /* the initial eta value for the DBD method */
WTTYPE decay;           /* the decay parameter for the DBD method */
char deriv;             /* flags type of derivative to use */
int echo;               /* controls echoing of characters during input */
WTTYPE eta;             /* basic learning rate */
WTTYPE eta2;            /* DSZ learning rate for inner layers */
WTTYPE etamax;          /* the maximum eta for the DBD method */
int extraconnect;       /* flags the use of connections between */
                        /* non-adjacent layers */
int format[maxformat];  /* each value in format indicates where to put */
                        /* a blank for compressed output mode or a */
                        /* carriage return for real output */
UNIT *hlayer;           /* pointer to list of units in second layer */
UNIT *ilayer;           /* pointer to list of units in third layer */
char informat;          /* controls format to read numbers */
WTTYPE initialkick;     /* the range weights are initialized to */
int iter;               /* for counting iterations in one run */
UNIT *jlayer;           /* pointer to list of units in fourth layer */
WTTYPE kappa;           /* the DBD learning parameter */
UNIT *klayer;           /* pointer to list of units in fifth layer */
LAYER *last;            /* has address of the output layer */
int lastprint;          /* last iteration pattern responses printed */
int lastsave;           /* last time weights were saved */
short nlayers;          /* number of layers in network */
int npats;              /* number of patterns currently in use */
char outformat;         /* controls format to print output */
int prevnpats;          /* previous number of patterns, initially 0 */
WTTYPE qmark;           /* value for ? in compressed input */
int readerror;          /* flags an error in reading a value */
int readingpattern;     /* flags reading pattern state */
int saverate;           /* rate at which to save weights */
unsigned seed;          /* seed for generating random weights */
short skiprate;         /* number of times to bypass a learned pattern */
LAYER *start;           /* has address of the input layer */
char summary;           /* flags summary output mode */
WTTYPE theta1;          /* the DBD parameter */
WTTYPE theta2;          /* 1 - theta1 */
WTTYPE toler;           /* value used in testing for completion */
WTTYPE toosmall;        /* weights smaller than toosmall were removed */
#ifdef INTEGER
int totaldiff;          /* totals errors to find average error per unit */
#else
double totaldiff;
#endif
int totaliter;          /* counts total iterations for the program */
int unlearnedpats;      /* number unlearned in last learning cycle */
char update;            /* flags type of update rule to use */
char wtformat;          /* controls format to save and restore weights */
WTTYPE wtlimit;         /* adjustable limit on weights */
char wtlimithit;        /* flags whether the limit has been hit */
int wttotal;            /* total number of weights in use */

/*                              */
/*     */
/*                      */
/*                              */
int interval;           /* interval to report error */
double tolerance;       /* tolerance between real output and desired output */
char F;                 /* function specified for learning */
TRAIN_NODE  *register_pattern;
TRAIN_NODE  *start_train_pat;
int iteration;          /* total number of the learning cycles */
int n_pat;              /* the number of input training patterns */
```

```
    double learnR;            /* the learning rate */
    int lobon, hibon;         /* give a range of weights setting */
    unsigned f_debug;         /* flag for debug information */
    double alpha;             /* monentum term */
    unsigned M_flag;          /* flag for monentum term */ void init()
  {
    F = 's';                  /* set sigmoid function */
    hibon = 10.0;             /* the high bound of weight initialized */
    interval = 1000;          /* every 1000 learning cycles report output */
    iteration = 1000;         /* 1000 learning cycles */
    tolerance = 0.001;
    ch = ' ';
    f_debug = 0;              /* no debug information */
    lobon = 10;               /* default range of -10 to +10 */
    alpha = 0.1;
    learnR = 0.5;             /* learning rate parameter */
    M_flag = 1;               /* flag for momentum, 1 in use, 0 not in use */
  } void setweight(node)
WTNODE *node;
{
  node->weight = (double) randrang(lobon);
  if (f_debug == 1) {
        printf("\n weight = %lf", node->weight);
  }

}
/* randrang - generates random number as positions of points */
/* -------------------------------------------------------- */
int randrang(high)
int high;
{
        static int done = 0;

if (!done) {
                srand(time((time_t *) NULL) % 1000);
                done = 1;
        } return ( (int)(high/2) - (rand() % high) );

}

LAYER *mklayer(prevlayer,n)   /* creates a layer of n units, pointers */
LAYER *prevlayer;             /* and weights back to the units in the */
int n;                        /* previous layer and links this new */
                              /* layer into the list of layers */
{UNIT *front, *p, *q, *bias, *prev, *ptr;
 WTNODE *wfront, *wprev, *w, *temp_p;
 LAYER *lptr;
 int i, j, count;

/* make a list of nodes in this layer */ count = 1;
 front = (UNIT *) malloc(sizeof(UNIT));
 front->unitnumber = count;
 front->layernumber = nlayers;
 prev = front;
 for(i=1;i<n;i++)
    {
      count = count + 1;
      ptr = (UNIT *) malloc(sizeof(UNIT));
```

```
        if (ptr == NULL){
            printf("\nAllocation Failed.");
            exit(0);
        }
        prev->next = ptr;
        ptr->unitnumber = count;
        ptr->layernumber = nlayers;
        prev = ptr;
    };
    prev->next = NULL;

#ifdef DEBUG
printf("\nlabel 1");
#endif

/* make a LAYER node to point to this list of units */ lptr = (LAYER *) malloc(sizeof(LAYER));
    lptr->unitcount = n;
    lptr->patstart = NULL;
    lptr->currentpat = NULL;
    lptr->backlayer = prevlayer;
    lptr->next = NULL;
    lptr->units = front;    /* connect the list of units */

/* return if this is the input layer */ if (prevlayer == NULL) return(lptr);
    prevlayer->next = lptr;

/* If we are working on a deeper layer, for every node in this layer, */
/* create a linked list back to units in the previous layer. */ i = 1;
    q = front;
    while (q != NULL) /* do a weight connection */
        {
        ptr = (UNIT *)prevlayer->units;
        j = 1;
        w = (WTNODE *) malloc(sizeof(WTNODE));
        if (w== NULL){
            printf("\nAllocation Failed.");
            exit(0);
        }
        setweight(w);
        w->to = i;    /* ith position in the present layer */
        w->from = j;  /* jth position in the previous layer */
        q->wtlist = w;
        ptr = ptr->next;
        while (ptr != NULL) { j++;
            temp_p = (WTNODE *) malloc(sizeof(WTNODE));
            if (temp_p == NULL){
                printf("\nAllocation Failed.");
                exit(0);
            }
            setweight(temp_p);
            temp_p->to = i;    /* ith position in the present layer */
            temp_p->from = j;  /* jth position in the previous layer */
```

```
                w->next = temp_p;
                w = temp_p;
                ptr = ptr->next;    /* to keep the number of connections as many as
                                    /* the number of unit in previous layer
        }
ifdef DEBUG
printf("\nlabel 2");
#endif
        w->next= NULL;
        q = q->next;
    } ifdef DEBUG
printf("\nlable 3");
#endif

/* {
        j = 1;                  handle first connection
        p = (UNIT *) prevlayer->units;
        wfront = (WTNODE *) malloc(sizeof(WTNODE));
        wttotal = wttotal + 1;
        (WTNODE *) q->wtlist = wfront;
        wprev = wfront;
        (UNIT *) wfront->backunit = p;
        setweight(wfront,i,j,0);
        p = p->next;
        while (p != NULL)   handle rest of connections
            {
                j = j + 1;
                w = (WTNODE *) malloc(sizeof(WTNODE));
                wttotal = wttotal + 1;
                wprev->next = w;
                (UNIT *) w->backunit = p;
                setweight(w,i,j,0);
                wprev = w;
                p = p->next;
            };
        j = j + 1;
        bias = (UNIT *) malloc(sizeof(UNIT));    create a bias unit
        bias->oj = scalech(1.0);
        bias->layernumber = nlayers;
        bias->unitnumber = 32767;          bias unit is unit 32767
        w = (WTNODE *) malloc(sizeof(WTNODE));  connect to end of list
        wttotal = wttotal + 1;
        wprev->next = w;
        (UNIT *) w->backunit = bias;
        setweight(w,n+2,i,1);
        w->next = NULL;
        q = q->next;
        i = i + 1;
    }; */
    return(lptr);
} void readpatterns()  /* read in the training patters and save in a sequence */
                    /* pointed by start_train_pat */
{
```

```c
int filename[20];
int i;
FILE *infile;
TRAIN_NODE *p, *q;
double train_data;

scanf("%s", filename);
    if ((infile = fopen((char *)filename, "r")) == NULL){
            printf("ERROR: Unable to open %s\n", (char *)filename);
            exit();
    }
    /* read in the number of patterns */
    fscanf(infile, "%d", &n_pat);
    /* read in patterns */
    p = (TRAIN_NODE *)malloc(sizeof(TRAIN_NODE));
    start_train_pat = p;
    fscanf(infile, "%lf", &train_data);
    if (f_debug == 1) {
           printf("\n %lf", train_data);
    }
    start_train_pat->data = train_data;
    while (fscanf(infile, "%lf", &train_data)!=EOF ) {
           q = (TRAIN_NODE *)malloc(sizeof(TRAIN_NODE));
           q->data = train_data;
           if (f_debug == 1) {
                   printf("\n %lf", q->data);
           }
           p->next = q;
           p = q;
    }
    p->next = NULL;
} void help()
{
 switch(ch){
 case 'd': printf(" Usage:");
           printf("          d");
           break;
 case 'D': printf(" Usage:");
           printf("          D [-i] [-u]");
           printf("\nComment: -i print the input value and sum of input.");
           printf("\n          -u no debug information ");
           break;
 case 'h': printf("Usage:");
           printf("          h command");
           break;
 case 'i': printf(" Usage:");
           printf("          i <file>");
           printf("\n Format of input file:");
           printf("\n              n    /* number of training pattern */");
           printf("\n              inputpattern1 inputpattern2 ... inputpattern");
           printf("\n Comment: command i is used to test the <file>");
           break;
 case 'l': printf(" Usage:");
           printf("          l <real>");
           printf("\n Comment: <real> is value of learning rate");
           break;
 case 'm': printf(" Usage:");
           printf("          m number1 number2 number3 ... numberN");
           printf("\n Suggestion:  numberN <= 4\n");
           break;
 case 'M': printf(" Usage:");
           printf("          M [-i] [-u] [-a value]");
           printf("\n Comment: -i set momentum in use.");
           printf("\n          -u get rid of momentum term");
           printf("\n          -a value set momentum equal to <value>\n");
           break;
 case 'n': printf(" Usage:");
           printf("          n filename");
           printf("\n Format of input file:");
           printf("\n              n    /* number of training pattern */");
```

```c
            printf("\n            pattern1 pattern2 ... patternN\n");
            break;
    case 'p': printf(" Usage:");
            printf("        p <command>");
            break;
    case 'q': printf(" Usage:");
            printf(" q       /* quit */\n");
            break;
    case 'r': printf(" Usage:");
            printf("     r n1 n2");
            printf("\n       n1 : the number of training times");
            printf("\n       n2 : interval to report error\n");
            break;
    case 'R': printf(" Usage:");
            printf("       R [filename]");
            printf("\n Comment: [filename] default is 'minddata'.");
            printf("\n This command is used to restor activation function,");
            printf("\n learning rate and weights from [filename].");
            break;
    case 's': printf(" Usage:");
            printf("        s [filename]");
            printf("\n Comment: [filename] default is 'minddata'.");
            printf("\n This command is used to save activation function,");
            printf("\n learning rate and weights from [filename].");
            break;
    case 't': printf(" Usage:");
            printf(" t realnumber\n");
            break;
    default : printf(" No such command\n");
            break;
   }
} void printarg()
{
 switch(ch){
  case 'l': printf("Learning rate = %lf", learnR);
            break;
  case 't': printf("tolerance = %lf", tolerance);
            break;
  case 'M': printf("alpha= %lf", alpha);
            if (M_flag == 1) printf("    in use");
            else printf("    not in use");
            break;
  case 'w': printf("range of weights = [-%d, %d]", lobon, lobon);
            break;
  default : printf("Not available.");
            break;
 }
 printf("\n");
} void restartcmdloop() /* for a SIGINT, restart in cmdloop */
{
 if (data != stdin) ch = EOF;
 signal(SIGINT,restartcmdloop);
 longjmp(cmdloopstate,1);
} void cmdloop()    /* read commands and process them */
{
 int quit= 0, layerno, unitno, layer1, layer2, node1, node2;
 int i, j, itemp, itemp2, mif; /* mif - the flag used for indicating midpoint
 int same_person, prec_point[50], mid_point[50];
 WTTYPE temp, temp2;
 UNIT *u, *n1, *n2, *hunit, *iunit, *junit, *kunit;
 LAYER *p;
 char string[81], unidpersonimage[15], parameter[15];
 WTNODE *w;
 FILE *image_ifp, *ifp4;
 unsigned char *temp_m, temp_flag;
 double patterns, *pattern_attr, temp_var;
```

```
    setjmp(cmdloopstate); /* position to recover from SIGINT */
    do{
restart:
        printf("\n[dDhilmMnpqrRstw]? ");
        while(ch == ' ' || ch == '\n') ch = readch();
        switch (ch) {
case EOF: if (data == stdin) exit(6); else data = stdin;
            printf("taking commands from stdin now\n");
            bufferend = 0;              /* force a read from stdin */
            bufferptr = buffsize + 1;   /* when readch is called */
            ch = ' ';
            goto restart;
/*case 'd': Drawhyperplane();
            break;*/
case 'D': ch = readch();
            while (ch == ' ') ch = readch();
            if (ch == '\n') {
                printf("\nUsage:    D -i ");
                ungetc(ch, data);
            }
            else {
                if (ch == '-') {
                                ch = readch();
                                switch(ch){
                                case 'i': f_debug = 1;
                                        break;
                                case 'u': f_debug = 0;
                                        break;
                                }
                        }
                }.
                break;
                if (p != NULL)
                    {
                    ilayer = (UNIT *) p->units;
                    p = p->next;
                    if (p != NULL)
                        {
                        jlayer = (UNIT *) p->units;
                        p = p->next;
                        if (p != NULL) klayer = (UNIT *) p->units;
                        }
                };
            }
        /*  nullpatterns(); */
        endm: break;
case 'M':
            temp_flag = M_flag;
            temp_var = alpha;
            ch = readch();
            while (ch == ' ') ch = readch();
            if (ch == '\n') {
                printf("\nUsage:    M [-i] [-u] ");
                ungetc(ch, data);
            }
            else {
                do {
                    if (ch == '-') {
                                ch = readch();
                                switch(ch){
                                case 'i': M_flag = 1;
                                        break;
                                case 'u': M_flag = 0;
                                        break;
                                case 's': fscanf(data, "%lf", &alpha);
                                        break;
                                default : ch = 'M';
                                        help();
                                        M_flag = temp_flag;
                                        alpha = temp_var;
                                        goto endM;
                                }
                                ch = readch(); /* forward one position */
                        }
                        else {
```

```
                                        ch = 'M';
                                        help();
                                        M_flag = temp_flag;
                                        alpha = temp_var;
                                        goto endM;
                        }
                        while (ch == ' ')   ch = readch();
                } while ( ch != '\n');
                ungetc(ch, data);
            }
            endM: break;
case 'n': if (start == NULL)
                {
                    printf("the network must be defined first\n");
                    break;
                };
            readpatterns();
            break;
case 'p': ch = readch();
            while (ch == ' ') ch = readch();
            if (ch == '\n') {
                printf(" Usage:");
                printf("          p <command>\n");
                ungetc(ch,data);
            }
            else {
            printarg();
            ungetc(ch, data);
            }
            break;
case 'r': if (start == NULL)
                {
                    printf("the network must be defined first\n");
                    break;
                };
    /*      ch = readch();
            while (ch == ' ') ch = readch();
            if ( ch == '\n') {
                    ch = 'r';
                    help();
                    ungetc(ch, data);
                    break;
            }
            ungetc(ch,data);*/
            iteration = readint(1,MAXINT,'r');
            printf("\n iteration = %d", iteration);
            if (readerror == 1) break;
    /*      while (ch == ' ') ch = readch();
            if ( ch == '\n') {
                    interval = 10000;
                    ungetc(ch, data);
                    break;
            }
            else {
                    ungetc(ch, data);   */
                    interval = readint(1,MAXINT,'r');
                    printf("\n interval= %d", interval);
                    if (readerror == 1) break;
    /*}*/
            onerun();
            break;
case 'R': if (start == NULL)
                {
                    printf("the network must be defined first \n");
                    break;
                }
            ch = readch();
            while (ch == ' ') ch = readch();
            if (ch == '\n')   { /* without file name */
                    restore_v_weit(0);
                    ungetc(ch, data);
            }
            else { /* comes with filename */
                    ungetc(ch, data);
```

```
                restore_v_weit(1);
                ungetc(ch, data);
        };

/* PROGRAM MIO.C */
/**********************************************/
/* Containing the saving and restoring function */
/* for parameters A. neural nets                 */
/*                                               */

/**********************************************/ include <stdio.h>
include "net.h"

extern LAYER *start;
extern double learnR;
extern double tolerance;         /* from ann2.c */
extern double alpha;             /* from ann2.c */
extern char F;

void save_v_weit(i)
int i;
{
 char filename[20];
 FILE *infile;
 MINDHEADER *m;
 LAYER *p;
 UNIT *q, *s, *a;
 WTNODE *w, *b;

switch (i){
 case 0: if ((infile = fopen("minddata", "w")) == NULL)
            {
                printf("File minddata open error\n");
                exit(0);
            }
         break;
 case 1: scanf("%s", filename);
         if ((infile = fopen(filename, "w")) == NULL)
            {
                printf("File minddata open error\n");
                exit(0);
            }
         break;
 }

/* save activation function and learning rate */
fprintf(infile, "%c\n", F);
fprintf(infile, "%1.5lf\n", learnR);
fprintf(infile, "%1.5lf\n", tolerance);
fprintf(infile, "%1.5lf\n", alpha);

/* save weights */
p = start->next;
while ( p != NULL ) {
        q = p->units;
        while ( q != NULL) {
                w = q->wtlist;
                while ( w != NULL ) {
                        fprintf(infile, "%4.5lf\n", w->weight);
                        w = w->next;
                }
                q = q->next;
        }
        p = p->next;
}
 fclose(infile);
} void restore_v_weit(i)
int i;
{
```

```c
char filename[20];
FILE *infile;
MINDHEADER *m;
LAYER *p;
UNIT *q, *s, *a;
WTNODE *w, *b;

switch (i){
case 0: if ((infile = fopen("minddata", "r")) == NULL)
            {
                printf("File minddata open error\n");
                exit(0);
            }
        break;
case 1: scanf("%s", filename);
        if ((infile = fopen(filename, "r")) == NULL)
            {
                printf("File minddata open error\n");
                exit(0);
            }
        break;
}
/* save activation function and learning rate */
fscanf(infile, "%c", &F);
fscanf(infile, "%lf", &learnR);
fscanf(infile, "%lf", &tolerance);
fscanf(infile, "%lf", &alpha);

/* save weights */
p = start->next;
while ( p != NULL ) {
        q = p->units;
        while ( q != NULL) {
                w = q->wtlist;
                while ( w != NULL ) {
                        fscanf(infile, "%lf", &(w->weight));
                        w = w->next;
                }
                q = q->next;
        }
        p = p->next;
}
fclose(infile);
}
case 'h': ch = readch();
          while (ch == ' ') ch = readch();
          if (ch == '\n') {
              printf(" Usage:");
              printf("        h command\n");
              ungetc(ch,data);
          }
          else {
          help();
          ungetc(ch, data);
          }
          break;
case 'i': if (start == NULL)
            {
                printf("the network must be defined first\n");
                break;
            };
          readpatterns2();
          Forward(register_pattern);
          break;
case 'I': if (start == NULL)
            {
                printf("the network must be defined first\n");
                break;
            };
          readpatterns3();
          Forward(register_pattern);
          break;
case 'l': scanf("%lf", &learnR);
          break;
```

```
case 'n': nlayers = 0;
          i =0;
          ch = readch();
          p = NULL;
          while (ch != '\n' && ch != '*') {
                itemp = readint(1,MAXINT,'n');
                if (f_debug == 1) {
                        i++;
                        printf("\nLevel of layer = %d   number of nodes = %d",
                               i, itemp);
                }
                if (readerror == 1) goto endm;
                nlayers = nlayers + 1;
                p = mklayer(p,itemp);
                if (nlayers == 1) start = p;
                ch = readch();
                while (ch == ' ') ch = readch();
                if (ch != '\n' && ch != ' ' && ch != '*') ungetc(ch, data);
          };
          ungetc(ch,data);
          if (f_debug == 1) {
                printf("\nnlayer = %d", nlayers);
          }
          last = p;
          if (last == NULL) printf("\nnetworks not defined\n");
          else {
              p = start;
              p = p->next;
              hlayer = (UNIT *) p->units;
              p = p->next;
              break;
case 'q': quit = 1;
          break;
case 's': if (start == NULL)
              {
                printf("the network must be defined first \n");
                break;
              }
          ch = readch();
          while (ch == ' ') ch = readch();
          if (ch == '\n') {
                save_v_weit(0);
                ungetc(ch, data);
          }
          else {
                ungetc(ch, data);
                save_v_weit(1);
                ungetc(ch, data);
          };
          break;
case 't': scanf("%lf", &tolerance);
          break;
case 'w':
          if (fscanf(data, "%d", &lobon) != 1) {
                printf("\n Error in data");
                exit(0);
          }
          break;

}
    ch = readch();
    while(ch != '\n') ch = readch();
  } while (quit == 0);
} void main(argc,argv)
int argc;
char *argv[];
{
 char *fnamestr, *i;
 FILE *ifp4;

setbuf(stdout,NULL);   /* set unbuffered output */
 if (argc == 1)  /* check for file argument, if any */
    {
```

```
          printf("missing data file name, stdin assumed\n");
          data = stdin;
          *datafilename = '\0';
       }
    else
       if ((data = fopen(argv[1],"r")) == (FILE *) NULL)
          {
             printf("cannot open: %s\n",argv[1]);
             exit(1);
          }
       else /* make a copy of the file name in a global variable */
          {
             fnamestr = argv[1];
             i = datafilename;
             while(*fnamestr != '\0') *i++ = *fnamestr++;
          };
  init();
  signal(SIGINT,restartcmdloop);   /* restart from interrrupt */
  cmdloop();
}
```

Program: *trans.c*

```
/**************************************************************/
/*                                                            */
/*                      TRANS.C                               */
/*  This program is used to translate data file from the VM system into */
/*  a C-structure data file. Input file is under the name "tape.bin". */
/*  Output file is under the name "outfile".                  */
/*                                                            */
/**************************************************************/

/**************************************************************/
/*                                                            */
/*                 DATA   TYPE   DEFINITION                   */
/*                                                            */
/**************************************************************/ include <stdio.h>

/******************** RECORD  DEFINITION ********************/ typedef struct datetype
   { unsigned char year,month,day; };

typedef struct timetype
   { unsigned char hour,minute,second; };

typedef struct datime
   { unsigned char year,month,day,hour,minute,second; };

typedef struct record
   {
      unsigned char     file_st[1];                /*  1 -  1  */
      unsigned int      unq_num;                   /*  2 -  6  */
      struct datetype   or_exe_date;               /*  7 - 10  */
      unsigned char     or_type[3],                /* 11 - 13  */
                        mis_num[10],               /* 14 - 23  */
                        ver_num[2],                /* 24 - 25  */
                        svc_div[1], svc_area[1],   /* 26 - 27  */
                        or_st1[1],or_st2[1];       /* 28 - 29  */
      struct datetype   or_crt_date;               /* 30 - 33  */
      struct timetype   or_crt_time;               /* 34 - 37  */
      unsigned char     tech_num[4];               /* 38 - 41  */
      struct timetype   or_exe_time;               /* 42 - 45  */
      unsigned char     exe_date_type[1];          /* 46 - 46  */
```

```c
        struct datetype     or_cmp_date;           /*  47 -  50 */
        struct timetype     or_cmp_time;           /*  51 -  54 */
        unsigned char       ucad_num[5],           /*  55 -  59 */
                            resi_comm[1],          /*  60 -  60 */
                            or_stype[1];           /*  61 -  61 */
        struct datetype     fst_call_date;         /*  62 -  65 */
        struct timetype     fst_call_time;         /*  66 -  69 */
        unsigned char       ortype_fst_call[3];    /*  70 -  72 */
        struct datetype     lst_call_date;         /*  73 -  76 */
        struct timetype     lst_call_time;         /*  77 -  80 */
        unsigned char       ortype_lst_call[3];    /*  81 -  83 */
        struct datetype     or_disp_date;          /*  84 -  87 */
        struct timetype     or_disp_time;          /*  88 -  91 */
        struct datetype     or_inrut_date;         /*  92 -  95 */
        struct timetype     or_inrut_time;         /*  96 -  99 */
        struct datetype     or_onsite_date;        /* 100 - 104 */
        struct timetype     or_onsite_time;        /* 105 - 107 */
        unsigned char       work_code[5];          /* 108 - 112 */
        unsigned int        fcst_aptt_cnt;         /* 113 - 114 */
        unsigned int        grid_num;              /* 115 - 119 */
        unsigned int        call_ahd_cnt;          /* 120 - 121 */
        struct datime       call_ahd[5];           /* 122 - 161 */
        unsigned char       call_ahd_st[3];        /* 162 - 164 */
        struct timetype     or_time_to;            /* 165 - 168 */
        struct datetype     pri_exe_date;          /* 169 - 172 */
        struct timetype     pri_exe_time;          /* 173 - 176 */
        struct timetype     pri_time_to;           /* 177 - 180 */
        unsigned char       pri_date_type[1];      /* 181 - 181 */
        struct datetype     chg_call_date;         /* 182 - 185 */
        struct timetype     chg_call_time;         /* 186 - 189 */
        unsigned char       ortype_chg_call[3];    /* 190 - 192 */
};

/*********************** EBCDIC CODE TABLE *******************/ unsigned char *EBCDIC="
<(+|&           !$*); -/         |,%_>?            :#@'=\" abcdefghi
jklmnopqr       ~stuvwxyz                          {ABCDEFGHI        }JKLMNOPQR
\\ STUVWXYZ    0123456789|       ";

/*********************** FIELD NAME IN FULL *******************/ unsigned char *fieldname[46]={
        "file-status",          "unique-number",        "order-execute-date",
        "order-type",           "mis-number",           "version-number",
        "service-division",     "service-area",         "order-status-1",
        "order-status-2",       "order-creation-date",  "order-creation-time",
        "tech-num",             "order-execute-time",   "execution-date-type",
        "order-completed-date", "order-completed-time", "ucad-order-number",
        "resi-comm",            "order-subtype",        "first-call-date",
        "first-call-time",      "type-of-first-call",   "last-call-date",
        "last-call-time",       "type-of-last-call",    "order-dispatched-date",
        "order-dispatched-time","order-in-route-date",  "order-in-route-time",
        "order-on-site-date",   "order-on-site-time",   "work-code",
        "forecast-appt-count",  "grid-number",          "call-ahead-count",
        "call-ahead",           "call-ahead-status",    "order-time-to",
        "prior-execute-date",   "prior-execute-time",   "prior-time-to",
        "prior-date-type",      "change-call-date",     "change-call-time",
        "type-of-change-call"
        };

/*              DATA TYPE OF EACH FIELD
```

```
        1=character (string)
        2=unsigned integer
        3=date
        4=time
        5=array of combinition of date and time
*/ unsigned char type[46]={ 1,2,3,1,1,1,1,1,1,1,3,4,1,4,1,3,4,1,1,1,3,4,1,
                        3,4,1,3,4,3,4,3,4,1,2,2,2,5,1,4,3,4,4,1,3,4,1 };

/***** STARTING POSITION OF EACH FIELD IN VM DATABASE FILE ****/ unsigned char start[47]={
                1,2,7,11,14,24,26,27,28,29,30,34,38,42,46,47,51,55,
                60,61,62,66,70,73,77,81,84,88,92,96,100,104,108,113,
                115,120,122,162,165,169,173,177,181,182,186,190,193 };

unsigned char s[193];           /* s contains a VM record in memory */
struct record out;              /* out contains a C record */

/********* ADDRESS OF EACH FIELD IN C DATA STRUCTURE ****/ void **address[46]={
        out.file_st,            &out.unq_num,           &out.or_exe_date,
        out.or_type,            out.mis_num,            out.ver_num,
        out.svc_div,            out.svc_area,           out.or_st1,
        out.or_st2,             &out.or_crt_date,       &out.or_crt_time,
        out.tech_num,           &out.or_exe_time,       out.exe_date_type,
        &out.or_cmp_date,       &out.or_cmp_time,       out.ucad_num,
        out.resi_comm,          out.or_stype,           &out.fst_call_date,
        &out.fst_call_time,     out.ortype_fst_call,    &out.lst_call_date,
        &out.lst_call_time,     out.ortype_lst_call,    &out.or_disp_date,
        &out.or_disp_time,      &out.or_inrut_date,     &out.or_inrut_time,
        &out.or_onsite_date,    &out.or_onsite_time,    out.work_code,
        &out.fcst_aptt_cnt,     &out.grid_num,          &out.call_ahd_cnt,
        &out.call_ahd,          out.call_ahd_st,        &out.or_time_to,
        &out.pri_exe_date,      &out.pri_exe_time,      &out.pri_time_to,
        out.pri_date_type,      &out.chg_call_date,     &out.chg_call_time,
        out.ortype_chg_call
        };

unsigned char monthday[12]={ 31,28,31,30,31,30,31,31,30,31,30,32 };

/*****************************************************************/
/*                                                               */
/*                       SUBROUTINES                             */
/*                                                               */
/*****************************************************************/

/*****************************************************************/
/*                                                               */
/*                    CONVERT CHARACTERS                         */
/*                                                               */
/*      Input: address of fields in C data structure.            */
/*             field index in VM data record.                    */
/*                                                               */
/*  This subroutine copies characters from VM record into C record */
/*      and convert the EBCDIC format into ASCII format.         */
/*                                                               */
/*****************************************************************/
```

```
convert_1(adr,item)
unsigned char *adr,item;
{ unsigned char i,length,c;

length=start[item+1]-start[item];
  for(i=0; i<length; i++) {
   c=EBCDIC[s[start[item]+i]];
   *(adr+i)=c;
  };
}

/*******************************************************************/
/*                                                                 */
/*                      CONVERT   INTEGER                          */
/*                                                                 */
/*         Input: address of fields in C data structure.           */
/*                field index in VM data record.                   */
/*                                                                 */
/* This subroutine translates internal hexidecimal number from VM record */
/*       into C record.                                            */
/*                                                                 */
/*******************************************************************/ convert_2(adr,item)
unsigned int *adr;
unsigned char item;
{ unsigned char i,length,c;
  unsigned int value;

length=start[item+1]-start[item];
  for(value=i=0; i<length; i++) {
    c=s[start[item]+i];
    value=value*100+(c>>4)*10+(c&0xF);
  };
  *adr=(value-12)/10;
}

/*******************************************************************/
/*                                                                 */
/*                      CONVERT   DATE   TYPE                      */
/*                                                                 */
/*         Input: address of fields in C data structure.           */
/*                byte offset of fields in VM data record.         */
/*                                                                 */
/* This subroutine translates date type from VM record into C record. */
/*                                                                 */
/*******************************************************************/ convert_3(adr,first)
struct datetype *adr;
unsigned char first;
{ unsigned char i,length,c;
  unsigned int value,amount;

length=4;                                     /* length of field */
  for(value=i=0; i<length; i++) {
    c=s[first+i];
    value=value*256+(c>>4)*16+(c&0xF);          /* compute # of days */
  };
  if(value>65535)                               /* deal with garbage information */
    { adr->year=adr->month=adr->day=0; return; } adr->year=0; amount=365;                      /* compute year */
  while(value>amount) {
    adr->year+=1; value-=amount;
    amount=365+(((1990+adr->year)%4)==0)-(((1990+adr->year)%400)==0);
  };

adr->month=1; amount=31;                      /* compute month */
  while(value>amount) {
    adr->month+=1; value-=amount;
    amount=monthday[adr->month-1];
    if(adr->month==2)
```

```
      amount+=(((1990+adr->year)%4)==0)-(((1990+adr->year)%400)==0);
  };

adr->day=value;                              /* compute day */
}

/*********************************************************************/
/*                                                                   */
/*                        CONVERT   INTEGER                          */
/*                                                                   */
/*        Input: address of fields in C data structure.              */
/*               byte offset of fields in VM data record             */
/*                                                                   */
/*This subroutine translates time type from VM record into C record. */
/*                                                                   */
/*********************************************************************/ convert_4(adr,first)
struct timetype *adr;
unsigned char first;
{ unsigned char c,d;

c=s[first]; d=s[first+1];
  adr->hour=(c&0xF)*10+((d>>4)&0xF);
  c=d; d=s[first+2];
  adr->minute=(c&0xF)*10+((d>>4)&0xF);
  c=d; d=s[first+3];
  adr->second=(c&0xF)*10+((d>>4)&0xF);
}

/*********************************************************************/
/*                                                                   */
/*                    CONVERT ARRAY OF DATE & TIME                   */
/*                                                                   */
/*        Input: address of fields in C data structure.              */
/*               byte offset of fields in VM data record             */
/*                                                                   */
/*     This subroutine translates CALL AHEAD fields into C record.   */
/*                                                                   */
/*********************************************************************/ convert_5(adr,first)
struct datime adr[5];
unsigned char first;
{ unsigned char i;

for(i=0; i<5; i++) {
    convert_3(&out.call_ahd[i].year,first+8*i);
    convert_4(&out.call_ahd[i].hour,first+8*i+4);
    }
}

/*********************************************************************/
/*                                                                   */
/*                        OUTPUT . CHARACTERS                        */
/*                                                                   */
/*         Input: address of a field in C data structure.            */
/*                length of the field                                */
/*                                                                   */
/*     This subroutine prints fields of characters in C record.      */
/*                                                                   */
/*********************************************************************/ out_c(adr,item)
unsigned char *adr,item;
{ unsigned char i,len;
```

```
     len=start[item+1]-start[item];
     for(i=0; i<len; i++) printf("%c",*(adr+i));
}

/*********************************************************************/
/*                                                                   */
/*                       OUTPUT   DATE                               */
/*                                                                   */
/*            Input: address of a field in C data structure.         */
/*                                                                   */
/*      This subroutine prints fields of date type in C record.      */
/*                                                                   */
/*********************************************************************/ out_date(adr)
struct datetype *adr;
{
   if(adr->day!=0)
     printf("%4d-%2d-%2d",(int)adr->year+1900,adr->month,adr->day);
}

/*********************************************************************/
/*                                                                   */
/*                       OUTPUT   TIME                               */
/*                                                                   */
/*            Input: address of a field in C data structure.         */
/*                                                                   */
/*      This subroutine prints fields of time type in C record.      */
/*                                                                   */
/*********************************************************************/ out_time(adr)
struct timetype *adr;
{
   if(adr->hour+adr->minute+adr->second!=0)
     printf("%2d:%2d:%2d",adr->hour,adr->minute,adr->second);
}

/*********************************************************************/
/*                                                                   */
/*             OUTPUT ARRAY OF COMBINITION OF DATE & TIME            */
/*                                                                   */
/*            Input: address of a field in C data structure.         */
/*                                                                   */
/*      This subroutine prints the CALL AHEAD fields in C record.    */
/*                                                                   */
/*********************************************************************/ out_datime(adr)
struct datime *adr;
{
  if(adr->day!=0) {
     printf("%4d-%2d-%2d   ",(int)adr->year+1900,adr->month,adr->day);
     printf("%2d:%2d:%2d",adr->hour,adr->minute,adr->second);
     }
}

/*********************************************************************/
/*                                                                   */
/*                       OUTPUT   RECORD                             */
/*                                                                   */
/*            Input: record index in the data file                   */
/*                                                                   */
/*      This subroutine prints the complete record in C data file.   */
/*                                                                   */
/*********************************************************************/ output(order)
unsigned int order;
{ int i,j;
```

```
  printf("\n     **********    RECORD #: %d     ********\n\n",order);
  for(i=0; i<46; i++) {
    printf("%30s:    ",fieldname[i]);
    switch(type[i]) {
      case 1: out_c(address[i],i); break;
      case 2: printf("%d",*address[i]); break;
      case 3: out_date(address[i]); break;
      case 4: out_time(address[i]); break;
      case 5: for(j=0; j<5; j++) {
                printf("\n%35c",' ');
                out_datime(out.call_ahd+j); }
              break;
    };
    printf("\n");
  };
  printf("\n\n");
}

/**********************************************************************/
/*                                                                    */
/*                         MAIN   PROGRAM                             */
/*                                                                    */
/**********************************************************************/ main()
{
  unsigned int i,j,k,skip,need;
  FILE *f1,*f2;                              /* file pointers */
  unsigned char *c;                          /* record pointer */
  void **ads;
  int result;

printf("# of records skipped = "); scanf("%d",&skip);
  printf("# of records to be converted = "); scanf("%d",&need);

f1=fopen("tape.bin","r");            /* open files */
  f2=fopen("outfile","w");

fseek(f1,192*skip,0);                /* jump over some records */ for(j=0; j<need; j++) {
    if((result=ferror(f1))!=0) exit();  /* process error */
    fread(s+1,192,1,f1);                /* read a record from VM file */
    for(i=0; i<46; i++) {               /* translate each field */
      ads=address[i];
      switch(type[i]) {
        case 1: convert_1(ads,i); break;
        case 2: convert_2(ads,i); break;
        case 3: convert_3(ads,start[i]); break;
        case 4: convert_4(ads,start[i]); break;
        case 5: convert_5(ads,start[i]); break;
      };
    };

printf("    **********    RECORD #: %d     ********\n",j+skip+1);
    c=out.file_st;                      /* get address of C data structure */
    fwrite(c,168,1,f2);                 /* write record to C data file */
  } fclose(f1); fclose(f2);               /* close files */
}
```

Program: *peekl.c*

```
/**********************************************************************/
/*                                                                    */
/*                         PEEKL.C                                    */
/* This program is used to print out records from the C structures    */
/* file. The input file is named "outfile" (produced by trans.c)      */
/**********************************************************************/
```

```c
/**********************************************************************/
/*                                                                    */
/*                      DATA   TYPE   DEFINITION                      */
/*                                                                    */
/**********************************************************************/ include <stdio.h>

/******************** RECORD DEFINITION ********************/ typedef struct datetype
    { unsigned char year,month,day; };

typedef struct timetype
    { unsigned char hour,minute,second; };

typedef struct datime
    { unsigned char year,month,day,hour,minute,second; };

typedef struct record
    {
        unsigned char       file_st[1];                 /*   1 -   1 */
        unsigned int        unq_num;                    /*   2 -   6 */
        struct datetype     or_exe_date;                /*   7 -  10 */
        unsigned char       or_type[3],                 /*  11 -  13 */
                            mis_num[10],                /*  14 -  23 */
                            ver_num[2],                 /*  24 -  25 */
                            svc_div[1], svc_area[1],    /*  26 -  27 */
                            or_st1[1],or_st2[1];        /*  28 -  29 */
        struct datetype     or_crt_date;                /*  30 -  33 */
        struct timetype     or_crt_time;                /*  34 -  37 */
        unsigned char       tech_num[4];                /*  38 -  41 */
        struct timetype     or_exe_time;                /*  42 -  45 */
        unsigned char       exe_date_type[1];           /*  46 -  46 */
        struct datetype     or_cmp_date;                /*  47 -  50 */
        struct timetype     or_cmp_time;                /*  51 -  54 */
        unsigned char       ucad_num[5],                /*  55 -  59 */
                            resi_comm[1],               /*  60 -  60 */
                            or_stype[1];                /*  61 -  61 */
        struct datetype     fst_call_date;              /*  62 -  65 */
        struct timetype     fst_call_time;              /*  66 -  69 */
        unsigned char       ortype_fst_call[3];         /*  70 -  72 */
        struct datetype     lst_call_date;              /*  73 -  76 */
        struct timetype     lst_call_time;              /*  77 -  80 */
        unsigned char       ortype_lst_call[3];         /*  81 -  83 */
        struct datetype     or_disp_date;               /*  84 -  87 */
        struct timetype     or_disp_time;               /*  88 -  91 */
        struct datetype     or_inrut_date;              /*  92 -  95 */
        struct timetype     or_inrut_time;              /*  96 -  99 */
        struct datetype     or_onsite_date;             /* 100 - 104 */
        struct timetype     or_onsite_time;             /* 105 - 107 */
        unsigned char       work_code[5];               /* 108 - 112 */
        unsigned int        fcst_aptt_cnt;              /* 113 - 114 */
        unsigned int        grid_num;                   /* 115 - 119 */
        unsigned int        call_ahd_cnt;               /* 120 - 121 */
        struct datime       call_ahd[5];                /* 122 - 161 */
        unsigned char       call_ahd_st[3];             /* 162 - 164 */
        struct timetype     or_time_to;                 /* 165 - 168 */
        struct datetype     pri_exe_date;               /* 169 - 172 */
        struct timetype     pri_exe_time;               /* 173 - 176 */
        struct timetype     pri_time_to;                /* 177 - 180 */
        unsigned char       pri_date_type[1];           /* 181 - 181 */
        struct datetype     chg_call_date;              /* 182 - 185 */
        struct timetype     chg_call_time;              /* 186 - 189 */
        unsigned char       ortype_chg_call[3];         /* 190 - 192 */
    };
```

```
/***************** TABLE OF EBCDIC CHARACTERS ***************/ unsigned char *EBCDIC="
<(+|&         !$*); -/         |,%_>?           :#@'=\" abcdefghi      jklmnopqr
-stuvwxyz                      {ABCDEFGHI        }JKLMNOPQR     \\ STUVWXYZ
0123456789|      ";

/**************** FIELD NAME IN FULL **********************/ unsigned char *fieldname[46]={
        "file-status",              "unique-number",          "order-execute-date",
        "order-type",               "mis-number",             "version-number",
        "service-division",         "service-area",           "order-status-1",
        "order-status-2",           "order-creation-date",    "order-creation-time",
        "tech-num",                 "order-execute-time",     "execution-date-type",
        "order-completed-date",     "order-completed-time",   "ucad-order-number",
        "resi-comm",                "order-subtype",          "first-call-date",
        "first-call-time",          "type-of-first-call",     "last-call-date",
        "last-call-time",           "type-of-last-call",      "order-dispatched-date",
        "order-dispatched-time",    "order-in-route-date",    "order-in-route-time",
        "order-on-site-date",       "order-on-site-time",     "work-code",
        "forecast-appt-count",      "grid-number",            "call-ahead-count",
        "call-ahead",               "call-ahead-status",      "order-time-to",
        "prior-execute-date",       "prior-execute-time",     "prior-time-to",
        "prior-date-type",          "change-call-date",       "change-call-time",
        "type-of-change-call"
        };

/******************* FIELD TYPE IN RECORD ******************/ unsigned char type[46]={ 1,2,3,1,1,1,1,1,1,1,3,4,1,4,1,3,4,1,1,1,3,4,1,
                3,4,1,3,4,3,4,3,4,1,2,2,2,5,1,4,3,4,4,1,3,4,1 };

/******************* BYTE OFFSET IN RECORD ****************/ unsigned char start[47]={
            1,2,7,11,14,24,26,27,28,29,30,34,38,42,46,47,51,55,
            60,61,62,66,70,73,77,81,84,88,92,96,100,104,108,113,
            115,120,122,162,165,169,173,177,181,182,186,190,193 };
struct record out;                   /* out contains a long record */

/****************** ADDRESS OF EACH FIELD ***************/ void **address[46]={
        out.file_st,           &out.unq_num,          &out.or_exe_date,
        out.or_type,           out.mis_num,           out.ver_num,
        out.svc_div,           out.svc_area,          out.or_st1,
        out.or_st2,            &out.or_crt_date,      &out.or_crt_time,
        out.tech_num,          &out.or_exe_time,      out.exe_date_type,
        &out.or_cmp_date,      &out.or_cmp_time,      out.ucad_num,
        out.resi_comm,         out.or_stype,          &out.fst_call_date,
        &out.fst_call_time,    out.ortype_fst_call,   &out.1st_call_date,
        &out.1st_call_time,    out.ortype_1st_call,   &out.or_disp_date,
        &out.or_disp_time,     &out.or_inrut_date,    &out.or_inrut_time,
        &out.or_onsite_date,   &out.or_onsite_time,   out.work_code,
        &out.fcst_aptt_cnt,    &out.grid_num,         &out.call_ahd_cnt,
        &out.call_ahd,         out.call_ahd_st,       &out.or_time_to,
        &out.pri_exe_date,     &out.pri_exe_time,     &out.pri_time_to,
        out.pri_date_type,     &out.chg_call_date,    &out.chg_call_time,
        out.ortype_chg_call
        };

unsigned char monthday[12]={ 31,28,31,30,31,30,31,31,30,31,30,32 };

/****************************************************************/
/*                                                              */
/*                        SUBROUTINES                           */
/*                                                              */
/****************************************************************/
```

```
/*********************************************************************/
/*                                                                   */
/*                      OUTPUT   CHARACTERS                          */
/*                                                                   */
/*           Input: address of a field in C data structure.          */
/*                  length of the field                              */
/*                                                                   */
/*     This subroutine prints fields of characters in C record.      */
/*                                                                   */
/*********************************************************************/ out_c(adr,item)
unsigned char *adr,item;
{ unsigned char i,len;

len=start[item+1]-start[item];
  for(i=0; i<len; i++) printf("%c",*(adr+i));
}

/*********************************************************************/
/*                                                                   */
/*                        OUTPUT   DATE                              */
/*                                                                   */
/*           Input: address of a field in C data structure.          */
/*                                                                   */
/*     This subroutine prints fields of date type in C record.       */
/*                                                                   */
/*********************************************************************/ out_date(adr)
struct datetype *adr;
{
   if(adr->day!=0)
      printf("%4d-%2d-%2d",(int)adr->year+1900,adr->month,adr->day);
}

/*********************************************************************/
/*                                                                   */
/*                        OUTPUT   TIME                              */
/*                                                                   */
/*           Input: address of a field in C data structure.          */
/*                                                                   */
/*     This subroutine prints fields of time type in C record.       */
/*                                                                   */
/*********************************************************************/ out_time(adr)
struct timetype *adr;
{
   if(adr->hour+adr->minute+adr->second!=0)
      printf("%2d:%2d:%2d",adr->hour,adr->minute,adr->second);
}

/*********************************************************************/
/*                                                                   */
/*            OUTPUT ARRAY OF COMBINATION OF DATE & TIME             */
/*                                                                   */
/*           Input: address of a field in C data structure.          */
/*                                                                   */
/*     This subroutine prints the CALL AHEAD fields in C record.     */
/*                                                                   */
/*********************************************************************/ out_datime(adr)
struct datime *adr;
{
  if(adr->day!=0) {
     printf("%4d-%2d-%2d   ",(int)adr->year+1900,adr->month,adr->day);
     printf("%2d:%2d:%2d",adr->hour,adr->minute,adr->second);
     }
}
```

```
/******************************************************************/
/*                                                                */
/*                       OUTPUT   RECORD                          */
/*                                                                */
/*          Input: record index in the data file                  */
/*                                                                */
/*     This subroutine prints the complete record in C data file. */
/*                                                                */
/******************************************************************/ output(order)
unsigned int order;
{ int i,j;

printf("\n   **********   RECORD #: %d   *********\n\n",order);
   for(i=0; i<46; i++) {
     printf("%30s:   ",fieldname[i]);
     switch(type[i]) {
        case 1: out_c(address[i],i); break;
        case 2: printf("%d",*address[i]); break;
        case 3: out_date(address[i]); break;
        case 4: out_time(address[i]); break;
        case 5: for(j=0; j<5; j++) {
                  printf("\n%35c",' ');
                  out_datime(out.call_ahd+j); }
                break;
      };
      printf("\n");
   };
   printf("\n\n");
}

/******************************************************************/
/*                                                                */
/*                       MAIN   PROGRAM                           */
/*                                                                */
/******************************************************************/ main()
{
   int i,j,k,skip,need;
   FILE *f1;                          /* file pointer */
   unsigned char *c;                  /* c contains address of record */ printf("# of records to be skiped = "); scanf("%d",&skip);
   printf("# of records to be printed = "); scanf("%d",&need);
   f1=fopen("outfile","r+");                  /* open file */ c=out.file_st;                     /* get address of record */ fseek(f1,168*skip,0);              /* jump over some records */ for(j=skip+1; j<=skip+need; j++) {
      fread(c,168,1,f1);                      /* read in a record */
      output(j);                              /* output record    */
   } fclose(f1);                                /* close file       */
```

Program: *wd.c*

```
-----------------------------------------------------------------
|*                          wd.c                               *|
|*                                                             *|
|*  This utility program enables efficient data entry for      *|
|*  the weather data.                                          *|
-----------------------------------------------------------------
```

```c
#include "stdio.h"
#include "itoa.h"

#define TRUE 1
#define FALSE 0
#define QUIT_COMMAND -1
define EDIT_COMMAND -2 char output_file [25] ;
char reply[10] ;
char command[35] ;
char cyear[10] , cmonth[10] , cdate[10] , cmin[10] , cmax[10] , cavg[10] ;
int year , month , date , min , max , avg ;

int ENTER_DAY = TRUE ;   /* this variable controls if day is entered or
                            calculated */
int ret ;

FILE * fp ;

/* check if entered value is not real value but a command */ int check_command(command)
char * command ;
{
   if (! strcmp(command,"quit")) return QUIT_COMMAND ;
   if (! strcmp(command,"edit")) return EDIT_COMMAND ;
   return 0 ;
}

/* calculate the next day from the current day */ calculate_next_day()
{
   if (date >=1 && date<=27) {date++ ;itoa(date,cdate) ;return;} ;
   if (date == 28 && month == 2) {date=1 ; month=3 ; itoa(date,cdate) ;
                                    itoa(month,cmonth) ;return ;} ;
   if (date ==28 || date==29) {date++ ;itoa(date,cdate) ;return;} ;
   if ((date == 30) && (month == 4 || month == 6 || month == 9 ||
                  month == 11))
   {date=1 ; month++ ; itoa(date,cdate) ; itoa(month,cmonth) ;return ;};
   if (date == 30 ) { date++ ;itoa(date,cdate) ;return; };
   if (date == 31 && month == 12)
   {date=1 ; month=1 ; year ++ ;itoa(date,cdate) ;itoa(month,cmonth) ;
                                    itoa(year,cyear) ; return ;} ;
   if (date == 31) {date=1 ; month++ ; itoa(date,cdate) ;
                                    itoa(month,cmonth) ;return ;};
}

/* calculate and print the next day */ int find_next_day()
{
   calculate_next_day() ;
   printf("\n DATE    : %s",cdate) ;
   printf("\n MONTH   : %s",cmonth) ;
   printf("\n YEAR    : %s\n",cyear) ;
   return 0 ;
}

/* enter day of record */ int enter_day()
{
   int ret_value ;
   printf("\n DATE    : ") ;
   scanf("%s",cdate) ;
   if ((ret_value = check_command(cdate)) != 0) return ret_value ;
```

```c
      printf(" MONTH    : ") ;
      scanf("%s",cmonth) ;
      if ((ret_value = check_command(cmonth)) != 0) return ret_value ;

printf(" YEAR     : ") ;
      scanf("%s",cyear) ;
      if ((ret_value = check_command(cyear)) != 0) return ret_value ;

return 0 ;
}

/* enter temperatures of record */ int enter_temperature()
{
   int ret_value ;
   printf("\n AVG     : ") ;
   scanf("%s",cavg) ;
   if ((ret_value = check_command(cavg)) != 0) return ret_value ;

printf(" MAX     : ") ;
   scanf("%s",cmax) ;
   if ((ret_value = check_command(cmax)) != 0) return ret_value ;

printf(" MIN     : ") ;
   scanf("%s",cmin) ;
   if ((ret_value = check_command(cmin)) != 0) return ret_value ;

return 0 ;
} main()
{
   system("clear") ;              /* clear the screen */
   printf("\n Enter name of output file : ") ;
   scanf("%s", output_file) ;
fp = fopen(output_file,"r") ;
                              /* test if file exists */
if (fp == NULL)
{
   printf("\n %s is a NEW file ", output_file) ;
}
else
{
   printf("\n %s already EXISTS. Last 5 records :\n\n",output_file);
   sprintf(command,"tail -5 %s", output_file) ;
   system(command) ;
   printf("\n New data will be appended at the end of this file") ;
   fclose(fp) ;
} printf("\n") ;
fp = fopen(output_file,"a") ;

/* print a reminder of the available commands */ printf("\n\n     >>>>>>>>>> REMINDER <<<<<<<<<< \n\n");
printf("    * You may enter at any time :\n") ;
printf("        'quit' to exit this program. Current record will
                 be discarded. \n") ;
printf("        'edit' to reenter current record values
                 in case of error. \n\n") ;
printf("    * After entering values of a record the program asks
      for confirmation. Enter 'y' for 'yes' or 'n' for 'no'.\n\n");

/* main loop */ while (TRUE)
{
   if (ENTER_DAY == TRUE) { ret = enter_day() ; }
   else { ret = find_next_day() ; } ;
   ENTER_DAY = FALSE ;
   if (ret == EDIT_COMMAND) { ENTER_DAY = TRUE ; continue ; }
   else if (ret == QUIT_COMMAND) { break ; } ;
```

```
ret = enter_temperature() ;
if (ret == EDIT_COMMAND) { ENTER_DAY = TRUE ; continue ; }
else if (ret == QUIT_COMMAND) { break ; } ;

printf("\n Correct values ? (y/n) : ") ;
                            /* confirmation is requested */
scanf("%s",reply) ;

if (strcmp(reply,"y"))
{
  printf(" values discarded \n") ;
  ENTER_DAY = TRUE ; continue ;
}
else
{
  year = atoi(cyear) ;
  month = atoi(cmonth) ;
  date = atoi(cdate) ;
  max = atoi(cmax) ;
  min = atoi(cmin) ;
  avg = atoi(cavg) ;

/* write record in the output file */ fprintf(fp , "%02d  %02d  %02d  %03d  %03d  %03d\n",
                        year,month,date,min,max,avg) ;
  }
} fclose(fp) ;
  printf("\n\n -- END OF INPUT -- \n\n") ;
}

---------------------------------------------------------------
itoa.h : a utility program for conversion from integers
         to ascii characters
--------------------------------------------------------------- reverse(s)
char s[] ;
{
  int c , i , j ;
  for (i = 0 , j = strlen(s)-1 ; i< j; i++ , j--)
  {
    c = s[i] ;
    s[i] = s[j] ;
    s[j] = c ;
  }
} itoa(n,s)
char s[] ;
int n ;
{
  int i , sign ;
  if ((sign = n) <0)
    n = -n ;
  i = 0 ;
  do
  {
    s[i++] = n % 10 + '0' ;
  }
  while ((n /= 10) > 0 ) ;

if (sign < 0)
    s[i++] = '-' ;
  s[i] = '\0' ;
  reverse(s) ;
}
```

Program: *shrink.c*

```c
/***********************************************************************/
/*                                                                     */
/*                          SHRINK.C                                   */
/*                                                                     */
/*   This program shinks the complete C datafile into  a compressed    */
/*   datafile by extracting some fields from the record and divide them */
/*   into four small files according to service division. The input file */
/*   is under the name of "outfile", the four output files are "div-1" to */
/*   "div-4".                                                          */
/*                                                                     */
/***********************************************************************/

/***********************************************************************/
/*                                                                     */
/*                    DATA   TYPE   DEFINITION                         */
/*                                                                     */
/***********************************************************************/ include <stdio.h>
define  ofn  46              /* # of fields in long data file  */
#define  nfn  36              /* # of fields in short data file */

/****************** DATA DEFINITION OF COMPLETE RECORD ***************/ typedef struct datetype
   { unsigned char year,month,day; };

typedef struct timetype
   { unsigned char hour,minute,second; };

typedef struct datime
   { unsigned char year,month,day,hour,minute,second; };

typedef struct record
   {
      unsigned char       file_st[1];                       /*   1 -   1  */
      unsigned int        unq_num;                          /*   2 -   6  */
      struct datetype     or_exe_date;                      /*   7 -  10  */
      unsigned char       or_type[3],                       /*  11 -  13  */
                          mis_num[10],                      /*  14 -  23  */
                          ver_num[2],                       /*  24 -  25  */
                          svc_div[1], svc_area[1],          /*  26 -  27  */
                          or_st1[1],or_st2[1];              /*  28 -  29  */
      struct datetype     or_crt_date;                      /*  30 -  33  */
      struct timetype     or_crt_time;                      /*  34 -  37  */
      unsigned char       tech_num[4];                      /*  38 -  41  */
      struct timetype     or_exe_time;                      /*  42 -  45  */
      unsigned char       exe_date_type[1];                 /*  46 -  46  */
      struct datetype     or_cmp_date;                      /*  47 -  50  */
      struct timetype     or_cmp_time;                      /*  51 -  54  */
      unsigned char       ucad_num[5],                      /*  55 -  59  */
                          resi_comm[1],                     /*  60 -  60  */
                          or_stype[1];                      /*  61 -  61  */
      struct datetype     fst_call_date;                    /*  62 -  65  */
      struct timetype     fst_call_time;                    /*  66 -  69  */
      unsigned char       ortype_fst_call[3];               /*  70 -  72  */
      struct datetype     lst_call_date;                    /*  73 -  76  */
      struct timetype     lst_call_time;                    /*  77 -  80  */
      unsigned char       ortype_lst_call[3];               /*  81 -  83  */
      struct datetype     or_disp_date;                     /*  84 -  87  */
      struct timetype     or_disp_time;                     /*  88 -  91  */
      struct datetype     or_inrut_date;                    /*  92 -  95  */
      struct timetype     or_inrut_time;                    /*  96 -  99  */
      struct datetype     or_onsite_date;                   /* 100 - 104  */
      struct timetype     or_onsite_time;                   /* 105 - 107  */
      unsigned char       work_code[5];                     /* 108 - 112  */
```

```c
        unsigned int        fcst_aptt_cnt;              /* 113 - 114 */
        unsigned int        grid_num;                   /* 115 - 119 */
        unsigned int        call_ahd_cnt;               /* 120 - 121 */
        struct datime       call_ahd[5];                /* 122 - 161 */
        unsigned char       call_ahd_st[3];             /* 162 - 164 */
        struct timetype     or_time_to;                 /* 165 - 168 */
        struct datetype     pri_exe_date;               /* 169 - 172 */
        struct timetype     pri_exe_time;               /* 173 - 176 */
        struct timetype     pri_time_to;                /* 177 - 180 */
        unsigned char       pri_date_type[1];           /* 181 - 181 */
        struct datetype     chg_call_date;              /* 182 - 185 */
        struct timetype     chg_call_time;              /* 186 - 189 */
        unsigned char       ortype_chg_call[3];         /* 190 - 192 */
    };

/*********** DATA TYPE DEFINITION OF SHORT RECORED *******************/ typedef struct rec
    {
        struct datetype     or_exe_date;                /*   7 -  10 */
        unsigned char       or_type[3],                 /*  11 -  13 */
                            svc_div[1], svc_area[1],    /*  26 -  27 */
                            or_st1[1],or_st2[1];        /*  28 -  29 */
        struct datetype     or_crt_date;                /*  30 -  33 */
        struct timetype     or_crt_time;                /*  34 -  37 */
        struct timetype     or_exe_time;                /*  42 -  45 */
        unsigned char       exe_date_type[1];           /*  46 -  46 */
        struct datetype     or_cmp_date;                /*  47 -  50 */
        struct timetype     or_cmp_time;                /*  51 -  54 */
        unsigned char       resi_comm[1],               /*  60 -  60 */
                            or_stype[1];                /*  61 -  61 */
        struct datetype     fst_call_date;              /*  62 -  65 */
        struct timetype     fst_call_time;              /*  66 -  69 */
        unsigned char       ortype_fst_call[3];         /*  70 -  72 */
        struct datetype     lst_call_date;              /*  73 -  76 */
        struct timetype     lst_call_time;              /*  77 -  80 */
        unsigned char       ortype_lst_call[3];         /*  81 -  83 */
        struct datetype     or_disp_date;               /*  84 -  87 */
        struct timetype     or_disp_time;               /*  88 -  91 */
        struct datetype     or_inrut_date;              /*  92 -  95 */
        struct timetype     or_inrut_time;              /*  96 -  99 */
        struct datetype     or_onsite_date;             /* 100 - 104 */
        struct timetype     or_onsite_time;             /* 105 - 107 */
        unsigned char       work_code[5];               /* 108 - 112 */
        unsigned int        fcst_aptt_cnt;              /* 113 - 114 */
        struct timetype     or_time_to;                 /* 165 - 168 */
        struct datetype     pri_exe_date;               /* 169 - 172 */
        struct timetype     pri_exe_time;               /* 173 - 176 */
        struct timetype     pri_time_to;                /* 177 - 180 */
        unsigned char       pri_date_type[1];           /* 181 - 181 */
        struct datetype     chg_call_date;              /* 182 - 185 */
        struct timetype     chg_call_time;              /* 186 - 189 */
        unsigned char       ortype_chg_call[3];         /* 190 - 192 */
    };

/******************* TABLE OF EBCDIC CHARACTERS *******************/ unsigned char *EBCDIC="
<(+|&        !$*); -/       |,%_>?          :#@'=\" abcdefghi       jklmnopqr
-stuvwxyz                {ABCDEFGHI      }JKLMNOPQR      \\ STUVWXYZ
0123456789|       ";

/******************* FIELD NAME IN FULL ***************************/ unsigned char *fieldname[nfn]={
        "order-execute-date",   "order-type",           "service-division",
        "service-area",         "order-status-1",       "order-status-2",
```

```
        "order-creation-date",  "order-creation-time",   "order-execute-time",
        "execution-date-type",  "order-completed-date",  "order-completed-time",
        "resi-comm",            "order-subtype",         "first-call-date",
        "first-call-time",      "type-of-first-call",    "last-call-date",
        "last-call-time",       "type-of-last-call",     "order-dispatched-date",
        "order-dispatched-time","order-in-route-date",   "order-in-route-time",
        "order-on-site-date",   "order-on-site-time",    "work-code",
        "forecast-appt-count",  "order-time-to",         "prior-execute-date",
        "prior-execute-time",   "prior-time-to",         "prior-date-type",
        "change-call-date",     "change-call-time",      "type-of-change-call"
        };

/***************** TYPE OF EACH FIELD *************/ unsigned char outype[ofn]={ 1,2,3,1,1,1,1,1,1,1,1,3,4,1,4,1,3,4,1,1,1,3,4,1,
                            3,4,1,3,4,3,4,3,4,1,2,2,2,5,1,4,3,4,4,1,3,4,1 };

unsigned char type[nfn]={ 3,1,1,1,1,1,3,4,4,1,3,4,1,1,3,4,1,3,
                          4,1,3,4,3,4,3,4,1,2,4,3,4,4,1,3,4,1 };

/**************** BYTE OFFSET OF EACH FIELD ***********/ unsigned char start[ofn+1]={ 1,2,7,11,14,24,26,27,28,29,30,34,38,42,46,47,51,55,
                             60,61,62,66,70,73,77,81,84,88,92,96,100,104,108,113,
                             115,120,122,162,165,169,173,177,181,182,186,190,193 };

/*************** LENGTH OF EACH FIELD  ***************/ unsigned char length[nfn]={ 3,3,1,1,1,1,3,3,3,1,3,3,1,1,3,3,3,3,
                            3,3,3,3,3,3,3,3,5,4,3,3,3,3,1,3,3,3 };

/**************** FLAG OF FIELDS TO BE SHUNK **********/ unsigned char gate[ofn]={ 0,0,1,1,0,0,1,1,1,1,1,1,0,1,1,1,1,1,0,1,1,1,1,
                          1,1,1,1,1,1,1,1,1,1,0,0,0,0,1,1,1,1,1,1,1,1,1 };

struct timetype      pri_time_to;                    /* 177 - 180 */
        unsigned char        pri_date_type[1];               /* 181 - 181 */
        struct datetype      chg_call_date;                  /* 182 - 185 */
        struct timetype      chg_call_time;                  /* 186 - 189 */
        unsigned char        ortype_chg_call[3];             /* 190 - 192 */
    };

/******************** TABLE OF EBCDIC CHARACTERS  *******************/ unsigned char *EBCDIC="
<(+|&           !$*); -/        |,%_>?          :#@'=\" abcdefghi      jklmnopqr
~stuvwxyz                       {ABCDEFGHI      }JKLMNOPQR      \\ STUVWXYZ
0123456789|            ";

/******************** FIELD NAME IN FULL  *********************/ unsigned char *fieldname[nfn]={
        "order-execute-date",   "order-type",            "service-division",
        "service-area",         "order-status-1",        "order-status-2",
        "order-creation-date",  "order-creation-time",   "order-execute-time",
        "execution-date-type",  "order-completed-date",  "order-completed-time",
        "resi-comm",            "order-subtype",         "first-call-date",
        "first-call-time",      "type-of-first-call",    "last-call-date",
        "last-call-time",       "type-of-last-call",     "order-dispatched-date",
        "order-dispatched-time","order-in-route-date",   "order-in-route-time",
        "order-on-site-date",   "order-on-site-time",    "work-code",
        "forecast-appt-count",  "order-time-to",         "prior-execute-date",
        "prior-execute-time",   "prior-time-to",         "prior-date-type",
        "change-call-date",     "change-call-time",      "type-of-change-call"
        };
```

```c
/**************** TYPE OF EACH FIELD **************/ unsigned char outype[ofn]={ 1,2,3,1,1,1,1,1,1,1,3,4,1,4,1,3,4,1,1,1,3,4,1,
                            3,4,1,3,4,3,4,3,4,1,2,2,2,5,1,4,3,4,4,1,3,4,1 };

unsigned char type[nfn]={ 3,1,1,1,1,1,3,4,4,1,3,4,1,1,3,4,1,3,
                          4,1,3,4,3,4,3,4,1,2,4,3,4,4,1,3,4,1 };

/**************** BYTE OFFSET OF EACH FIELD ***********/ unsigned char start[ofn+1]={ 1,2,7,11,14,24,26,27,28,29,30,34,38,42,46,47,51,55,
                             60,61,62,66,70,73,77,81,84,88,92,96,100,104,108,113,
                             115,120,122,162,165,169,173,177,181,182,186,190,193 };

/**************** LENGTH OF EACH FIELD ***************/ unsigned char length[nfn]={ 3,3,1,1,1,1,3,3,3,1,3,3,1,1,3,3,3,3,
                            3,3,3,3,3,3,3,3,5,4,3,3,3,3,1,3,3,3 };

/**************** FLAG OF FIELDS TO BE SHUNK *********/ unsigned char gate[ofn]={ 0,0,1,1,0,0,1,1,1,1,1,1,0,1,1,1,1,1,0,1,1,1,1,
                          1,1,1,1,1,1,1,1,1,1,1,0,0,0,0,1,1,1,1,1,1,1,1 };

struct record out;                  /* out contains long record   */
struct rec poly;                    /* poly contains short record */

/********** ADDRESS OF EACH FIELD IN LONG RECORD  **************/ void  **address[ofn]={
        out.file_st,            &out.unq_num,           &out.or_exe_date,
        out.or_type,            out.mis_num,            out.ver_num,
        out.svc_div,            out.svc_area,           out.or_st1,
        out.or_st2,             &out.or_crt_date,       &out.or_crt_time,
        out.tech_num,           &out.or_exe_time,       out.exe_date_type,
        &out.or_cmp_date,       &out.or_cmp_time,       out.ucad_num,
        out.resi_comm,          out.or_stype,           &out.fst_call_date,
        &out.fst_call_time,     out.ortype_fst_call,    &out.1st_call_date,
        &out.1st_call_time,     out.ortype_1st_call,    &out.or_disp_date,
        &out.or_disp_time,      &out.or_inrut_date,     &out.or_inrut_time,
        &out.or_onsite_date,    &out.or_onsite_time,    out.work_code,
        &out.fcst_aptt_cnt,     out.grid_num,           &out.call_ahd_cnt,
        out.call_ahd,           out.call_ahd_st,        &out.or_time_to,
        &out.pri_exe_date,      &out.pri_exe_time,      &out.pri_time_to,
        out.pri_date_type,      &out.chg_call_date,     &out.chg_call_time,
        out.ortype_chg_call
        };

/********** ADDRESS OF EACH FIELD IN SHORT RECORD  ************/ void  **polyadr[nfn]= {
        &poly.or_exe_date,      poly.or_type,           poly.svc_div,
        poly.svc_area,          poly.or_st1,            poly.or_st2,
        &poly.or_crt_date,      &poly.or_crt_time,      &poly.or_exe_time,
        poly.exe_date_type,     &poly.or_cmp_date,      &poly.or_cmp_time,
        poly.resi_comm,         poly.or_stype,          &poly.fst_call_date,
        &poly.fst_call_time,    poly.ortype_fst_call,   &poly.1st_call_date,
        &poly.1st_call_time,    poly.ortype_1st_call,   &poly.or_disp_date,
        &poly.or_disp_time,     &poly.or_inrut_date,    &poly.or_inrut_time,
        &poly.or_onsite_date,   &poly.or_onsite_time,   poly.work_code,
        &poly.fcst_aptt_cnt,    &poly.or_time_to,       &poly.pri_exe_date,
        &poly.pri_exe_time,     &poly.pri_time_to,      poly.pri_date_type,
        &poly.chg_call_date,    &poly.chg_call_time,    poly.ortype_chg_call
        };

/*****************************************************************/
/*                                                               */
/*                          SUBROUTINES                          */
/*                                                               */
/*****************************************************************/
```

```
/*********************************************************************/
/*                                                                   */
/*                      OUTPUT   CHARACTERS                          */
/*                                                                   */
/*          Input: address of a field in C data structure.           */
/*                 length of the field                               */
/*                                                                   */
/*     This subroutine prints fields of characters in C record.      */
/*                                                                   */
/*********************************************************************/ out_c(adr,item)
unsigned char *adr,item;
{ unsigned char i,len;

len=length[item];
  for(i=0; i<len; i++) printf("%c",*(adr+i));
}

/*********************************************************************/
/*                                                                   */
/*                        OUTPUT   DATE                              */
/*                                                                   */
/*          Input: address of a field in C data structure.           */
/*                                                                   */
/*     This subroutine prints fields of date type in C record.       */
/*                                                                   */
/*********************************************************************/ out_date(adr)
struct datetype *adr;
{
   if(adr->day!=0)
     printf("%4d-%2d-%2d",(int)adr->year+1900,adr->month,adr->day);
}

/*********************************************************************/
/*                                                                   */
/*                        OUTPUT   TIME                              */
/*                                                                   */
/*          Input: address of a field in C data structure.           */
/*                                                                   */
/*     This subroutine prints fields of time type in C record.       */
/*                                                                   */
/*********************************************************************/ out_time(adr)
struct timetype *adr;
{
   if(adr->hour+adr->minute+adr->second!=0)
     printf("%2d:%2d:%2d",adr->hour,adr->minute,adr->second);
}

/*********************************************************************/
/*                                                                   */
/*                       OUTPUT   RECORD                             */
/*                                                                   */
/*          Input: record index in the data file                     */
/*                                                                   */
/*     This subroutine prints the complete record in C data file.    */
/*                                                                   */
/*********************************************************************/ output(order)
unsigned int order;
{ int i,j;

printf("\n       **********   RECORD #: %d   ********\n\n",order);
  for(i=0; i<nfn; i++) {
    printf("%30s:   ",fieldname[i]);
    switch(type[i]) {
      case 1: out_c(polyadr[i],i); break;
```

```
          case 2: printf("%d",*polyadr[i]); break;
          case 3: out_date(polyadr[i]); break;
          case 4: out_time(polyadr[i]); break;
          };
       printf("\n");
     };
     printf("\n\n");
}

/*******************************************************************/
/*                                                                 */
/*                       OUTPUT   RECORD                           */
/*                                                                 */
/*                                                                 */
/*     This subroutine copies selected fields from long record to short */
/*     record.                                                     */
/*                                                                 */
/*******************************************************************/ shrink()
{
  unsigned int i,j,k;

k=0;
  for(i=0; i<ofn; i++)
    if(gate[i]==0)k+=1;
    else switch(type[i-k]) {
      case 1: for(j=0; j<length[i-k]; j++)
                *(polyadr[i-k]+j)=*(address[i]+j);
              break;
      case 2:
      case 3:
      case 4: *polyadr[i-k]=*address[i];
              break;
      };

}

/*******************************************************************/
/*                                                                 */
/*                       MAIN   PROGRAM                            */
/*                                                                 */
/*******************************************************************/ main()
{
   int i,j,need;
   FILE *f1,*f2,*f3,*f4,*f5,*f;   /* file pointers */
   unsigned char *c,*d;            /* c contains address of long record */
                                   /* d contains address of short record */
printf("# of records to be shrinked = "); scanf("%d",&need);
f1=fopen("outfile","r");
f2=fopen("div-1","w");
f3=fopen("div-2","w");
f4=fopen("div-3","w");
f5=fopen("div-4","w");              /* open files */ c=out.file_st;
d=&poly.or_exe_date.year;           /* get addresses of both records */ for(j=1; j<=need; j++) { fread(c,168,1,f1);               /* read in long record of 168 bytes */ shrink();    /* copy selected fields from long records to short records */ printf("      ********** SHRINK RECORD  %d  ********\n",j);
   switch(*poly.svc_div) {
      case '1': f=f2; break;
      case '2': f=f3; break;
```

```
        case '3': f=f4; break;
        case '4': f=f5; break;    /* select output file according to
                                     service division */
    }
    fwrite(d,100,1,f);            /* write short records to output file */
    } fclose(f1);
    fclose(f2);
    fclose(f3);
    fclose(f4);
    fclose(f5);                   /* close files */
}
```

Program: *divide.c*

```
/*******************************************************************/
/*                                                                 */
/*                      DIVIDE.C                                   */
/*                                                                 */
/*   This program divides the division file into year files,       */
/*   and outputs the three files of year 1991,1992,1993.           */
/*                                                                 */
/*******************************************************************/

/*******************************************************************/
/*                                                                 */
/*                   DATA  TYPE  DEFINITION                        */
/*                                                                 */
/*******************************************************************/ include <stdio.h>
define  nfn 36                    /* # of fields in record */

/****************** RECORD DEFINITION ***********************/ typedef struct datetype
    { unsigned char year,month,day; };

typedef struct timetype
    { unsigned char hour,minute,second; };

typedef struct datime
    { unsigned char year,month,day,hour,minute,second; };

typedef struct rec
    {
        struct datetype      or_exe_date;              /*   7 - 10  */
        unsigned char        or_type[3],               /*  11 - 13  */
                             svc_div[1], svc_area[1],  /*  26 - 27  */
                             or_st1[1],or_st2[1];      /*  28 - 29  */
        struct datetype      or_crt_date;              /*  30 - 33  */
        struct timetype      or_crt_time;              /*  34 - 37  */
        struct timetype      or_exe_time;              /*  42 - 45  */
        unsigned char        exe_date_type[1];         /*  46 - 46  */
        struct datetype      or_cmp_date;              /*  47 - 50  */
        struct timetype      or_cmp_time;              /*  51 - 54  */
        unsigned char        resi_comm[1],             /*  60 - 60  */
                             or_stype[1];              /*  61 - 61  */
        struct datetype      fst_call_date;            /*  62 - 65  */
        struct timetype      fst_call_time;            /*  66 - 69  */
        unsigned char        ortype_fst_call[3];       /*  70 - 72  */
        struct datetype      lst_call_date;            /*  73 - 76  */
        struct timetype      lst_call_time;            /*  77 - 80  */
        unsigned char        ortype_lst_call[3];       /*  81 - 83  */
        struct datetype      or_disp_date;             /*  84 - 87  */
        struct timetype      or_disp_time;             /*  88 - 91  */
        struct datetype      or_inrut_date;            /*  92 - 95  */
```

```c
        struct timetype     or_inrut_time;           /*  96 -  99 */
        struct datetype     or_onsite_date;          /* 100 - 104 */
        struct timetype     or_onsite_time;          /* 105 - 107 */
        unsigned char       work_code[5];            /* 108 - 112 */

/******************** COUNTER NAME ********************/
unsigned char *cname[20]={
        "order_status_2=0",
        "appointment jobs",
        "appointment with change_call",
        "appointment with change_call and first_call",
        "appointment with chang_call no first_call",
        " appointment no change_call",
        "forecast jobs",
        "forecast with change_call",
        "forecast with change_call and first_call",
        "forecast with change_call no first_call",
        "forecast no change_call",
        "forcast no change_call with first_call",
        "forcast no change_call no first_call",
        "negative pending period",
        "negative response time or date after 4/30/93",
        "response time too long",
        "date before 9/16/91 or between 5/92-8/92",
        "priority 2 jobs excluded",
        "priority 5 jobs excluded",
        "number of jobs left",
        };

/******************** JOB TYPE ********************/
unsigned char job[54][3]={
        "C07", "R07", "12 ", "G14", "G17", "G31", "47 ", "48 ", "49 ",
        "50 ", "51 ", "52 ", "61 ", "62 ", "63 ", "64 ", "65 ", "66 ",
        "67 ", "68 ", "69 ", "G70", "75 ", "76 ", "77 ", "78 ", "80 ",
        "G81", "82 ", "83 ", "84 ", "85 ", "86 ", "A89", "M89", "P89",
        "S89", "90 ", "G91", "G93", "94 ", "95 ", "G96", "P96", "G97",
        "G98", "99 ", "400", "401", "402", "403", "404", "405", "406"
        };

/******************** JOB PRIORITY ********************/
unsigned char prior[54]={ 2,2,1,2,1,2,3,3,3,5,4,6,1,5,1,1,1,1,4,1,6,
                          5,2,5,3,3,6,6,4,5,5,3,3,2,2,2,2,2,5,6,6,6,
                          2,2,5,6,2,6,6,6,6,6,6,6 };

/****************** FIELD TYPE ******************/ unsigned char type[nfn]={ 3,1,1,1,1,1,3,4,4,1,3,4,1,1,3,4,1,3,
                          4,1,3,4,3,4,3,4,1,2,4,3,4,4,1,3,4,1 };

/****************** FIELD LENGTH ******************/ unsigned char length[nfn]={ 3,3,1,1,1,1,3,3,3,1,3,3,1,1,3,3,3,3,
                            3,3,3,3,3,3,3,3,5,4,3,3,3,3,1,3,3,3 };

int top;
struct rec poly;                        /* poly contains a record */
struct prevnode prev[80000],*pv;        /* used for pending job */
struct datetype d1,d2,d3,d4,d5,d6;
struct timetype t1,t2,t3,t4,t5,t6;

unsigned int        fcst_aptt_cnt;          /* 113 - 114 */
    struct timetype     or_time_to;             /* 165 - 168 */
    struct datetype     pri_exe_date;           /* 169 - 172 */
    struct timetype     pri_exe_time;           /* 173 - 176 */
    struct timetype     pri_time_to;            /* 177 - 180 */
    unsigned char       pri_date_type[1];       /* 181 - 181 */
    struct datetype     chg_call_date;          /* 182 - 185 */
    struct timetype     chg_call_time;          /* 186 - 189 */
    unsigned char       ortype_chg_call[3];     /* 190 - 192 */
};
```

```
/******** DATATYPE USED FOR PENDING JOB COMPUTATION ************/ typedef struct prevnode
    {
         float crt,cmp;
         unsigned char pr;
    };

/************ DATATYPE USED FOR NEURAL NETWORK *************/ typedef struct neunode
    {
       unsigned char  month,date,day,type,
                      pend[6];
    };

/*************** TABLE OF EBCDIC CHARACTERS  ****************/ unsigned char *EBCDIC="

WXYZ      0123456789|       ";

/***************** FIELD NAME IN FULL  *************************/
unsigned char *fieldname[nfn]={
         "order-execute-date",   "order-type",
         "service-division",     "service-area",
         "order-status-1",       "order-status-2",
         "order-creation-date",  "order-creation-time",
         "order-execute-time",   "execution-date-type",
         "order-completed-date", "order-completed-time",
         "resi-comm",            "order-subtype",
         "first-call-date",      "first-call-time",
         "type-of-first-call",   "last-call-date",
         "last-call-time",       "type-of-last-call",
         "order-dispatched-date","order-dispatched-time",
         "order-in-route-date",  "order-in-route-time",
         "order-on-site-date",   "order-on-site-time",
         "work-code",            "forecast-appt-count",
         "order-time-to",        "prior-execute-date",
         "prior-execute-time",   "prior-time-to",
         "prior-date-type",      "change-call-date",
         "change-call-time",     "type-of-change-call"
         };

/***************** ADDRESS OF FIELDS ************/ void   **polyadr[nfn]= {
         &poly.or_exe_date,     poly.or_type,
         poly.svc_div,          poly.svc_area,
         poly.or_st1,           poly.or_st2,
         &poly.or_crt_date,     &poly.or_crt_time,
         &poly.or_exe_time,     poly.exe_date_type,
         &poly.or_cmp_date,     &poly.or_cmp_time,
         poly.resi_comm,        poly.or_stype,
         &poly.fst_call_date,   &poly.fst_call_time,
         poly.ortype_fst_call,  &poly.1st_call_date,
         &poly.1st_call_time,   poly.ortype_1st_call,
         &poly.or_disp_date,    &poly.or_disp_time,
         &poly.or_inrut_date,   &poly.or_inrut_time,
         &poly.or_onsite_date,  &poly.or_onsite_time,
         poly.work_code,        &poly.fcst_aptt_cnt,
         &poly.or_time_to,      &poly.pri_exe_date,
         &poly.pri_exe_time,    &poly.pri_time_to,
         poly.pri_date_type,    &poly.chg_call_date,
         &poly.chg_call_time,   poly.ortype_chg_call
         };

char mon[12]={31,28,31,30,31,30,31,31,30,31,30,31 };
```

```
/****************************************************************/
/*                                                              */
/*                        SUBROUTINES                           */
/*                                                              */
/****************************************************************/

/****************************************************************/
/*                                                              */
/*                    OUTPUT  CHARACTERS                        */
/*                                                              */
/*          Input: address of a field in C data                 */
/*                 structure. length of the field               */
/*                                                              */
/*      This subroutine prints fields of characters in C .      */
/*                                                              */
/****************************************************************/ out_c(adr,item)
unsigned char *adr,item;
{ unsigned char i,len;

len=length[item];
  for(i=0; i<len; i++) printf("%c",*(adr+i));
}

/****************************************************************/
/*                                                              */
/*                       OUTPUT  DATE                           */
/*                                                              */
/*     Input: address of a field in C data structure.           */
/*                                                              */
/*    This subroutine prints fields of date type in C record.   */
/*                                                              */
/****************************************************************/ out_date(adr)
struct datetype *adr;
{
   if(adr->day!=0)
     printf("%4d-%2d-%2d",(int)adr->year+1900,adr->month,adr->day);
}

/****************************************************************/
/*                                                              */
/*                       OUTPUT  TIME                           */
/*                                                              */
/*     Input: address of a field in C data structure.           */
/*                                                              */
/*    This subroutine prints fields of time type in C record.   */
/*                                                              */
/****************************************************************/ out_time(adr)
struct timetype *adr;
{
   if(adr->hour+adr->minute+adr->second!=0)
     printf("%2d:%2d:%2d",adr->hour,adr->minute,adr->second);
}

/****************************************************************/
/*                                                              */
/*                      OUTPUT  RECORD                          */
/*                                                              */
/*            Input: record index in the data file              */
/*                                                              */
/*      This subroutine prints the complete record in C         */
/*      data file.                                              */
/*                                                              */
/****************************************************************/
```

```c
output(order)
unsigned int order;
{ int i,j;

printf("\n    **********    RECORD #: %d    ********\n\n",order);
  for(i=0; i<nfn; i++) {
    printf("%30s:    ",fieldname[i]);
    switch(type[i]) {
      case 1: out_c(polyadr[i],i); break;
      case 2: printf("%d",*polyadr[i]); break;
      case 3: out_date(polyadr[i]); break;
      case 4: out_time(polyadr[i]); break;
      };
    printf("\n");
  };
  printf("\n\n");
}
/******************************************************************/
/*                                                                */
/*                      MAIN   PROGRAM                            */
/*                                                                */
/******************************************************************/ main()
{
  int   i,j,k;
  FILE *f[4];
  unsigned char *c,fn[5][16],d[1];
  struct datetype date,d1,d2,d3,d4,d5;

printf(" Input filename = "); scanf("%s",fn[0]);
  printf(" Input # of total record = "); scanf("%d",&j);
  f[0]=fopen(fn[0],"r");
  for(i=1; i<4; i++) {
    *d='0'+i;
    strcpy(fn[i],fn[0]);
    strcat(fn[i],"-9");
    strcat(fn[i],d);
    f[i]=fopen(fn[i],"w");                    /* open files */
  } c=&poly.or_exe_date.year;

for(i=1; i<=j; i++)
      {
        fread(c,100,1,f[0]);              /* read in a record */
        date.day=0;
        d1=poly.fst_call_date;
        d2=poly.chg_call_date;
        d3=poly.or_onsite_date;
        d4=poly.or_exe_date;
        d5=poly.or_cmp_date;

/* Pick out the starting time of pending period as key for dividing */ if(*poly.exe_date_type=='A' || *poly.exe_date_type=='G')
        {
          if(d2.year!=0)
          {
            if(d1.year!=0)
            {
              date=d1;
            }
            else { date=d4; }
          }
          else { date=d4; }
        }
        else
        {
          if(d2.year!=0)
          {
            if(d1.year!=0)
            {
              date=d1;
```

```
          }
          else { date=d2; }
        }
        else
        {
          if(d1.year!=0)
          {
            date=d1;
          }
          else { date=d5;  }
        }
     } if(date.day==0) date=poly.or_crt_date;
     k=date.year;                              /* select year    */
     k=k-k/10*10;
     if(k<1||k>3) output(j);                   /* error process */
     else fwrite(c,100,1,f[k]);
   };

for(i=0; i<4; i++) fclose(f[i]);

}
```

Program: *sort.c*

```
/*********************************************************************/
/*                                                                   */
/*                         SORT.C                                    */
/*    This program sorts all the records in a year file, according   */
/*    to the starting time of the pending period. The output         */
/*    filename is the same as the input filename.                    */
/*                                                                   */
/*********************************************************************/

/*********************************************************************/
/*                                                                   */
/*                     DATA   TYPE   DEFINITION                      */
/*                                                                   */
/*********************************************************************/ include <stdio.h>
define  nfn 36                       /* # of fields in record */

/******************** RECORD DEFINITION *********************/ typedef struct datetype
  { unsigned char year,month,day; };

typedef struct timetype
  { unsigned char hour,minute,second; };

typedef struct datime
  { unsigned char year,month,day,hour,minute,second; };

typedef struct rec
  {
     struct datetype    or_exe_date;              /*   7 - 10  */
     unsigned char      or_type[3],                /*  11 - 13  */
                        svc_div[1], svc_area[1],   /*  26 - 27  */
                        or_st1[1],or_st2[1];       /*  28 - 29  */
     struct datetype    or_crt_date;              /*  30 - 33  */
     struct timetype    or_crt_time;              /*  34 - 37  */
     struct timetype    or_exe_time;              /*  42 - 45  */
     unsigned char      exe_date_type[1];          /*  46 - 46  */
     struct datetype    or_cmp_date;              /*  47 - 50  */
     struct timetype    or_cmp_time;              /*  51 - 54  */
```

```c
        unsigned char       resi_comm[1],           /*  60 -  60 */
                            or_stype[1];            /*  61 -  61 */
        struct datetype     fst_call_date;          /*  62 -  65 */
        struct timetype     fst_call_time;          /*  66 -  69 */
        unsigned char       ortype_fst_call[3];     /*  70 -  72 */
        struct datetype     lst_call_date;          /*  73 -  76 */
        struct timetype     lst_call_time;          /*  77 -  80 */
        unsigned char       ortype_lst_call[3];     /*  81 -  83 */
        struct datetype     or_disp_date;           /*  84 -  87 */
        struct timetype     or_disp_time;           /*  88 -  91 */
        struct datetype     or_inrut_date;          /*  92 -  95 */
        struct timetype     or_inrut_time;          /*  96 -  99 */
        struct datetype     or_onsite_date;         /* 100 - 104 */
        struct timetype     or_onsite_time;         /* 105 - 107 */
        unsigned char       work_code[5];           /* 108 - 112 */
        unsigned int        fcst_aptt_cnt;          /* 113 - 114 */
        struct timetype     or_time_to;             /* 165 - 168 */
        struct datetype     pri_exe_date;           /* 169 - 172 */
        struct timetype     pri_exe_time;           /* 173 - 176 */
        struct timetype     pri_time_to;            /* 177 - 180 */
        unsigned char       pri_date_type[1];       /* 181 - 181 */
        struct datetype     chg_call_date;          /* 182 - 185 */
        struct timetype     chg_call_time;          /* 186 - 189 */
        unsigned char       ortype_chg_call[3];     /* 190 - 192 */
};

/******** DATATYPE USED FOR PENDING JOB COMPUTATION ************/ typedef struct prevnode
    {
        float crt,cmp;
        unsigned char pr;
    };

/************* DATATYPE USED FOR NEURAL NETWORK *************/ typedef struct neunode
    {
        unsigned char month,date,day,type,
                      pend[6];
    };

/*************** TABLE OF EBCDIC CHARACTERS ****************/ unsigned char *EBCDIC="

WXYZ       0123456789|        ";

/***************** FIELD NAME IN FULL ********************/
unsigned char *fieldname[nfn]={
        "order-execute-date",    "order-type",
        "service-division",      "service-area",
        "order-status-1",        "order-status-2",
        "order-creation-date",   "order-creation-time",
        "order-execute-time",    "execution-date-type",
        "order-completed-date",  "order-completed-time",
        "resi-comm",             "order-subtype",
        "first-call-date",       "first-call-time",
        "type-of-first-call",    "last-call-date",
        "last-call-time",        "type-of-last-call",
        "order-dispatched-date","order-dispatched-time",
        "order-in-route-date",   "order-in-route-time",
        "order-on-site-date",    "order-on-site-time",
        "work-code",             "forecast-appt-count",
        "order-time-to",         "prior-execute-date",
        "prior-execute-time",    "prior-time-to",
        "prior-date-type",       "change-call-date",
        "change-call-time",      "type-of-change-call"
        };
```

```c
/******************* COUNTER NAME *******************/
unsigned char *cname[20]={
        "order_status_2=0",
        "appointment jobs",
        "appointment with change_call",
        "appointment with change_call and first_call",
        "appointment with chang_call no first_call",
        " appointment no change_call",
        "forecast jobs",
        "forecast with change_call",
        "forecast with change_call and first_call",
        "forecast with change_call no first_call",
        "forecast no change_call",
        "forcast no change_call with first_call",
        "forcast no change_call no first_call",
        "negative pending period",
        "negative response time or date after 4/30/93",
        "response time too long",
        "date before 9/16/91 or between 5/92-8/92",
        "priority 2 jobs excluded",
        "priority 5 jobs excluded",
        "number of jobs left",
        };

/******************* JOB TYPE ***********************/
unsigned char job[54][3]={
        "C07", "R07", "12 ", "G14", "G17", "G31", "47 ", "48 ", "49 ",
        "50 ", "51 ", "52 ", "61 ", "62 ", "63 ", "64 ", "65 ", "66 ",
        "67 ", "68 ", "69 ", "G70", "75 ", "76 ", "77 ", "78 ", "80 ",
        "G81", "82 ", "83 ", "84 ", "85 ", "86 ", "A89", "M89", "P89",
        "S89", "90 ", "G91", "G93", "94 ", "95 ", "G96", "P96", "G97",
        "G98", "99 ", "400", "401", "402", "403", "404", "405", "406"
        };

/******************* JOB PRIORITY *********************/
unsigned char prior[54]={ 2,2,1,2,1,2,3,3,3,5,4,6,1,5,1,1,1,1,4,1,6,
                          5,2,5,3,3,6,6,4,5,5,3,3,2,2,2,2,2,5,6,6,6,
                          2,2,5,6,2,6,6,6,6,6,6,6 };

/***************** FIELD TYPE ********************/ unsigned char type[nfn]={ 3,1,1,1,1,1,3,4,4,1,3,4,1,1,3,4,1,3,
                          4,1,3,4,3,4,3,4,1,2,4,3,4,4,1,3,4,1 };

/***************** FIELD LENGTH ******************/ unsigned char length[nfn]={ 3,3,1,1,1,1,3,3,3,1,3,3,1,1,3,3,3,3,
                            3,3,3,3,3,3,3,3,5,4,3,3,3,3,1,3,3,3 };

int top;
struct rec poly;
struct prevnode prev[80000],*pv;          /* poly contains a record */
struct datetype d1,d2,d3,d4,d5,d6;        /* used for pending job */
struct timetype t1,t2,t3,t4,t5,t6;

/***************** OF FIELDS ***********/ void   **polyadr[nfn]= {
        &poly.or_exe_date,      poly.or_type,
        poly.svc_div,           poly.svc_area,
        poly.or_st1,            poly.or_st2,
        &poly.or_crt_date,      &poly.or_crt_time,
        &poly.or_exe_time,      poly.exe_date_type,
        &poly.or_cmp_date,      &poly.or_cmp_time,
        poly.resi_comm,         poly.cr_stype,
        &poly.fst_call_date,    &poly.fst_call_time,
        poly.ortype_fst_call,   &poly.1st_call_date,
        &poly.1st_call_time,    poly.ortype_1st_call,
        &poly.or_disp_date,     &poly.or_disp_time,
        &poly.or_inrut_date,    &poly.or_inrut_time,
```

```
                &poly.or_onsite_date,     &poly.or_onsite_time,
                poly.work_code,           &poly.fcst_aptt_cnt,
                &poly.or_time_to,         &poly.pri_exe_date,
                &poly.pri_exe_time,       &poly.pri_time_to,
                poly.pri_date_type,       &poly.chg_call_date,
                &poly.chg_call_time,      poly.ortype_chg_call
                };

char mon[12]={31,28,31,30,31,30,31,31,30,31,30,31 };

/******************************************************************/
/*                                                                */
/*                        SUBROUTINES                             */
/*                                                                */
/******************************************************************/

/******************************************************************/
/*                                                                */
/*                     OUTPUT  CHARACTERS                         */
/*                                                                */
/*        Input: address of a field in C data                     */
/*               structure, length of the field                   */
/*                                                                */
/*    This subroutine prints fields of characters in C.           */
/*                                                                */
/******************************************************************/ out_c(adr,item)
unsigned char *adr,item;
{ unsigned char i,len;

len=length[item];
   for(i=0; i<len; i++) printf("%c",*(adr+i));
}

/******************************************************************/
/*                                                                */
/*                       OUTPUT  DATE                             */
/*                                                                */
/*     Input: address of a field in C data structure.             */
/*                                                                */
/*   This subroutine prints fields of date type in C    record.   */
/*                                                                */
/******************************************************************/ out_date(adr)
struct datetype *adr;
{
   if(adr->day!=0)
     printf("%4d-%2d-%2d",(int)adr->year+1900,adr->month,adr->day);
}

/******************************************************************/
/*                                                                */
/*                       OUTPUT  TIME                             */
/*                                                                */
/*     Input: address of a field in C data structure.             */
/*                                                                */
/*     This subroutine prints fields of time type in C record.    */
/*                                                                */
/******************************************************************/ out_time(adr)
struct timetype *adr;
{
   if(adr->hour+adr->minute+adr->second!=0)
```

```
    printf("%2d:%2d:%2d",adr->hour,adr->minute,adr->second);
}

/****************************************************************/
/*                                                              */
/*                    OUTPUT   RECORD                           */
/*                                                              */
/*          Input: record index in the data file                */
/*                                                              */
/*      This subroutine prints the complete record in C         */
/*      data file.                                              */
/*                                                              */
/****************************************************************/ output(order)
unsigned int order;
{ int i,j;

printf("\n      **********   RECORD #: %d    *********\n\n",order);
  for(i=0; i<nfn; i++) {
    printf("%30s:    ",fieldname[i]);
    switch(type[i]) {
      case 1: out_c(polyadr[i],i); break;
      case 2: printf("%d",*polyadr[i]); break;
      case 3: out_date(polyadr[i]); break;
      case 4: out_time(polyadr[i]); break;
      };
    printf("\n");
  };
  printf("\n\n");
}

/****************************************************************/
/*                                                              */
/*   .                MAIN   PROGRAM                            */
/*                                                              */
/****************************************************************/ main()
{
   int   i,j,k,l,len,count,top,
         pos[80000],      /* pos contains qualified record index */
         key[80000];      /* key contains date & time for sorting */
   FILE *f1,*f2;
   unsigned char *c,mon,
                 fn1[16];
   struct datetype date,d1,d2,d3,d4,d5;
   struct timetype time,t1,t2,t3,t4,t5;

printf(" Input filename = "); scanf("%s",fn1);
   printf(" Total # of records = "); scanf("%d",&len);
   f1=fopen(fn1,"r");
   f2=fopen("tmp.data","w");              /* open file   */ for(k=1; k<=12; k++)                   /* for each month  */
   {
      count=top=0;
      c=&poly.or_exe_date.year;
      fseek(f1,0,0);

for(l=1; l<=len; l++)
      {
         fread(c,100,1,f1);               /* read in a record */
         date.day=0;
         d1=poly.fst_call_date;
         t1=poly.fst_call_time;
         d2=poly.chg_call_date;
         t2=poly.chg_call_time;
         d3=poly.or_onsite_date;
```

```c
        t3=poly.or_onsite_time;
        d4=poly.or_exe_date;
        t4=poly.or_exe_time;
        d5=poly.or_cmp_date;
        t5=poly.or_cmp_time;

/* Pick out the starting time of pending period as key for sorting */ if(*poly.exe_date_type=='A' || *poly.exe_date_type=='G')
    {
      if(d2.year!=0)
      {
        if(d1.year!=0)
        {
          date=d1; time=t1;
        }
        else { date=d4; time=t4; }
      }
      else { date=d4; time=t4; }
    }
    else
    {
      if(d2.year!=0)
      {
        if(d1.year!=0)
        {
          date=d1; time=t1;
        }
        else { date=d2; time=t2; }
      }
      else
      {
        if(d1.year!=0)
        {
          date=d1; time=t1;
        }
        else { date=d5; time.hour=7; time.minute=time.second=0; }
      }
    } if(date.day==0) date=poly.or_crt_date;
    if(date.month!=k) { count++; continue; }
    j=date.day*24*60+time.hour*60+time.minute;

for(i=top++; i>0 && key[i]>j; i--)   /* insertion sort    */
    {
        pos[i+1]=pos[i];
        key[i+1]=key[i];
    } pos[i+1]=count;
    key[i+1]=j;
    count++;
    };

for(j=1; j<=top; j++)                /* write to output file */
    {
      fseek(f1,100*pos[j],0);
      fread(c,100,1,f1);
      if(j%1000==0)output(j);
      fwrite(c,100,1,f2);
    }
  } fclose(f1); fclose(f2);
  system(strcat("mv tmp.data ",fn1));    /* remove the old file */

}
```

Program: *peeks.c*

```
/****************************************************************/
/*                                                              */
/*                        PEEKS.C                               */
/*     This program is used to print out records from the "compressed" */
/*     C data structure.                                        */
/*                                                              */
/****************************************************************/
```

```
/*******************************************************************/
/*                                                                 */
/*                    DATA TYPE DEFINITION                         */
/*                                                                 */
/*******************************************************************/ include <stdio.h>
define  nfn 36                    /* # of fields in short record */

/********************* RECORD DEFINITION **********************/ typedef struct datetype
    { unsigned char year,month,day; };

typedef struct timetype
    { unsigned char hour,minute,second; };

typedef struct datime
    { unsigned char year,month,day,hour,minute,second; };

typedef struct rec
    {
        struct datetype     or_exe_date;              /*   7 -  10 */
        unsigned char       or_type[3],               /*  11 -  13 */
                            svc_div[1], svc_area[1],  /*  26 -  27 */
                            or_st1[1],or_st2[1];      /*  28 -  29 */
        struct datetype     or_crt_date;              /*  30 -  33 */
        struct timetype     or_crt_time;              /*  34 -  37 */
        struct timetype     or_exe_time;              /*  42 -  45 */
        unsigned char       exe_date_type[1];         /*  46 -  46 */
        struct datetype     or_cmp_date;              /*  47 -  50 */
        struct timetype     or_cmp_time;              /*  51 -  54 */
        unsigned char       resi_comm[1],             /*  60 -  60 */
                            or_stype[1];              /*  61 -  61 */
        struct datetype     fst_call_date;            /*  62 -  65 */
        struct timetype     fst_call_time;            /*  66 -  69 */
        unsigned char       ortype_fst_call[3];       /*  70 -  72 */
        struct datetype     1st_call_date;            /*  73 -  76 */
        struct timetype     1st_call_time;            /*  77 -  80 */
        unsigned char       ortype_1st_call[3];       /*  81 -  83 */
        struct datetype     or_disp_date;             /*  84 -  87 */
        struct timetype     or_disp_time;             /*  88 -  91 */
        struct datetype     or_inrut_date;            /*  92 -  95 */
        struct timetype     or_inrut_time;            /*  96 -  99 */
        struct datetype     or_onsite_date;           /* 100 - 104 */
        struct timetype     or_onsite_time;           /* 105 - 107 */
        unsigned char       work_code[5];             /* 108 - 112 */
        unsigned int        fcst_aptt_cnt;            /* 113 - 114 */
        struct timetype     or_time_to;               /* 165 - 168 */
        struct datetype     pri_exe_date;             /* 169 - 172 */
        struct timetype     pri_exe_time;             /* 173 - 176 */
        struct timetype     pri_time_to;              /* 177 - 180 */
        unsigned char       pri_date_type[1];         /* 181 - 181 */
        struct datetype     chg_call_date;            /* 182 - 185 */
        struct timetype     chg_call_time;            /* 186 - 189 */
        unsigned char       ortype_chg_call[3];       /* 190 - 192 */
    };

/****************** TABLE OF EBCDIC CHARACTERS *****************/ unsigned char *EBCDIC="
<(+|&           !$*); -/            |,%_>?          :#@'=\" abcdefghi
jklmnopqr       ~stuvwxyz                           {ABCDEFGHI    }JKLMNOPQR
\\ STUVWXYZ     0123456789|          ";

/****************** FIELD NAME IN FULL *************************/ unsigned char *fieldname[nfn]={
        "order-execute-date",   "order-type",       "service-division",
```

```
        "service-area",         "order-status-1",        "order-status-2",
        "order-creation-date",  "order-creation-time",   "order-execute-time",
        "execution-date-type",  "order-completed-date",  "order-completed-time",
        "resi-comm",            "order-subtype",         "first-call-date",
        "first-call-time",      "type-of-first-call",    "last-call-date",
        "last-call-time",       "type-of-last-call",     "order-dispatched-date",
        "order-dispatched-time","order-in-route-date",   "order-in-route-time",
        "order-on-site-date",   "order-on-site-time",    "work-code",
        "forecast-appt-count",  "order-time-to",         "prior-execute-date",
        "prior-execute-time",   "prior-time-to",         "prior-date-type",
        "change-call-date",     "change-call-time",      "type-of-change-call"
        };

/***************** DATA TYPE OF EACH FIELD  ***************/ unsigned char type[nfn]={ 3,1,1,1,1,1,3,4,4,1,3,4,1,1,3,4,1,3,
                          4,1,3,4,3,4,3,4,1,2,4,3,4,4,1,3,4,1 };

/***************** LENGTH OF EACH FIELD    *****************/ unsigned char length[nfn]={ 3,3,1,1,1,1,3,3,3,1,3,3,1,1,3,3,3,3,
                            3,3,3,3,3,3,3,3,5,4,3,3,3,3,1,3,3,3 };

struct rec poly;                    /* poly contains a short record */

/***************** ADDRESS OF EACH FIELD IN RECORD *********/ void  **polyadr[nfn]= {
        &poly.or_exe_date,      poly.or_type,            poly.svc_div,
        poly.svc_area,          poly.or_st1,             poly.or_st2,
        &poly.or_crt_date,      &poly.or_crt_time,       &poly.or_exe_time,
        poly.exe_date_type,     &poly.or_cmp_date,       &poly.or_cmp_time,
        poly.resi_comm,         poly.or_stype,           &poly.fst_call_date,
        &poly.fst_call_time,    poly.ortype_fst_call,    &poly.1st_call_date,
        &poly.1st_call_time,    poly.ortype_1st_call,    &poly.or_disp_date,
        &poly.or_disp_time,     &poly.or_inrut_date,     &poly.or_inrut_time,
        &poly.or_onsite_date,   &poly.or_onsite_time,    poly.work_code,
        &poly.fcst_aptt_cnt,    &poly.or_time_to,        &poly.pri_exe_date,
        &poly.pri_exe_time,     &poly.pri_time_to,       poly.pri_date_type,
        &poly.chg_call_date,    &poly.chg_call_time,     poly.ortype_chg_call
        };

/*****************************************************************/
/*                                                               */
/*                      SUBROUTINES                              */
/*                                                               */
/*****************************************************************/

/*****************************************************************/
/*                                                               */
/*                   OUTPUT   CHARACTERS                         */
/*                                                               */
/*      Input: address of a field in C data structure.           */
/*             length of the field                               */
/*                                                               */
/*      This subroutine prints fields of characters in C record. */
/*                                                               */
/*****************************************************************/ out_c(adr,item)
unsigned char *adr,item;
{ unsigned char i,len;
```

```c
  len=length[item];
  for(i=0; i<len; i++) printf("%c",*(adr+i));
}

/******************************************************************/
/*                                                                */
/*                      OUTPUT   DATE                             */
/*                                                                */
/*         Input: address of a field in C data structure.         */
/*                                                                */
/*     This subroutine prints fields of date type in C record.    */
/*                                                                */
/******************************************************************/ out_date(adr)
struct datetype *adr;
{
   if(adr->day!=0)
     printf("%4d-%2d-%2d",(int)adr->year+1900,adr->month,adr->day);
}

/******************************************************************/
/*                                                                */
/*                      OUTPUT   TIME                             */
/*                                                                */
/*         Input: address of a field in C data structure.         */
/*                                                                */
/*     This subroutine prints fields of time type in C record.    */
/*                                                                */
/******************************************************************/ out_time(adr)
struct timetype *adr;
{
   if(adr->hour+adr->minute+adr->second!=0)
     printf("%2d:%2d:%2d",adr->hour,adr->minute,adr->second);
}

/******************************************************************/
/*                                                                */
/*                      OUTPUT   RECORD                           */
/*                                                                */
/*         Input: record index in the data file                   */
/*                                                                */
/*     This subroutine prints the complete record in C data file. */
/*                                                                */
/******************************************************************/ output(order)
unsigned int order;
{ int i,j;

printf("\n    **********    RECORD #: %d    ********\n\n",order);
  for(i=0; i<nfn; i++) {
    printf("%30s:    ",fieldname[i]);
    switch(type[i]) {
      case 1: out_c(polyadr[i],i); break;
      case 2: printf("%d",*polyadr[i]); break;
      case 3: out_date(polyadr[i]); break;
      case 4: out_time(polyadr[i]); break;
      };
    printf("\n");
  };
  printf("\n\n");
}

/******************************************************************/
/*                                                                */
/*                      MAIN   PROGRAM                            */
/*                                                                */
/******************************************************************/
```

```
main()
{
  int i,j,need,skip;
  FILE *f1;                              /* file pointer */
  unsigned char *c,filename[16];         /* c contains address of record */ printf(" filename = "); scanf("%s",filename);
  printf("# or records to be skipped = "); scanf("%d",&skip);
  printf("# of records to be printeded = "); scanf("%d",&need);
  f1=fopen(filename,"r");                /* open file */ fseek(f1,100*skip,0);                  /* jump over some records */ c=&poly.or_exe_date.year;              /* get address of record */ for(j=skip+1; j<=skip+need; j++) {
    fread(c,100,1,f1);                   /* read in a record */
    output(j);                           /* output record    */
    } fclose(f1);                            /* close file       */
}

Program: neural.c

/*****************************************************************/
/*                                                               */
/*                       NEURAL.C                                */
/*                                                               */
/*    This program provides the input data file for the neural   */
/*    network. It outputs file under the name of "data.neu".     */
/*                                                               */
/*****************************************************************/

/*****************************************************************/
/*                                                               */
/*                  DATA  TYPE  DEFINITION                       */
/*                                                               */
/*****************************************************************/ include <stdio.h>
define nfn 36                           /* # of fields in record */

/****************** RECORD DEFINITION *******************/ typedef struct datetype
  { unsigned char year,month,day; };

typedef struct timetype
  { unsigned char hour,minute,second; };

typedef struct datime
  { unsigned char year,month,day,hour,minute,second; };

typedef struct rec
    {
        struct datetype      or_exe_date;              /*   7 - 10  */
        unsigned char        or_type[3],               /*  11 - 13  */
                             svc_div[1], svc_area[1],  /*  26 - 27  */
                             or_st1[1],or_st2[1];      /*  28 - 29  */
        struct datetype      or_crt_date;              /*  30 - 33  */
        struct timetype      or_crt_time;              /*  34 - 37  */
        struct timetype      or_exe_time;              /*  42 - 45  */
        unsigned char        exe_date_type[1];         /*  46 - 46  */
        struct datetype      or_cmp_date;              /*  47 - 50  */
```

```c
        struct timetype    or_cmp_time;              /*  51 -  54 */
        unsigned char      resi_comm[1],             /*  60 -  60 */
                           or_stype[1];              /*  61 -  61 */
        struct datetype    fst_call_date;            /*  62 -  65 */
        struct timetype    fst_call_time;            /*  66 -  69 */
        unsigned char      ortype_fst_call[3];       /*  70 -  72 */
        struct datetype    lst_call_date;            /*  73 -  76 */
        struct timetype    lst_call_time;            /*  77 -  80 */
        unsigned char      ortype_lst_call[3];       /*  81 -  83 */
        struct datetype    or_disp_date;             /*  84 -  87 */
        struct timetype    or_disp_time;             /*  88 -  91 */
        struct datetype    or_inrut_date;            /*  92 -  95 */
        struct timetype    or_inrut_time;            /*  96 -  99 */
        struct datetype    or_onsite_date;           /* 100 - 104 */
        struct timetype    or_onsite_time;           /* 105 - 107 */
        unsigned char      work_code[5];             /* 108 - 112 */
        unsigned int       fcst_aptt_cnt;            /* 113 - 114 */
        struct timetype    or_time_to;               /* 165 - 168 */
        struct datetype    pri_exe_date;             /* 169 - 172 */
        struct timetype    pri_exe_time;             /* 173 - 176 */
        struct timetype    pri_time_to;              /* 177 - 180 */
        unsigned char      pri_date_type[1];         /* 181 - 181 */
        struct datetype    chg_call_date;            /* 182 - 185 */
        struct timetype    chg_call_time;            /* 186 - 189 */
        unsigned char      ortype_chg_call[3];       /* 190 - 192 */
};

/******** DATATYPE USED FOR PENDING JOB COMPUTATION ************/ typedef struct prevnode
    {
        float crt,cmp;
        unsigned char pr;
    };

/************ DATATYPE USED FOR NEURAL NETWORK **************/ typedef struct neunode
    {
       unsigned char  month,date,day,type,
                      pend[6];
    };

/*************** TABLE OF EBCDIC CHARACTERS ****************/ unsigned char *EBCDIC="

WXYZ      0123456789|      ";

/**************** FIELD NAME IN FULL ************************/
unsigned char *fieldname[nfn]={
        "order-execute-date",    "order-type",
        "service-division",      "service-area",
        "order-status-1",        "order-status-2",
        "order-creation-date",   "order-creation-time",
        "order-execute-time",    "execution-date-type",
        "order-completed-date",  "order-completed-time",
        "resi-comm",             "order-subtype",
        "first-call-date",       "first-call-time",
        "type-of-first-call",    "last-call-date",
        "last-call-time",        "type-of-last-call",
        "order-dispatched-date", "order-dispatched-time",
        "order-in-route-date",   "order-in-route-time",
        "order-on-site-date",    "order-on-site-time",
        "work-code",             "forecast-appt-count",
        "order-time-to",         "prior-execute-date",
        "prior-execute-time",    "prior-time-to",
        "prior-date-type",       "change-call-date",
        "change-call-time",      "type-of-change-call"
        };
```

```c
/****************** COUNTER NAME ******************/
unsigned char *cname[20]={
        "order_status_2=0",
        "appointment jobs",
        "appointment with change_call",
        "appointment with change_call and first_call",
        "appointment with chang_call no first_call",
        " appointment no change_call",
        "forecast jobs",
        "forecast with change_call",
        "forecast with change_call and first_call",
        "forecast with change_call no first_call",
        "forecast no change_call",
        "forcast no change_call with first_call",
        "forcast no change_call no first_call",
        "negative pending period",
        "negative response time or date after 4/30/93",
        "response time too long",
        "date before 9/16/91 or between 5/92-8/92",
        "priority 2 jobs excluded",
        "priority 5 jobs excluded",
        "number of jobs left",
        };

/****************** JOB TYPE ******************/
unsigned char job[54][3]={
        "C07", "R07", "12 ", "G14", "G17", "G31", "47 ", "48 ", "49 ",
        "50 ", "51 ", "52 ", "61 ", "62 ", "63 ", "64 ", "65 ", "66 ",
        "67 ", "68 ", "69 ", "G70", "75 ", "76 ", "77 ", "78 ", "80 ",
        "G81", "82 ", "83 ", "84 ", "85 ", "86 ", "A89", "M89", "P89",
        "S89", "90 ", "G91", "G93", "94 ", "95 ", "G96", "P96", "G97",
        "G98", "99 ", "400", "401", "402", "403", "404", "405", "406"
        };

/****************** JOB PRIORITY ******************/
unsigned char prior[54]={ 2,2,1,2,1,2,3,3,3,5,4,6,1,5,1,1,1,1,4,1,6,
                          5,2,5,3,3,6,6,4,5,5,3,3,2,2,2,2,2,5,6,6,6,
                          2,2,5,6,2,6,6,6,6,6,6,6 };

/**************** FIELD TYPE ****************/ unsigned char type[nfn]={ 3,1,1,1,1,1,3,4,4,1,3,4,1,1,3,4,1,3,
                          4,1,3,4,3,4,3,4,1,2,4,3,4,4,1,3,4,1 };

/**************** FIELD LENGTH ****************/ unsigned char length[nfn]={ 3,3,1,1,1,1,3,3,3,1,3,3,1,1,3,3,3,3,
                            3,3,3,3,3,3,3,3,5,4,3,3,3,3,1,3,3,3 };

int top;
struct rec poly;                        /* poly contains a record */
struct prevnode prev[80000],*pv;        /* used for pending job */
struct datetype d1,d2,d3,d4,d5,d6;
struct timetype t1,t2,t3,t4,t5,t6;

/**************** ADDRESS OF FIELDS **********/ void **polyadr[nfn]= {
        &poly.or_exe_date,      poly.or_type,
        poly.svc_div,           poly.svc_area,
        poly.or_st1,            poly.or_st2,
        &poly.or_crt_date,      &poly.or_crt_time,
        &poly.or_exe_time,      poly.exe_date_type,
        &poly.or_cmp_date,      &poly.or_cmp_time,
        poly.resi_comm,         poly.or_stype,
        &poly.fst_call_date,    &poly.fst_call_time,
        poly.ortype_fst_call,   &poly.1st_call_date,
        &poly.1st_call_time,    poly.ortype_1st_call,
        &poly.or_disp_date,     &poly.or_disp_time,
```

```
            &poly.or_inrut_date,      &poly.or_inrut_time,
            &poly.or_onsite_date,     &poly.or_onsite_time,
            poly.work_code,           &poly.fcst_aptt_cnt,
            &poly.or_time_to,         &poly.pri_exe_date,
            &poly.pri_exe_time,       &poly.pri_time_to,
            poly.pri_date_type,       &poly.chg_call_date,
            &poly.chg_call_time,      poly.ortype_chg_call
          };

char mon[12]={31,28,31,30,31,30,31,31,30,31,30,31 };

/*******************************************************************/
/*                                                                 */
/*                         SUBROUTINES                             */
/*                                                                 */
/*******************************************************************/

/*******************************************************************/
/*                                                                 */
/*                       REENCODE JOB TYPE                         */
/*                                                                 */
/*     Input: address of job_type in C data structure.             */
/*            index of record                                      */
/*     Output: job type code                                       */
/*             If ineffective type, return -1                      */
/*                                                                 */
/*     This procedure reencode job type into consecutive numbers   */
/*                                                                 */
/*******************************************************************/ int class(adr,order)
char adr[3];
int order;
{
  unsigned char i;

for(i=0; i<54; i++)
    if(strncmp(adr,job[i],3)==0) return(i);
  return(-1);
}

/*******************************************************************/
/*                                                                 */
/*                       TIME   TRANSFORMATION                     */
/*                                                                 */
/*          Input: address of date and time field                  */
/*          Output: hours offset from 1/1/91 0:0:0                 */
/*                                                                 */
/*     This subroutine transform the time into hours in offset     */
/*     from 1/1/91                                                 */
/*                                                                 */
/*******************************************************************/ float hour(adr1,adr2)              /* transform the time into hours */
struct datetype *adr1;             /* in offset from 1/1/91         */
struct timetype *adr2;
{
  unsigned int i,j;
  float result;

j=(adr1->year-91)*365*24;

for(i=0; i<adr1->month-1; i++)
    j+=mon[i]*24;
  j+=(adr1->year+(adr1->month>2)-89)/4*24;

j+=24*(adr1->day-1)+adr2->hour;
  result=(float)j+(float)adr2->minute/100;
  return(result);
}
```

```
/******************************************************************/
/*                                                                */
/*                     TIME   SUBTRACTION                         */
/*                                                                */
/*          Input: two numbers of time in hours                   */
/*          Output: their difference                              */
/*                                                                */
/*       This subroutine do time subtraction                      */
/*                                                                */
/******************************************************************/ float hminus(n1,n2)                    /* time subtraction    */
float n1,n2;
{
   float x,y;

x=n1-n2; y=(float)(int)x;
   if(x-y>0.6) x-=0.4;
   return(x);
}

/******************************************************************/
/*                                                                */
/*              PENDING   PERIOD  COMPUTATION                     */
/*                                                                */
/*          Input: computation type and record index              */
/*          Output: job type                                      */
/*                                                                */
/*      This subroutine computes pending period according to      */
/*      different job type and other information.                 */
/*                                                                */
/******************************************************************/ int pending(tp,i)                       /* compute pending period */
char tp;
int i;
{
   float h1,h2;
   char l;
   struct prevnode tmp;
   int j,k;

switch(tp)
   {
     case 1:  l=prior[k=class(poly.ortype_fst_call,i)];
          h1=hour(&d1,&t1);
          h2=hour(&d2,&t2);
          break;
     case 2:  l=prior[k=class(poly.or_type,i)];
          h1=hour(&d4,&t4);
          h2=hour(&d5,&t5);
          break;
     case 3:  l=prior[k=class(poly.or_type,i)];
          d1=d5; t1.hour=7;
          h1=hour(&d1,&t1);
          h2=hour(&d5,&t5);
          break;
     case 4:  l=prior[k=class(poly.or_type,i)];
          h1=hour(&d2,&t2);
          h2=hour(&d5,&t5);
          break;
     case 5:  l=prior[k=class(poly.or_type,i)];
          h1=hour(&d1,&t1);
          h2=hour(&d5,&t5);
          break;
   } if (h2-h1<-8.0 || k<0) return (-1);
   if (h2<h1 && (*poly.exe_date_type=='A' || *poly.exe_date_type=='G'))
   {
     h1=hour(&d6,&t6);
     h2=hour(&d5,&t5);
     if(h2<h1) return(-1);
   }
```

```
      pv=&prev[++top];
      pv->pr=1;
      pv->crt=h1;
      pv->cmp=h2;
      for(j=top; j>1 && prev[j].crt<prev[j-1].crt; j--)
         {
           tmp=prev[j];
           prev[j]=prev[j-1];
           prev[j-1]=tmp;
         }
      return(k);

}

/*******************************************************************/
/*                                                                 */
/*                   OUTPUT   CHARACTERS                           */
/*                                                                 */
/*         Input: address of a field in C data                     */
/*                    structure. length of the field               */
/*                                                                 */
/*      This subroutine prints fields of characters in C .         */
/*                                                                 */
/*******************************************************************/ out_c(adr,item)
unsigned char *adr,item;
{ unsigned char i,len;

len=length[item];
   for(i=0; i<len; i++) printf("%c",*(adr+i));
}

/*******************************************************************/
/*                                                                 */
/*                       OUTPUT   DATE                             */
/*                                                                 */
/*     Input: address of a field in C data structure.              */
/*                                                                 */
/*    This subroutine prints fields of date type in C record.      */
/*                                                                 */
/*******************************************************************/ out_date(adr)
struct datetype *adr;
{
   if(adr->day!=0)
      printf("%4d-%2d-%2d",(int)adr->year+1900,adr->month,adr->day);
}

/*******************************************************************/
/*                                                                 */
/*                       OUTPUT   TIME                             */
/*                                                                 */
/*     Input: address of a field in C data structure.              */
/*                                                                 */
/*    This subroutine prints fields of time type in C record.      */
/*                                                                 */
/*******************************************************************/ out_time(adr)
struct timetype *adr;
{
   if(adr->hour+adr->minute+adr->second!=0)
      printf("%2d:%2d:%2d",adr->hour,adr->minute,adr->second);
}
```

```
/****************************************************************/
/*                                                              */
/*                    OUTPUT   RECORD                           */
/*                                                              */
/*          Input: record index in the data file                */
/*                                                              */
/*      This subroutine prints the complete record in C         */
/*      data file.                                              */
/*                                                              */
/****************************************************************/ output(order)
unsigned int order;
{ int i,j;

printf("\n       **********    RECORD #: %d    ********\n\n",order);
  for(i=0; i<nfn; i++) {
    printf("%30s:    ",fieldname[i]);
    switch(type[i]) {
      case 1: out_c(polyadr[i],i); break;
      case 2: printf("%d",*polyadr[i]); break;
      case 3: out_date(polyadr[i]); break;
      case 4: out_time(polyadr[i]); break;
      };
    printf("\n");
  };
  printf("\n\n");
}

/****************************************************************/
/*                                                              */
/*                      MAIN   PROGRAM                          */
/*                                                              */
/****************************************************************/ main()
{
  int   i,j,k,l,len,count,
        data[600][6],
        pos[80000],     /* pos contains qualified record index */
        key[80000];     /* key contains date & time for sorting */
  FILE *f1,*f2,*f3;
  float h1,h2,h;
  unsigned char *c,d,mon,
                fn1[16],
                fn2[16];
  struct neunode nr;
  int ct[21];

printf(" Input database filename = "); scanf("%s",fn1);
  printf(" Total # of records = "); scanf("%d",&len);

f1=fopen(fn1,"r");                    /* open files    */
  strncpy(fn2,fn1,5);
  strcat(fn2,".wp");
  f2=fopen(fn2,"r");
  f3=fopen("data.neu","a+");

c=&poly.or_exe_date.year;
  top=count=0;
  for(i=0; i<21; i++) ct[i]=0;

for(i=0; i<593; i++)   /* read in manpower data from .wp file */
  {
    for(j=0; j<5; j++) data[i][j]=0;
    j=0;
    do
    {
      fscanf(f2,"%d",&data[i][j++]);
      while((k=fgetc(f2))==32);
      if(k==(int)'\n')break;
      ungetc(k,f2);
```

```c
   } while(!feof(f2));
   if(j<5)
   { data[i][3]=data[i][1];
     data[i][4]=data[i][2]; }
};

for(i=1; i<=len; i++)
{
   fread(c,100,1,f1);
   count++;
   if (*poly.or_st2=='0') { ct[0]++; continue; } d1=poly.fst_call_date;              /* read in a record    */
   t1=poly.fst_call_time;
   d2=poly.chg_call_date;
   t2=poly.chg_call_time;
   d3=poly.or_onsite_date;
   t3=poly.or_onsite_time;
   d4=poly.or_exe_date;
   t4=poly.or_exe_time;
   d5=poly.or_cmp_date;
   t5=poly.or_cmp_time;
   d6=poly.or_inrut_date;
   t6=poly.or_inrut_time;

if(*poly.exe_date_type=='A' || *poly.exe_date_type=='G')
   /* i.e., it is an appointment job */
   {
     ct[1]++;
     if(d2.year!=0)
     /* this record had some initial job type that was later changed
        to the appointment job and therefore should be counted in the
        pending jobs for 2 distinct time intervals */

{
       ct[2]++;
       if(d1.year!=0)  /* the first call information is available */
       {
         ct[3]++;
         if((k=pending(1,i))<0) continue;
         k=pending(2,i);
       }
       else
       /* since no first call info is available, this job will
          be counted only once with pending period
          starting from 7:00am of the completion date */

{
         ct[4]++;
         k=pending(2,i);
       }
     }
     else /* i.e., it is a record whose job type was not changed */
     {
       ct[5]++;
       k=pending(2,i);
     }
     continue; /* no response time is needed for appointment jobs */
   }
   else   /* i.e., it is a forecast job */
   {
     ct[6]++;
     if(d2.year!=0)
     /* this forecast record had some initial job type that was later
        changed and therefore should be counted in the pending jobs in
        2 distinct time intervals */
     {
       ct[7]++;
       if(d1.year!=0) /* there is a first call information */
       {
         ct[8]++;
         if((k=pending(1,i))<0) continue;
         k=pending(4,i);
       }
```

```
        else
     /* as no first call info is available, this job will be counted
        only once with pending period starting from 7:00am of the
        completion date */
        {
          ct[9]++;
          k=pending(4,i);
        }
     }
     else
  /* i.e., it is a forecast record whose job type was not changed */
     {
        ct[10]++;
        if(d1.year!=0)    /* there is a first call information */
        {
          ct[11]++;
          k=pending(5,i);
        }
        else
     /* as no first call info is available this job will be
        counted pending starting from 7:00am of the
        completion date */
        {
          ct[12]++;
          k=pending(3,i);
        }
     }
  }
  if(k<0)
  {
     ct[13]++;
     continue;
  } h1=hour(&d1,&t1);                      /* compute response time */
  h2=hour(&d3,&t3);
  h=hminus(h2,h1);
  l=prior[k];
  if(h<0.0 || h1>20424.0) { ct[14]++; continue; }
  if((l==2 && h>72.0) || h>168.0) { ct[15]++; continue; }
  if(h1<6192.0 || (h1>11664.0 && h1<14616.0)) { ct[16]++; continue; }
  if(l==1 || (l==2 && k!=22 && k!=46)) { ct[17]++; continue; }
  if(l==5 && (k==13 || k==38 || k==44)) { ct[18]++; continue; }
  ct[19]++;

/* generate data for neural network */
  nr.month=d1.month;
     nr.date=d1.day;
     nr.day=((int)(h1/24.0)+6)%7;
     nr.type=1;
     for(j=0; j<6; j++) nr.pend[j]=0;
     j=top;
     while(--j>0 && h1-prev[j].crt<168.0)
        if(prev[j].crt<h1 && prev[j].cmp>h1) nr.pend[prev[j].pr-1]++;

fprintf(f3,"%d %d %d %ld %ld  ",count,nr.month,nr.date,nr.day,
  nr.type);
     for(j=0; j<6; j++) fprintf(f3,"%d ",nr.pend[j]);
     j=(int)h1/24-258; fprintf(f3,"%d ",data[j][0]);
     if(t1.hour<14)
        fprintf(f3,"%d %d ",data[j][1],data[j][2]);
     else
        fprintf(f3,"%d %d ",data[j][3],data[j][4]);
     fprintf(f3,"%.2f\n",h);
  } printf("\n\n\n");
  for(i=0; i<20; i++) printf(" %45s : %d\n",cname[i],ct[i]);
  fclose(f1);
  fclose(f2);
  fclose(f3);

}
```

What is claimed is:

1. An apparatus for predicting a prospective response time of a service provider to a current service request, the apparatus comprising:
   a memory for storing historical data, including previous response times to corresponding previous service requests;
   a neural network having a plurality of processing elements, each processing element including memory means for storing a respective weight, said neural network trained by a plurality of test data to modify the weights, said neural network being responsive to a plurality of inputs, including the current month of the current service request and historical data input from the memory for a plurality of months of the previous year for generating a plurality of tentative response time predictions; and
   means for classifying the current month of the current service request as similar according to predetermined rules to a first month of the plurality of months of the previous year for generating the prospective response time from a weighting of the plurality of tentative response time predictions in a mapping determined from the current month and the first month.

2. The apparatus as set forth in claim 1, wherein the plurality of processing elements includes an input processing element for receiving a priority number, an output processing element for outputting the prospective response time, and an intermediate processing element for providing a connection between the input processing element and the output processing element.

3. The apparatus as set forth in claim 1, wherein said classifying means classifies the current month using fuzzy logic.

4. The apparatus as set forth in claim 3 wherein the classifying means includes:
   a fuzzifier for generating a month similarity value for each of the plurality of months; and
   a rule base for applying the predetermined rules to the month similarity values using the fuzzy logic to perform the mapping.

5. The apparatus as set forth in claim 4 wherein the classifying means further includes:
   a defuzzifier for generating a non-fuzzy prediction gain from the mapping, and for generating the prospective response time from the weighting of the non-fuzzy prediction gain and the plurality of tentative response time predictions.

6. The apparatus as set forth in claim 1, wherein said neural network further includes:
   comparing means for comparing a test response time generated by said neural network responding to the test data to a known response time; and
   adjusting means, responsive to said comparing means, for modifying the weights.

7. The apparatus as set forth in claim 6, wherein:
   the comparing means generates a root mean squared (RMS) error from said test response time and the known response time; and
   the adjusting means uses the RMS error to modify the weights.

8. A method using a neural network for predicting a prospective response time of a service provider to a current service request, the method comprising the steps of:
   storing historical data in a memory, the historical data including previous response times to corresponding previous service requests;
   training the neural network using the historical data to learn a response time relationship between the previous service requests and the previous response times, the response time relationship being a mapping of the previous service requests to corresponding previous response times;
   generating a plurality of weights for the neural network from the learned response time relationship;
   generating a plurality of tentative response times from the learned response time relationship by applying a current service request and the historical data from a plurality of months of the previous year to said neural network configured with said plurality of weights;
   classifying a current month as similar according to predetermined rules to a first month of the plurality of months;
   generating the prospective response time from the tentative response time corresponding to the first month;
   storing the generated prospective response time in the memory; and
   outputting the prospective response time from the memory.

9. The method as set forth in claim 8, wherein the step of training further comprises the steps of:
   a) assigning weights to a plurality of processing elements of the neural network;
   b) inputting a known input as a test input to the neural network;
   c) generating a test output from the test input using the weights;
   d) generating an error from the test output and a known output corresponding to the known input;
   e) adjusting the weights using the error; and
   f) repeating steps a) to e) until the error is below a predetermined value.

* * * * *

UNITED STATES PATENT AND TRADEMARK OFFICE
CERTIFICATE OF CORRECTION

PATENT NO. : 5,444,820

DATED : August 22, 1995

INVENTOR(S) : Tzes et al.

It is certified that error appears in the above-indentified patent and that said Letters Patent is hereby corrected as shown below:

Column 1, line 2, "ADAPTIVE" should be --AN ADAPTIVE--.

Column 6, line 18, "disourse" should be --discourse--.

Column 12, line 51, "Y" should be --$\hat{Y}$--.

Column 13, line 1, " $N_N$," should be --$N_{NH}$,--.

Column 13, line 27, "$\mu_2$" should be --$\|_2$--.

Column 14, line 63, "$\hat{1}_2\hat{1}_{2>}I$" should be --$\hat{1}_2, \hat{1}_{2+}$,--.

Column 14, line 64, "$_2$" should be --$\hat{1}_2$--.

Column 15, line 18, "$\hat{1}$" should be --1--.

Column 20, line 52, "easily be" should be --easily--.

Column 20, line 66, "oppose" should be --opposed--.

UNITED STATES PATENT AND TRADEMARK OFFICE
CERTIFICATE OF CORRECTION

PATENT NO. : 5,444,820

DATED : August 22, 1995

INVENTOR(S) : Tzes et al.

It is certified that error appears in the above-indentified patent and that said Letters Patent is hereby corrected as shown below:

Column 24, line 20, "which" should be --which have--.

Column 36, line 55, "real outpu" should be --real output)--.

Column 50, line 3, "as" should be --as*/--.

Column 50, line 4, "layer" should be --layer*/--.

Column 85, line 65, --}-- should be present on its own line between line 64, "fclose(f1);" and line 66, "Program: *wd.c*".

Signed and Sealed this

Eleventh Day of June, 1996

BRUCE LEHMAN

*Attest:*

*Attesting Officer*   *Commissioner of Patents and Trademarks*